United States Patent
Jaegal et al.

(10) Patent No.: US 10,489,100 B2
(45) Date of Patent: Nov. 26, 2019

(54) ELECTRONIC DEVICE AND METHOD FOR SHARING IMAGES

(71) Applicant: LG ELECTRONICS INC., Seoul (KR)

(72) Inventors: Chan Jaegal, Seoul (KR); Byungju Lee, Seoul (KR); Hyeoncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/750,763

(22) PCT Filed: Nov. 26, 2015

(86) PCT No.: PCT/KR2015/012790
§ 371 (c)(1),
(2) Date: Feb. 6, 2018

(87) PCT Pub. No.: WO2017/078209
PCT Pub. Date: May 11, 2017

(65) Prior Publication Data
US 2018/0232195 A1 Aug. 16, 2018

(30) Foreign Application Priority Data
Nov. 5, 2015 (KR) .................... 10-2015-0154918

(51) Int. Cl.
*G06F 3/048* (2013.01)
*G06F 3/14* (2006.01)
(Continued)

(52) U.S. Cl.
CPC .......... *G06F 3/1454* (2013.01); *G06F 3/0481* (2013.01); *G06F 3/0482* (2013.01);
(Continued)

(58) Field of Classification Search
CPC ...... G06F 3/0481; G06F 9/451; G06F 3/1454; G06F 15/16
See application file for complete search history.

(56) References Cited

U.S. PATENT DOCUMENTS

| 6,765,592 B1* | 7/2004 | Pletcher ................. G06F 9/451 715/760 |
| 8,791,877 B2* | 7/2014 | Kikuchi ................ G06F 3/0481 345/1.3 |

(Continued)

FOREIGN PATENT DOCUMENTS

| KR | 10-2013-0134603 A | 12/2013 |
| KR | 10-2015-0067521 A | 6/2015 |
| WO | WO 2014/185690 A1 | 11/2014 |

*Primary Examiner* — Haoshian Shih
(74) *Attorney, Agent, or Firm* — Birch, Stewart, Kolasch & Birch, LLP

(57) ABSTRACT

The present invention relates to an apparatus and a method for sharing images with a display device of a vehicle and at least one external electronic device located inside the vehicle. One embodiment of the present invention provides an electronic device comprising: a display unit; a communication unit for communicating with the display device and at least one external electronic device; and a processor connected to the display unit and the communication unit. The processor receives a mirror image list displayed on the display device from the display device provided in the vehicle, and displays the mirror image list on a first screen of the display unit. In this case, the mirror image list comprises a mirror image of the electronic device shared with the display device and a mirror image of each of the at least one external electronic device.

15 Claims, 37 Drawing Sheets

(51) Int. Cl.
  *G06F 3/0481*  (2013.01)
  *G06F 3/0486*  (2013.01)
  *G06F 3/0482*  (2013.01)
  *G06F 3/0484*  (2013.01)
  *G06F 3/147*   (2006.01)

(52) U.S. Cl.
  CPC ........ *G06F 3/0486* (2013.01); *G06F 3/04817* (2013.01); *G06F 3/04845* (2013.01); *G06F 3/14* (2013.01); *G06F 3/147* (2013.01); *G09G 2320/0261* (2013.01); *G09G 2340/04* (2013.01); *G09G 2340/12* (2013.01); *G09G 2354/00* (2013.01); *G09G 2380/10* (2013.01)

(56) References Cited

U.S. PATENT DOCUMENTS

| | | |
|---|---|---|
| 2012/0327106 A1 | 12/2012 | Won et al. |
| 2013/0138728 A1 | 5/2013 | Kim et al. |
| 2013/0326397 A1 | 12/2013 | Kim et al. |
| 2015/0039224 A1 | 2/2015 | Tuukkanen et al. |
| 2015/0120817 A1* | 4/2015 | Jeong ............... G06F 3/1454 |
| | | 709/203 |

* cited by examiner

ELECTRONIC DEVICE AND METHOD FOR SHARING IMAGES

CROSS REFERENCE TO RELATED APPLICATIONS

This application is the National Phase of PCT International Application No. PCT/KR2015/012790, filed on Nov. 26, 2015, which claims priority under 35 U.S.C. 119(a) to Patent Application No. 10-2015-0154918, filed in Republic of Korea on Nov. 5, 2015, all of which are hereby expressly incorporated by reference into the present application.

TECHNICAL FIELD

The present disclosure relates to an electronic device, and more particularly, to an electronic device and method for sharing an image with another device located inside a vehicle.

BACKGROUND ART

A vehicle is a device that carries a passenger or goods from one place to another by operating wheels. For example, a 2-wheel vehicle such as a motorcycle, a 4-wheel vehicle such as a sedan, and a train are vehicles.

To increase the safety and convenience of a user aboard a vehicle, technologies have recently been developed rapidly to equip vehicles with various sensors and electronic devices. Particularly, many devices for increasing the driving convenience of a user are under development.

Among them, demands for a display technology that fast and effectively provides various types of information related to vehicle driving to a user are on an increase. Accordingly, the trend is that various types of display devices are provided in a vehicle and the display devices are large to enable a driver to fast perceive visual information.

Meanwhile, thanks to the development of an image processing technology, a so-called mirroring function of sharing images between two different devices has been commercialized. If the mirroring function is executed, screen information of one device may be displayed on another device having a relatively large screen. Therefore, a user may receive a common image from two different devices.

Meanwhile, a plurality of passengers may be aboard a vehicle, and each passenger may display an image using his or her electronic device. In this case, each passenger may not be aware of images displayed on the electronic devices of the other passengers.

DISCLOSURE

Technical Problem

An aspect of the present disclosure is to solve the above-described and other problems. Another aspect of the present disclosure is to provide an electronic device and method for sharing an image with a display device of a vehicle and at least one external electronic device located inside the vehicle.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, an electronic device for sharing an image with a display device of a vehicle and at least one external electronic device located inside the vehicle includes a display unit, a communication unit for communicating with the display device and the at least one external electronic device, and a processor connected to the display unit and the communication unit. The processor is configured to receive a mirrored image list displayed on the display device from the display device of the vehicle and to display the mirrored image list on a first screen of the display unit, and the mirrored image list includes a mirrored image of the electronic device and a mirrored image of each of the at least one external electronic device, the mirrored images being shared with the display device.

Further, the first screen may include a main area and at least one sub-area, and the processor may be configured to display the mirrored image of the electronic device in the main area and the mirrored image of the at least one external electronic device in the at least one sub-area.

Further, the number of the at least one sub-area may be equal to the number of the at least one external electronic device, and the mirrored image of the at least one external electronic device may one-to-one correspond to the at least one sub-area.

Further, the processor may be configured to display identification information about the electronic device in the main area, and identification information about the at least one external electronic device in the at least one sub-area.

Further, the processor may be configured to display an outline of the main area in a different color or thickness from an outline of the at least one sub-area.

Further, the processor may be configured to display selectable objects related to the mirrored image list on a second screen of the display unit.

Further, the selectable objects related to the mirrored image list may include icons representing applications installed in the electronic device.

Further, if one of the icons representing the applications installed in the electronic device is dragged and dropped from the second screen into the main area, the processor may be configured to switch the mirrored image of the electronic device to an execution image of an application corresponding to the dragged icon.

Further, if one of the icons representing the applications installed in the electronic device is dragged and dropped from the second screen into a specific sub-area among the at least one sub-area, the processor may be configured to switch the mirrored image of the external electronic device corresponding to the specific sub-area to an execution image of an application corresponding to the dragged icon.

Further, the selectable objects related to the mirrored image list may further include icons representing applications installed in the at least one external electronic device.

Further, if one of the icons representing the applications installed in the at least one external electronic device is dragged and dropped from the second screen into the main area, the processor may be configured to switch the mirrored image of the electronic device to an execution image of an application corresponding to the dragged icon.

Further, the at least one external electronic device may include a first external electronic device and a second external electronic device, and the at least one sub-area may include a first sub-area displaying a mirrored image of the first external electronic device and a second sub-area displaying a mirrored image of the second external electronic device.

Further, if one of the icons representing applications installed in the first external electronic device is dragged and dropped from the second screen into the second sub-area, the processor may be configured to switch the mirrored image of the second external electronic device to an execution image of an application corresponding to the dragged icon.

Further, if one of the icons representing applications installed in the first external electronic device is dragged and dropped from the second screen into the first sub-area, the processor may be configured to switch the mirrored image of the first external electronic device to an execution image of an application corresponding to the dragged icon.

Further, the processor may be configured to change an arrangement order of at least two mirrored images included in the mirrored image list based on a user input to the first screen.

Further, the processor may be configured to change a size of at least one mirrored image included in the mirrored image list based on a user input to the first screen.

Further, the processor may be configured to scale up a mirrored image included in the mirrored image list and display the scaled-up image on a third screen, based on a user input to the first screen.

Meanwhile, in one aspect of the present disclosure, a method for sharing an image using an electronic device includes receiving a mirrored image list displayed on a display device of a vehicle from the display device, the mirrored image list including a mirrored image of the electronic device and a mirrored image of each of at least one external electronic device located inside the vehicle, displaying the mirrored image list on a first screen of the electronic device, displaying selectable objects related to the mirrored image list on a second screen of the electronic device, and switching at least one mirrored image included in the mirrored image list to an image corresponding to a dragged object, in response to a drag and drop of the object displayed on the second screen onto the first screen.

Further, the selectable objects displayed on the second screen may include at least one of icons representing applications installed in the electronic device and icons representing applications installed in the at least one external electronic device.

Further, the display of the mirrored image list on the first screen of the electronic device may include displaying a mirrored image of the electronic device in a main area included in the first screen, and displaying a mirrored image of the at least one external electronic device in at least one sub-area included in the first screen.

Details of other embodiments are included in the detailed description and drawings.

Advantageous Effects

An electronic device and a method for controlling the electronic device according to the present disclosure have the following effects.

An electronic device according to at least one of embodiments of the present disclosure may share an image with a display device of a vehicle and at least one external electronic device located inside the vehicle.

Further, an electronic device according to at least one of the embodiments of the present disclosure may switch a mirrored image of each of a plurality of external electronic devices to another image, and display the switched image on the electronic device and/or a display device.

Further, an electronic device according to at least one of the embodiments of the present disclosure may switch an image displayed on a specific external electronic device to an execution image of a specific application selected by a user.

Further, an electronic device according to at least one of the embodiments of the present disclosure may reconfigure a mirrored image list shared from a display device of a vehicle according to a user input to the electronic device, and share the reconfigured mirrored image list with at least one of the display device and an external electronic device.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 1b and 1c are views referred to for describing cameras equipped in the vehicle illustrated in FIG. 1a.

BEST MODE FOR CARRYING OUT THE INVENTION

Figure 1A:
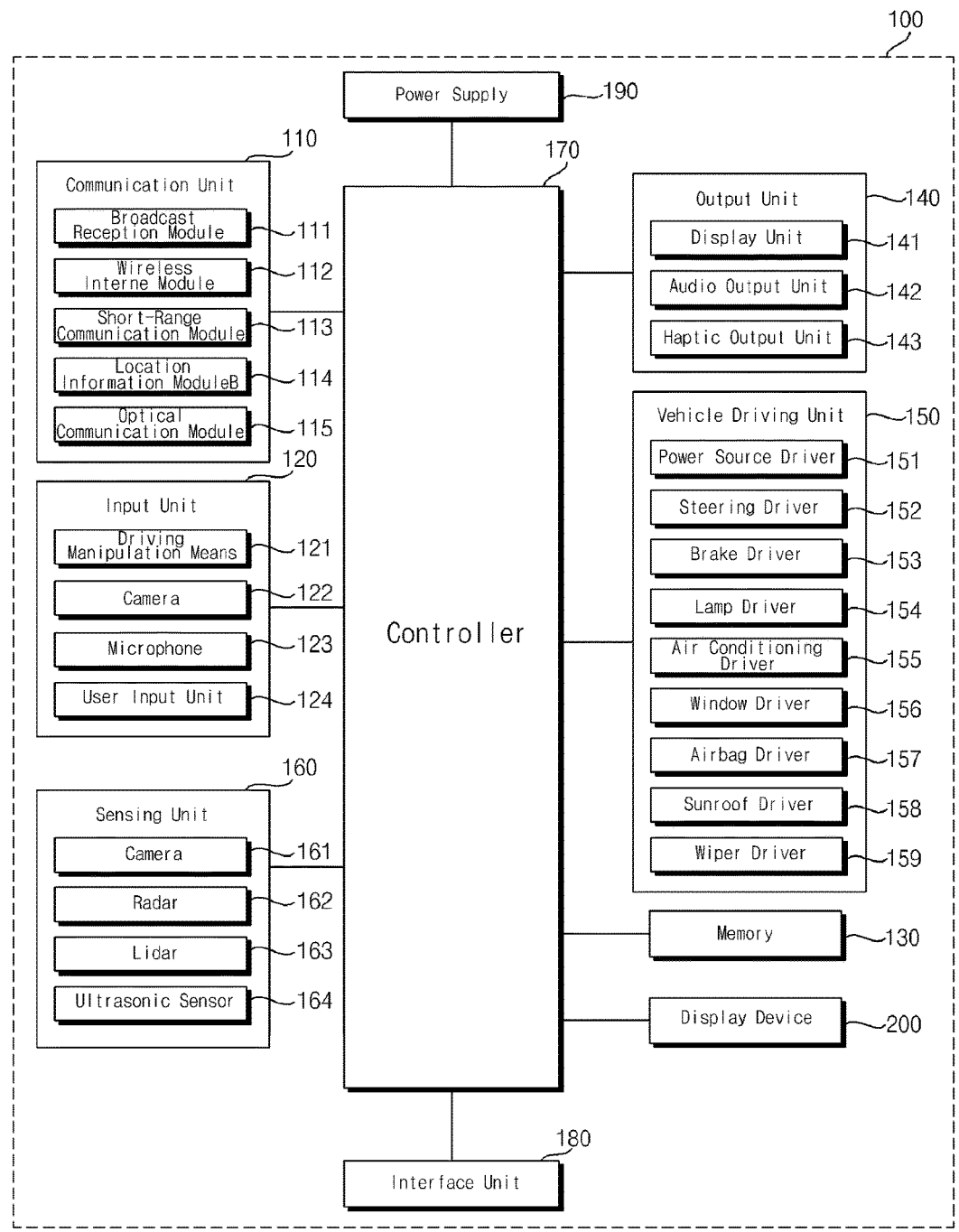
FIG. 1a is a block diagram of a vehicle according to an embodiment of the present disclosure.

Embodiments of the present disclosure will be described in detail with reference to the attached drawings. Like reference numerals denote the same or similar components throughout the drawings, and their redundant description is avoided. The terms with which the names of components are suffixed, "module" and "unit" are assigned or interchangeably used with each other, only in consideration of the readiness of specification writing. The terms do not have any distinguishable meanings or roles. Further, a detailed description of a related known technology will be omitted lest it should obscure the subject matter of embodiments of the present disclosure. Further, the attached drawings are provided to help easy understanding of the embodiments of the present disclosure, not limiting the scope and spirit of the present disclosure. Thus, it is to be understood that the present disclosure covers all modifications, equivalents, and/or alternatives falling within the scope and spirit of the present disclosure.

While ordinal numbers including first, second, etc. may be used to describe various components, they are not intended to limit the components. These expressions may be used to distinguish one component from another component.

When it is said that a component is "coupled with/to" or "connected to" another component, it should be understood that the one component is connected to the other component directly or through any other component in between. On the other hand, when it is said that a component is "directly connected to" or "directly coupled to" another component, it should be understood that there is no other component between the components.

Singular forms include plural referents unless the context clearly dictates otherwise.

In the present disclosure, the term "include" or "have" signifies the presence of a feature, number, step, operation, component, or part, or their combinations, not excluding the presence or addition of one or more other features, numbers, steps, operations, components, or parts, or their combinations.

FIG. 1a is a block diagram of a vehicle 100 according to an embodiment of the present disclosure.

The vehicle 100 may include a communication unit 110, an input unit 120, a memory 130, an output unit 140, a vehicle driving unit 150, a sensing unit 160, a controller 170, an interface unit 180, and a power supply 190.

The communication unit 110 may include one or more modules for enabling wireless communication between the vehicle 100 and an external device (e.g., a portable terminal, an external server, or another vehicle). In addition, the communication unit 110 may include one or more modules for connecting the vehicle 100 to one or more networks.

The communication unit 110 may include a broadcasting reception module 111, a wireless Internet module 112, a short-range communication module 113, a location information module 114, and an optical communication module 115.

The broadcasting reception module 111 receives a broadcast signal or broadcasting information on a broadcasting channel from an external broadcasting management server. Herein, broadcasting is radio broadcasting or TV broadcasting.

The wireless Internet module 112 is a module used for wireless Internet connectivity, which may be provided at the exterior or interior of the vehicle 100. The wireless Internet module 112 is configured to transmit and receive wireless signals through communication networks based on wireless Internet technologies.

The wireless Internet technologies include, for example, Wireless LAN (WLAN), Wireless Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 112 transmits and receives data in conformance to at least one wireless Internet technology in a range covering even Internet technologies which are not enumerated above. For example, the wireless Internet module 112 may exchange data wirelessly with an external server. The wireless Internet module 112 may receive weather information and traffic information (e.g., Transport Protocol Expert Group (TPEG) information) from an external server.

The short-range communication module 113 is used for short-range communication. The short-range communication module 113 may support short-range communication using at least one of Bluetooth™, Radio Frequency Identification (RFID), Infrared Dlta Association (IrDA), Ultra Wideband (UWB), ZigBee, Near Field Communication (NFC), Wireless Fidelity (Wi-Fi), Wi-Fi Direct, and Wireless Universal Serial Bus (Wireless USB).

The short-range communication module 113 may conduct short-range communication between the vehicle 100 and at least one external device by establishing a wireless area network. For example, the short-range communication module 113 may exchange data wirelessly with a portable terminal of a passenger. The short-range communication module 113 may receive weather information and traffic information (for example, Transport Protocol Expert Group (TPEG) information) from a portable terminal or an external server. For example, if a user is aboard the vehicle 100, a portable terminal of the user and the vehicle 100 may be paired with each other automatically or upon execution of an application by the user.

The location information module 114 is a module configured to determine a location of the vehicle 100. A major example of the location information module 114 is a Global Positioning System (GPS) module. For example, the location of the vehicle 100 may be determined using signals received from GPS satellites at the GPS module.

The optical communication module 115 may include an optical transmitter and an optical receiver.

The optical receiver may receive information by converting an optical signal to an electrical signal. The optical receiver may include a Photo Diode (PD) for receiving light. The PD may convert light to an electrical signal. For example, the optical receiver may receive information about a preceding vehicle by light emitted from a light source of the preceding vehicle.

The optical transmitter may include at least one light emitting device for converting an electrical signal to an optical signal. The light emitting device is preferably a Light Emitting Diode (LED). The optical transmitter converts an electrical signal to an optical signal, and outputs the optical signal to the outside. For example, the optical transmitter may emit an optical signal to the outside by flickering a light emitting device corresponding to a predetermined frequency. According to an embodiment, the optical transmitter may include a plurality of light emitting device arrays. According to an embodiment, the optical transmitter may be integrated with a lamp provided in the vehicle 100. For example, the optical transmitter may be at least one of a head lamp, a tail lamp, a brake lamp, a turn signal lamp, and a position lamp. For example, the optical communication module 115 may exchange data with another vehicle by optical communication.

The input unit 120 may include a driving manipulation means 121, a microphone 123, and a user input unit 124.

The driving manipulation means 121 receives a user input for driving the vehicle 100. The driving manipulation means 121 may include a steering input means 121a, a shift input means 121b, an acceleration input means 121c, and a brake input means 121d.

The steering input device 121a receives a heading input for the vehicle 100 from the user. The steering input means 121a may include a steering wheel. According to an embodiment, the steering input means 121a may be configured as a touch screen, a touchpad, or a button.

The shift input means 121b receives a parking (P) input, a drive (D) input, a neutral (N) input, and a reverse (R) input for the vehicle 100 from the user. The shift input means 121b is preferably formed into a lever. According to an embodiment, the shift input means 121b may be configured as a touch screen, a touchpad, or a button.

The acceleration input means 121c receives an acceleration input for the vehicle 100 from the user. The brake input means 121d receives a deceleration input for the vehicle 100 from the user. The acceleration input means 121c and the brake input means 121d are preferably formed into pedals. According to an embodiment, the acceleration input means 121c or the brake input means 121d may be configured as a touch screen, a touchpad, or a button.

A camera 122 is disposed at a portion inside the vehicle 100, and generates an image of the inside of the vehicle 100. For example, the camera 122 may be disposed at any of various positions including the surface of a dashboard, the surface of a roof, and a rear view mirror, and capture a passenger in the vehicle 100. In this case, the camera 122 may generate an inside image of an area including a driver's seat and a passenger seat of the vehicle 100. The inside image generated by the camera 122 may be a Two-Dimensional (2D) image and/or a Three-Dimensional (3D) image. To generate a 3D image, the camera 122 may include at least one of a stereo camera, a depth camera, and a 3D laser scanner. The camera 122 may provide its generated inside image to the controller 170 operatively coupled to the camera 122.

The controller 170 may detect various objects by analyzing inside images received from the camera 122. For example, the controller 170 may detect a gaze and/or gesture of a driver from a part corresponding to a driver's seat area in an inside image. In another example, the controller 170 may detect a gaze and/or gesture of a passenger from a part corresponding to an inside area except for the driver's seat area in the inside image. Obviously, the gazes and/or gestures of the driver and the passenger may be detected simultaneously.

The microphone 123 may process an external audio signal to electrical data. The processed data may be used in various manners according to a function being executed in the vehicle 100. The microphone 123 may convert a voice command of a user to electrical data. The converted electrical data may be provided to the controller 170.

Meanwhile, according to an embodiment, the camera 122 or the microphone 123 may be included in the sensing unit 160, instead of the input unit 120.

The user input unit 124 is configured to receive information from the user. Upon input of information through the user input unit 124, the controller 170 may control an operation of the vehicle 100 in correspondence with the input information. The user input unit 124 may include a touch input means or a mechanical input means. According to an embodiment, the user input unit 124 may be disposed in an area of a steering wheel. In this case, the driver may manipulate the user input unit 124 with his or her finger, while grabbing the steering wheel.

The input unit 120 may include a plurality of buttons or a touch sensor. It is possible to perform various input operations through the plurality of buttons or the touch sensor.

The sensing unit 160 may sense a signal related to travel of the vehicle 100. For this purpose, the sensing unit 160 may include a collision sensor, a steering sensor, a speed sensor, an inclination sensor, a weight sensor, a heading sensor, a yaw sensor, a gyro sensor, a position module, a vehicle forwarding/backwarding sensor, a battery sensor, a fuel sensor, a tire sensor, a handle rotation-based steering sensor, a vehicle internal temperature sensor, a vehicle internal humidity sensor, an ultrasonic sensor, an infrared sensor, a radar, a Light Detection And Ranging (LiDAR), and so on.

Thus, the sensing unit 160 may acquire sensing signals for vehicle collision information, vehicle heading information, vehicle location information (GPS information), vehicle angle information, vehicle speed information, vehicle acceleration information, vehicle inclination information, vehicle forwarding/backwarding information, battery information, fuel information, tire information, vehicle lamp information, vehicle internal temperature information, vehicle internal humidity information, a steering wheel rotation angle, and so on. Further, the controller 170 may generate a control signal for acceleration, deceleration, turning, and so on of the vehicle 100 based on eternal environment information acquired by at least one of the camera, the ultrasonic sensor, the infrared sensor, the radar, and the Lidar of the vehicle 100. Herein, the external environment information may be information related to various objects located within a predetermined distance range from the traveling vehicle 100. For example, the external environment information may include information about the number of obstacles located within 100 m from the vehicle 100, the distances to the obstacles, the sizes of the obstacles, and the types of the obstacles.

Meanwhile, the sensing unit 160 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and so on.

The sensing unit 160 may include a biometric sensing unit. The biometric sensing unit senses and acquires biometric information about a passenger. The biometric information may include fingerprint information, iris scan information, retina scan information, hand geometry information, facial recognition information, and voice recognition information. The biometric sensing unit may include a sensor for sensing biometric information about a passenger. Herein, the camera 122 and the microphone 123 may operate as sensors. The biometric sensing unit may acquire hand geometry information and facial recognition information through the camera 122.

The sensing unit 160 may include at least one camera 161 for capturing the outside of the vehicle 100. The at least one camera 161 may be referred to as an external camera. For example, the sensing unit 160 may include a plurality of cameras 161 disposed at different positions on the exterior of the vehicle 100. Each camera 161 may include an image sensor and an image processing module. The camera 161 may process a still image or a video acquired through the image sensor (for example, a Complementary Metal Oxide Semiconductor (CMOS) or Charged Coupled Device (CCD) image sensor). The image processing module may extract necessary information by processing the still image or video acquired through the image sensor, and provide the extracted information to the controller 170.

The camera 161 may include an image sensor (for example, a CMOS or CCD image sensor) and an image processing module. The camera 161 may also process a still image or a video acquired through the image sensor. The image processing module may process the still image or video acquired through the image sensor. The camera 161 may also acquire an image including at least one of a signal light, a traffic sign, a pedestrian, another vehicle, and a road surface.

The output unit 140 is configured to output information processed by the controller 170. The output unit 140 may include a display unit 141, an audio output unit 142, and a haptic output unit 143.

The display unit 141 may display information processed by the controller 170 on each display. For example, the display unit 141 may display vehicle-related information. The vehicle-related information may include vehicle control information for direct control of the vehicle or vehicle driving assist information for guiding driving of the driver. Also, the vehicle-related information may include vehicle state information indicating a current state of the vehicle or vehicle traveling information related to traveling of the vehicle.

The display unit 141 may include at least one of a Liquid Crystal Display (LCD), a Thin Film Transistor-Liquid Crystal Display (TFT LCD), an Organic Light Emitting Diode (OLED), a flexible display, a 3D display, and an e-ink display.

The display unit 141 may include a touch screen which forms a mutual layer structure with a touch sensor or is integrated with the touch sensor. The touch screen may serve as an output interface between the vehicle 100 and a user as well as the user input unit 124 that provides an input interface between the vehicle 100 and the user. In this case, the display unit 141 may include a touch sensor for sensing a touch on the display unit 141 in order to receive a control command in a touch manner. Thus, when the display unit 141 is touched, the touch sensor may sense the touch, and thus the controller 170 may generate a control command corresponding to the touch. Content input by a touch may be a character, a number, or an indication or selectable menu item in various modes.

Meanwhile, the display unit 141 may include a cluster so that the driver may check vehicle state information or vehicle traveling information, while driving the vehicle 100. The cluster may be positioned on the dashboard. In this case, the driver may view information displayed on the cluster, while gazing ahead of the vehicle 100.

According to an embodiment, the display unit 141 may be configured as a Head Up Display (HUD). If the display unit 141 is configured as a HUD, information may be output on a transparent display provided on a windshield. Or, the display unit 141 may include a projection module and thus output information through an image projected onto the windshield.

Meanwhile, besides the display unit 141, the vehicle 100 may further include a display device 200. The display device 200 will be described later with reference to FIG. 2a and other drawings.

The audio output unit 142 converts an electrical signal received from the controller 170 to an audio signal. For this purpose, the audio output unit 142 may include a speaker. The audio output unit 142 may output a sound corresponding to an operation of the user input unit 124.

The haptic output unit 143 generates a haptic output. For example, the haptic output unit 143 may vibrate the steering wheel, a safety belt, or a seat so that the user may recognize an output.

The vehicle driving unit 150 may control an operation of various devices of the vehicle 100. The vehicle driving unit 150 may include at least one of a power source driver 151, a steering driver 152, a brake driver 153, a lamp driver 154, an air conditioning driver 155, a window driver 156, an airbag driver 157, a sunroof driver 158, and a wiper driver 159.

The power source driver 151 may perform electronic control on a power source in the vehicle 100. The power source driver 151 may include an accelerator for increasing the speed of the vehicle 100, and a decelerator for decreasing the speed of the vehicle 100.

For example, if a fossil fuel-based engine (not shown) is a power source, the power source driver 151 may perform electronic control on the engine. Therefore, the power source driver 151 may control the output torque of the engine. If the power source driver 151 is an engine, the power source driver 151 may restrict the speed of the vehicle by limiting the engine output torque under the control of the controller 170.

In another example, if an electrical motor (not shown) is a power source, the power source driver 151 may control the motor. Thus, the rotation speed and torque of the motor may be controlled.

The steering driver 152 may include a steering apparatus. Thus, the steering driver 152 may perform electronic control on the steering apparatus in the vehicle 100. For example, the steering driver 152 may include a steering torque sensor, a steering angle sensor, and a steering motor, and a steering torque applied to the steering wheel by the driver may be sensed by the steering torque sensor. The steering driver 152 may control a steering force and a steering angle by changing the intensity and direction of current applied to the steering motor based on the speed and steering torque of the vehicle 100. Also, the steering driver 152 may determine whether the traveling direction of the vehicle is properly controlled based on information about the steering angle acquired through the steering angle sensor. Thus, the steering driver 152 may change the traveling direction of the vehicle 100. Further, the steering driver 152 may decrease a feeling of weight for the steering wheel by increasing the steering force of the steering motor during slow traveling of the vehicle 100, and increase a feeling of weight for the steering wheel by decreasing the steering force of the steering motor during fast traveling of the vehicle 100. If an autonomous driving function of the vehicle 100 is executed, the steering driver 152 may control the steering motor to exert an appropriate steering force based on a sensing signal received from the sensing unit 160 or a control signal received from the controller 170, even though the driver manipulates the steering wheel (for example, in a situation where a steering torque is not sensed).

The brake driver 153 may perform electronic control on a brake apparatus (not shown) in the vehicle 100. For example, the brake driver 153 may decrease the speed of the vehicle 100 by controlling an operation of a brake disposed at a tire. In another example, the traveling direction of the vehicle 100 may be adjusted to the left or right by differentiating operations of brakes disposed respectively at left and right tires.

The lamp driver 154 may control turn-on/turn-off of at least one lamp inside or outside the vehicle 100. The lamp driver 154 may include a lighting device. Also, the lamp driver 154 may control the intensity, direction, and so on of light from each lamp. For example, the lamp driver 154 may control a turn signal lamp, a head lamp, a brake lamp, and so on.

The air conditioning driver 155 may perform electronic control on an air conditioner in the vehicle 100. For example, if a vehicle internal temperature is high, the air conditioner may be controlled to operate and supply cool air into the vehicle 100.

The window driver 156 may perform electronic control on a window apparatus in the vehicle 100. For example, opening and closing of left and right side windows of the vehicle 100 may be controlled.

The airbag driver 157 may perform electronic control on an airbag apparatus in the vehicle 100. For example, the airbag driver 157 may control inflation of an airbag in an emergency situation.

The sunroof driver 158 may perform electronic control on a sunroof apparatus in the vehicle 100. For example, the sunroof driver 158 may control opening or closing of the sunroof.

The wiper driver 159 may perform electronic control on wipers 14a and 14b provided in the vehicle 100. For example, upon receipt of a user input commanding operation of the wipers 14a and 14b through the user input unit 124, the wiper driver 159 may electronically control the number and speed of wipes according to the user input. In another example, the wiper driver 159 may automatically drive the wipers 14a and 14b without receiving a user input by determining the amount or intensity of rain based on a sensing signal of a rain sensor included in the sensing unit 160.

Meanwhile, the vehicle driving unit 150 may further include a suspension driver (not shown). The suspension driver may perform electronic control on a suspension apparatus (not shown) in the vehicle 100. For example, if the surface of a road is rugged, the suspension driver may control the suspension apparatus to reduce jerk of the vehicle 100.

The memory 130 is electrically connected to the controller 170. The memory 130 may store basic data for a unit, control data for controlling an operation of the unit, and input and output data. The memory 130 may be any of various storage devices in hardware, such as Read Only Memory (ROM), Random Access Memory (RAM), Erasable and Programmable ROM (EPROM), flash drive, hard drive, etc. The memory 130 may store various data for overall operations of the vehicle 100, such as programs for processing or controlling in the controller 170.

The interface unit 180 may serve as paths to various types of external devices connected to the vehicle 100. For example, the interface unit 180 may include a port connectable to a portable terminal. The interface unit 180 may be connected to the portable terminal through the port. In this case, the interface unit 180 may exchange data with the portable terminal.

The interface unit 180 may receive turn signal information. The turn signal information may be a turn-on signal for a turn signal lamp for left turn or right turn, input by the user. Upon receipt of a turn-on input for a left or right turn signal lamp through the user input unit (124 in FIG. 1a) of the vehicle 100, the interface unit 180 may receive left or right turn signal information.

The interface unit 180 may receive vehicle speed information, information about a rotation speed of the steering wheel, or gear shift information. The interface unit 180 may receive the vehicle speed information, the information about a rotation speed of the steering wheel, or the gear shift information, which is sensed through the sensing unit 160 of the vehicle 100. Or the interface unit 180 may receive the vehicle speed information, the information about a rotation speed of the steering wheel, or the gear shift information from the controller 170 of the vehicle 100. The gear shift information may be information indicating a state in which a shift lever of the vehicle 100 is placed. For example, the gear shift information may be information indicating a state in which the shift lever is placed from among P, R, N, D, and first-stage to multi-stage gear states.

The interface unit 180 may receive a user input through the user input unit 124 of the vehicle 100. The interface unit 180 may receive the user input directly from the input unit 124 of the vehicle 100 or through the controller 170.

The interface unit 180 may receive information acquired from an external device. For example, when traffic light change information is received from an external server through the communication unit 110 of the vehicle 100, the interface unit 180 may receive the traffic light change information from the controller 170.

The controller 170 may provide overall control to each unit inside the vehicle 100. The controller 170 may be referred to as an Electronic Control Unit (ECU).

The controller 170 may be implemented in hardware using at least one of an Application Specific Integrated Circuit (ASIC), a Digital Signal Processor (DSP), a Digital Signal Processing Device (DSPD), a Programmlble Logic Device (PLD), a Field Programmlble Gate Array (FPGA), a processor, a controller, a micro-controller, a microprocessor, and an electrical unit for executing other functions.

The power supply 190 may supply power needed for operating each component under the control of the controller 170. Particularly, the power supply 190 may receive power from a battery (not shown) within the vehicle 100.

Meanwhile, a part of the components illustrated in FIG. 1a may not be mandatory for implementation of the vehicle 100. Accordingly, the vehicle 100 described in the present disclosure may include more or fewer components than the above enumerated ones.

Figure 1B:
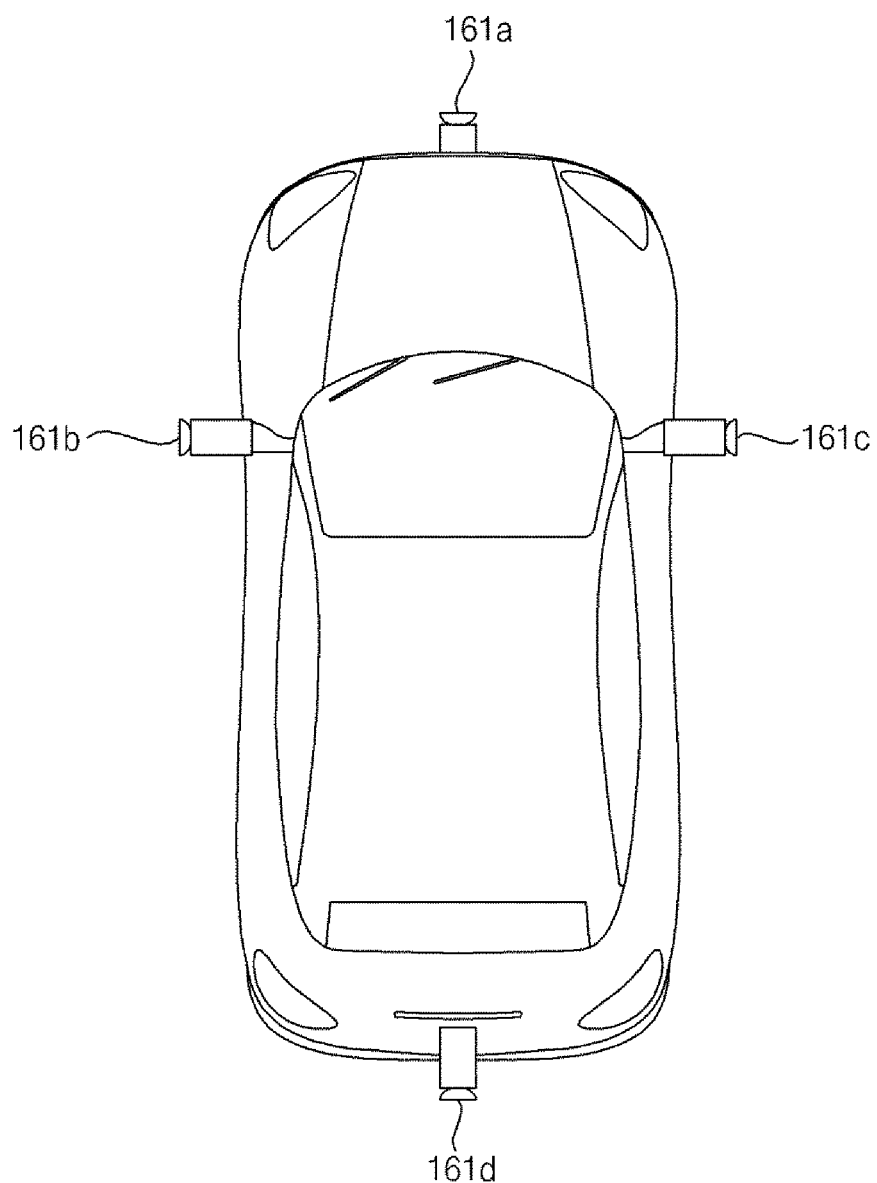
Figure 1C:
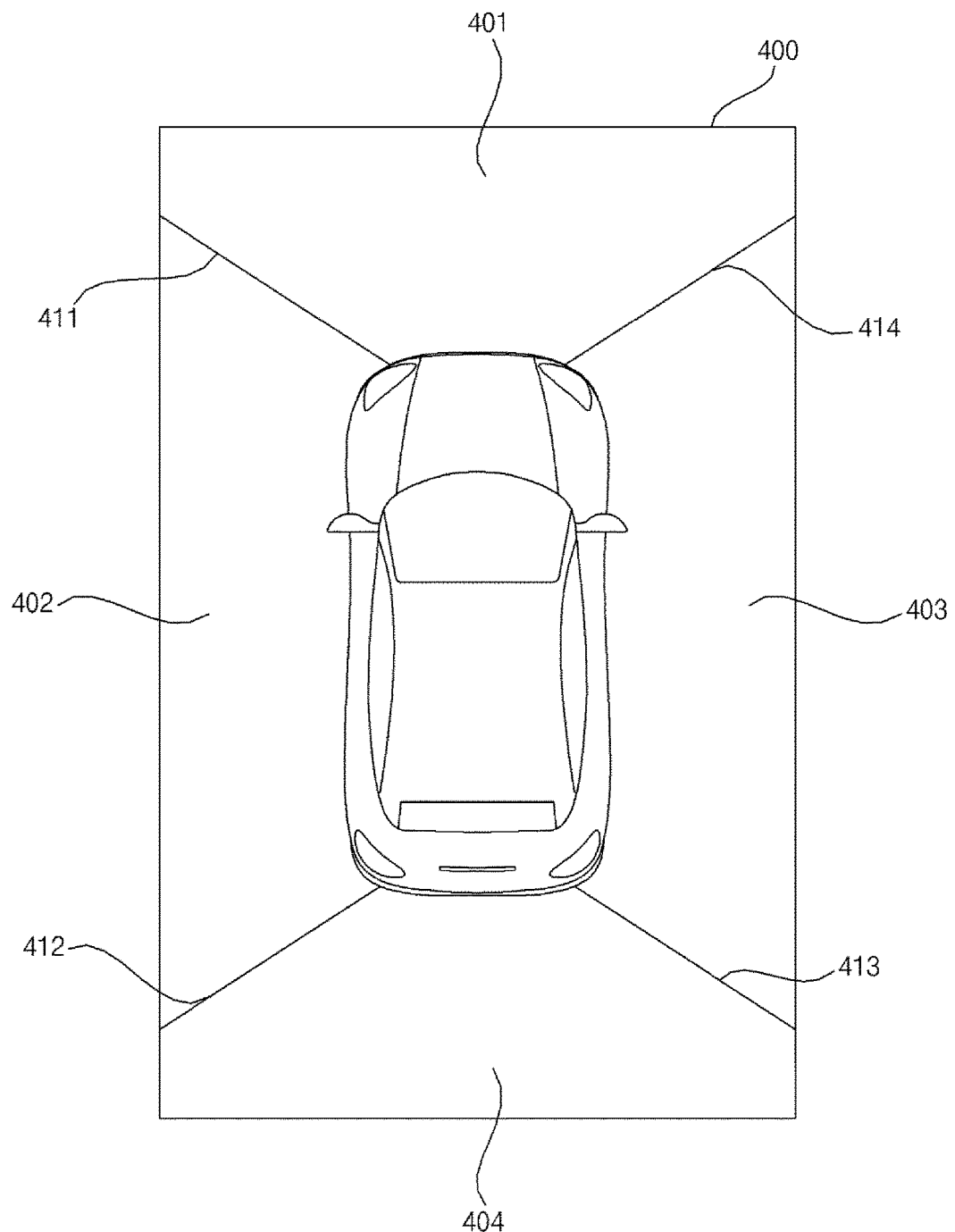

Referring to FIGS. 1b and 1c, four cameras 161a, 161b, 161c, and 161d may be installed at different positions on the exterior of the vehicle 100. Each of the four cameras 161a, 161b, 161c, and 161d may be identical to the afore-described camera 161.

FIG. 1b illustrates an example in which the plurality of cameras 161a, 161b, 161c, and 161d are arranged at the front side, left side, right side, and rear side of the vehicle 100, respectively. Each of the cameras 161a, 161b, 161c, and 161d may be included in the camera 161 illustrated in FIG. 1.

The front camera 161a may be disposed in the vicinity of the windshield, an emblem, or a radiator grill.

The left camera 161b may be disposed inside or outside a case surrounding a left side mirror. Or, the left camera 161b may be disposed in an area of the exterior of a left front door, a left rear door, or a left fender.

The right camera 161c may be disposed inside or outside a case surrounding a right side mirror. Or, the right camera 161b may be disposed in an area of the exterior of a right front door, a right rear door, or a right fender.

The rear camera 161d may be disposed in the vicinity of a back number plate or a trunk switch.

Each image captured by the plurality of cameras 161a, 161b, 161c, and 161d may be provided to the controller 170, and the controller 170 may generate an image of the surroundings of the vehicle 100 by synthesizing the images.

While FIG. 1b illustrates attachment of four cameras onto the exterior of the vehicle 100, the present disclosure is not limited to the number of cameras. Thus, more or fewer cameras may be installed at different positions from the positions illustrated in FIG. 1b.

Referring to FIG. 1c, a synthetic image 400 may include a first image area 401 corresponding to an outside image captured by the front camera 161a, a second image area 402 corresponding to an outside image captured by the left camera 161b, a third image area 403 corresponding to an outside image captured by the right camera 161c, and a fourth image area 404 corresponding to an outside image captured by the rear camera 161d. The synthetic image 400 may be called an Around View Monitoring (AVM) image.

Meanwhile, when the synthetic image 400 is generated, each of boundaries 411, 412, 413, and 414 is generated between every pair of outside images included in the synthetic image 400. These boundary parts may be naturally represented by image blending.

Meanwhile, the boundaries 411, 412, 413, and 414 may be drawn between a plurality of images. Also, a predetermined image representing the vehicle 100 may be included at the center of the synthetic image 400.

The synthetic image 400 may be displayed on the display device installed inside the vehicle 100.

Figure 2A:
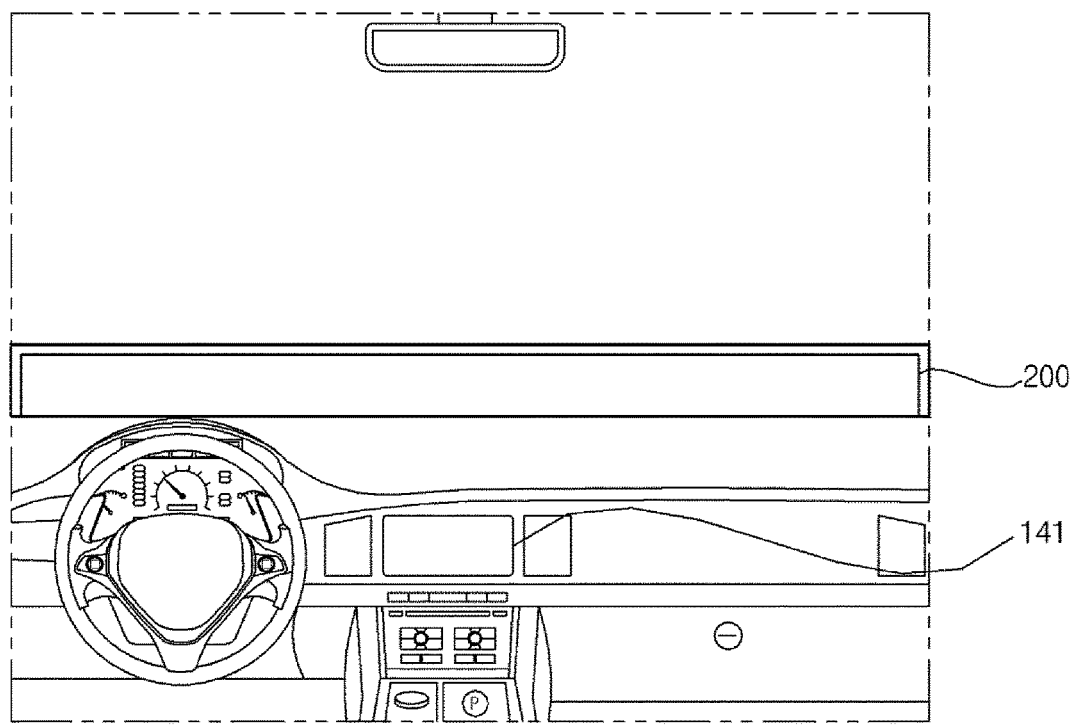
FIGS. 2a and 2b are exemplary views illustrating the interior of a vehicle according to an embodiment of the present disclosure.
Figure 2B:
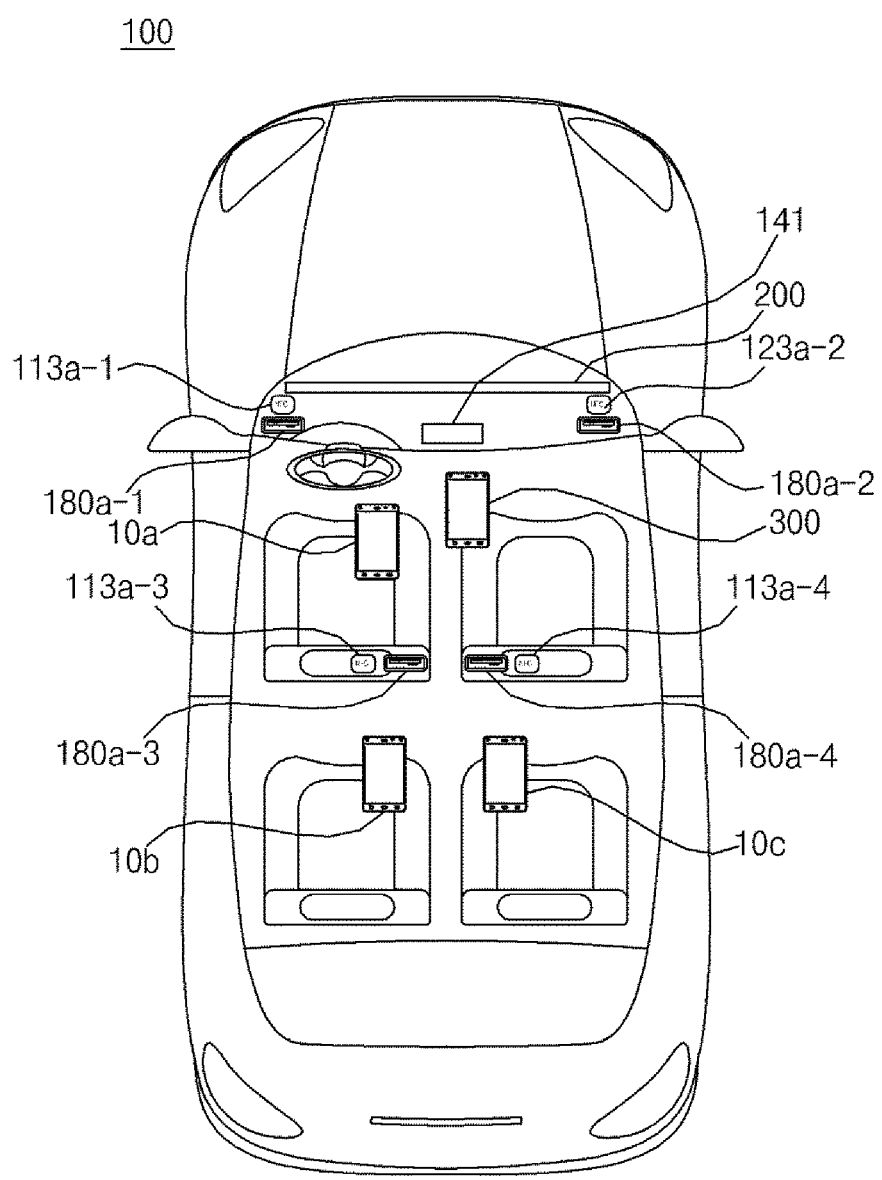

FIGS. 2a and 2b are exemplary views illustrating the interior of a vehicle according to an embodiment of the present disclosure.

FIG. 2a is an exemplary front view corresponding to the gaze of a user aboard a vehicle, and FIG. 2b is an exemplary top view illustrating seats in the vehicle.

The display device 200 mentioned before with reference to FIG. 1a may be disposed at a portion inside the vehicle.

In an embodiment, the display device 200 may be disposed on the top surface of the dashboard or under the windshield in the vehicle 100. In this case, the aspect ratio of the screen of the display device 200 may be N:1 (N is larger than 1), as illustrated in FIGS. 2a and 2b. That is, the display device 200 may include a display having a width larger than a length, and may be extended from a position in front of the driver's seat to a position in front of the passenger seat. For example, the display device 200 may be as wide as about 7/10 of the distance between left and right doors and as long as about 1/10 of the distance between the left and right doors in the vehicle 100. Further, the display unit 141 of the vehicle 100 may be installed at a portion of a center fascia.

In an embodiment, the display device 200 may display an outside image received from the camera 161. This outside image may be an image of an area hidden from the driver by the hood of the vehicle 100 or the like in the front vision of the driver. However, it is obvious to those skilled in the art that the position, size, and shape of the display device 200 are not limited to those illustrated in FIG. 2a, and thus other various modifications are possible.

Meanwhile, as illustrated in FIG. 2b, an electronic device 300 and one or more external electronic devices 10a, 10b and 10c may be located inside the vehicle 100. The electronic device 300 and the external electronic devices 10a, 10b and 10c as described in the present disclosure may all be portable devices. For example, each of electronic device 300 and the external electronic devices 10a, 10b and 10c may be any of a portable phone, a smartphone, a laptop computer, a digital broadcasting terminal, a Personal Digital Assistant (PDA), a Portable Multimedia Player (PMP), a navigator, a slate PC, a tablet PC, an ultrabook, and a wearable device.

The electronic device 300 may transmit and receive data to and from the display device 200 and/or the external electronic devices 10a, 10b, and 10c by cable or in a wired communication scheme.

In an embodiment, the electronic device 300 is capable of providing the display device 200 with an image displayed in the electronic device 300 or an execution image of an application running in the background in the electronic device 300 by establishing a wired/wireless network with the vehicle 100. That is, the electronic device 300 may share an image displayed in the electronic device 300 with the display device 200. Obviously, it is also possible to share an image displayed on the display device 200 with the electronic device 300.

In an embodiment, the electronic device 300 is capable of providing at least one of the external electronic devices 10a, 10b, and 10c with an image displayed in the electronic device 300 or an execution image of an application running in the background in the electronic device 300 by establishing a wired/wireless network with the at least one of the external electronic devices 10a, 10b, and 10c. That is, the electronic device 300 may share an image displayed in the electronic device 300 with the external electronic devices 10a, 10b, and 10c. Obviously, it is also possible to share images displayed on the external electronic devices 10a, 10b, and 10c with the electronic device 300.

In an embodiment, the electronic device 300 may relay data transmission and reception between the vehicle 100 and the external electronic devices 10a, 10b, and 10c by establishing a wired/wireless network with the vehicle 100 and the external electronic devices 10a, 10b, and 10c. For example, the electronic device 300 may provide an image displayed on the display device 200 to the external electronic devices 10a, 10b, and 10c, or provide images displayed in the external electronic devices 10a, 10b, and 10c to the display device 200.

Meanwhile, an operation of sharing an image between devices may be referred to as 'mirroring' in the present disclosure. Further, an image that one device shares with another device may be referred to as a 'mirrored image'.

Referring to FIG. 2b, the vehicle 100 may be provided with at least one NFC module 113a-1, 113a-2, 113a-3, and 113a-4, and at least one USB port 180a-1, 180a-2, 180a-3, and 180a-4. The NFC modules 113a-1, 113a-2, 113a-3, and 113a-4 may be included in the short-range communication module 113 illustrated in FIG. 1a, and the USB ports 180a-1, 180a-2, 180a-3, and 180a-4 may be included in the interface unit 180 illustrated in FIG. 1a.

In an embodiment, upon occurrence of a tagging event between the electronic device 300 and at least one of the NFC modules 113a-1, 113a-2, 113a-3, and 113a-4, the electronic device 300 may enter a mirroring mode. A mirroring execution command may be recorded in the NFC modules 113a-1, 113a-2, 113a-3, and 113a-4. When the electronic device 300 is tagged with the NFC modules 113a-1, 113a-2, 113a-3, and 113a-4, the electronic device 300 may enter the mirroring mode by reading the mirroring execution command recorded in the NFC modules 113a-1, 113a-2, 113a-3, and 113a-4.

In an embodiment, upon occurrence of a connection event between the electronic device 300 and at least one of the USB ports 180a-1, 180a-2, 180a-3, and 180a-4, the electronic device 300 may enter the mirroring mode. The vehicle 100 may determine whether the electronic device 100 supports the mirroring function based on device information about the electronic device 300, received from the USB port 180a-1, 180a-2, 180a-3, or 180a-4. If the electronic device 100 supports the mirroring function, the vehicle 100 may transmit the mirroring execution command through the USB port 180a-1, 180a-2, 180a-3, or 180a-4. Upon receipt of the mirroring execution command through the USB port 180a-1, 180a-2, 180a-3, or 180a-4, the electronic device 300 may enter the mirroring mode.

When entering the mirroring mode, the electronic device 300 may share an image with the display device 200 and/or the external electronic devices 10a, 10b, and 10c, or display images shared from the display device 200 and/or the external electronic devices 10a, 10b, and 10c, as described before.

Unlike the external electronic devices 10a, 10b, and 10c, the electronic device 300 may be a device other than a portable device, which is fixed at a specific position in the vehicle 100 and connected to the display device 200. For example, the electronic device 300 may be an Audio Video Navigator (AVN) or telematics terminal which is fixedly engaged with the center fascia of the vehicle 100.

Meanwhile, the electronic device 300 may perform mirroring in a one-to-one connection to only one of the display device 200 and the external electronic devices 10a, 10b, and 10c or in a one-to-N(N is an integer greater than 2) connection to at least two of the display device 200 and the external electronic devices 10a, 10b, and 10c.

Figure 3:
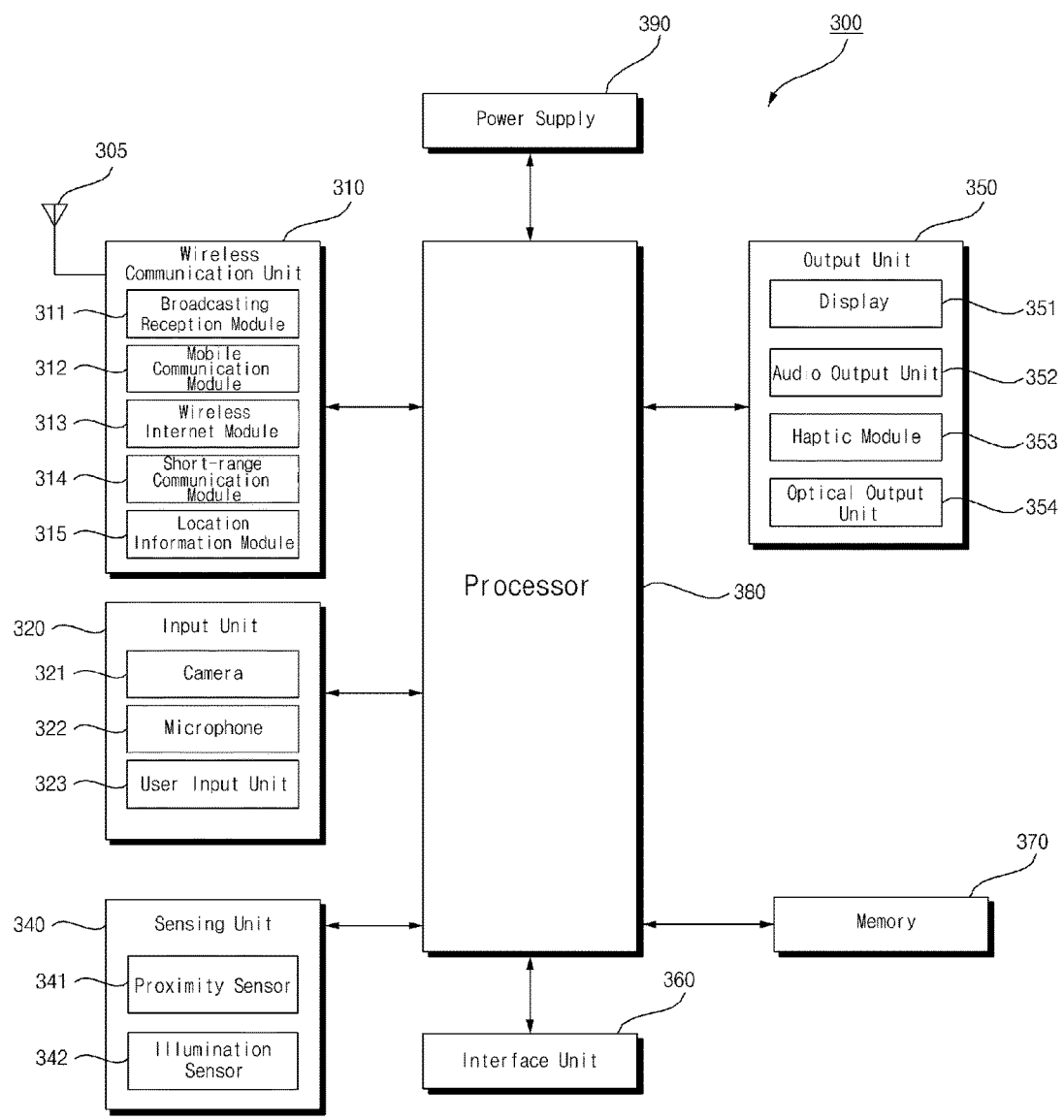
FIG. 3 is a block diagram of an electronic device illustrated in FIG. 2.

FIG. 3 is a block diagram of the electronic device 300 illustrated in FIG. 2.

Referring to FIG. 3, the electronic device 300 may include a wireless communication unit 310, an input unit 320, a sensing unit 340, an output unit 350, an interface unit 360, a memory 370, a processor 380, and a power supply 390. The components illustrated in FIG. 3 may not be mandatory for implementation of the electronic device. Accordingly, the electronic device 300 described in the present disclosure may include more or fewer components than the above enumerated ones.

More specifically, among the components, the wireless communication unit 310 may include one or more modules for enabling wireless communication between the electronic device 300 and the vehicle 100, between the electronic device 300 and the external electronic devices 10a, 10b, and 10c, or between the electronic device 300 and an external server. In addition, the wireless communication unit 310 may include one or more modules for connecting the electronic device 300 to one or more networks.

The wireless communication unit 310 may include at least one of a broadcasting reception module 311, a mobile communication module 312, a wireless Internet module 313, a short-range communication module 314, and a location information module 315.

The input unit 320 may include a camera 321 or a video input unit for receiving an image signal, a microphone 322 or an audio input unit for receiving an audio signal, and a user input unit 323 (e.g., a touch key, a mechanical key, etc.) for receiving information from a user. Voice data or image data collected by the input unit 320 may be analyzed and thus processed as a control command of the user.

The sensing unit 340 may include at least one sensor for sensing at least one of information in the electronic device, information about the surroundings of the electronic device, and user information. For example, the sensing unit 340 may include at least one of a proximity sensor 341, an illumination sensor 342, a touch sensor, an acceleration sensor, a magnetic sensor, a gravity sensor (G-sensor), a gyroscope sensor, a motion sensor, a Red, Green, and Blue (RGB) sensor, an InfraRed (IR) sensor, a fingerprint sensor, an ultrasonic sensor, an optical sensor (e.g., the camera 321), and the microphone 322. Meanwhile, the electronic device disclosed in the present disclosure may use information sensed by at least two of these sensors in combination.

The output unit 350 is used to generate a visual output, an acoustic output, or a haptic output, and may include at least one of a display 351, an audio output unit 352, a haptic module 353, and an optical output unit 354. The display 351 may include a touch screen which forms a mutual layer structure with a touch sensor or is integrated with the touch sensor. The touch screen may serve as an output interface between the electronic device 300 and a user as well as the user input unit 323 that provides an input interface between the electronic device 300 and the user.

The interface unit 360 serves as paths to various types of external devices connected to the electronic device 300. This interface unit 360 may include at least one of a wired/wireless headset port, an external charger port, a wired/wireless data port, a memory card port, a port for connecting to a device with an identification module, an audio Input/Output (I/O) port, a video I/O port, and an earphone port. The electronic device 300 may perform an appropriate control operation related to a connected external device in correspondence with the connection of the external device to the interface unit 360.

Further, the memory 370 stores data supporting various functions of the electronic device 300. The memory 370 may store a plurality of application programs (or applications) executed in the electronic device 300, data for operations of the electronic device 300, and control commands. At least a part of the application programs may be downloaded from an external server by wireless communication. Further, at least a part of the application programs may already exist for basic functions (e.g., call termination, call origination, message reception, and message transmission) of the electronic device 300, before the electronic device 300 is put to the market. Meanwhile, the application programs may be stored in the memory 370, installed in the electronic device 300, and executed to perform operations (or functions) of the electronic device 300 by the processor 380.

Besides operations related to the application programs, the processor 380 generally provides overall control to the operations of the electronic device 300. The processor 380 may provide or process appropriate information or functions to the user by processing signals, data, information, and so on received from or transmitted to the above-described components, or executing the application programs stored in the memory 370.

Further, the processor 380 may control at least a part of the components described with reference to FIG. 3 to execute the application programs stored in the memory 370. Further, the processor 380 may operate at least two of the components included in the electronic device 300 in combination in order to execute the application programs.

The power supply 390 receives external power and/or internal power, and supplies the received power to each component of the electronic device 300, under the control of the processor 380. The power supply 390 includes a battery, and the battery may be a built-in or replaceable battery.

At least a part of the above components may operate in cooperation with each other in order to perform operations, control, or control methods of the electronic device according to various embodiments of the present disclosure. Further, the operations, control, or control methods of the electronic device may be implemented in the electronic device by executing at least one application program stored in the memory 370.

Before a description of various embodiments of the present disclosure implemented through the above-described electronic device 300, the foregoing components will be described in greater detail with reference to FIG. 3.

First, regarding the wireless communication unit 310, the broadcasting reception module 311 of the wireless communication unit 310 receives a broadcast signal and/or broadcasting information on a broadcasting channel from an external broadcasting management server. The broadcasting channel may be any of satellite channels and terrestrial channels. For simultaneous reception of broadcasting on at least two broadcasting channels or switching between broadcasting channels, two or more broadcasting reception modules may be provided in the mobile terminal 300.

The mobile communication module 312 transmits and receives a wireless signal to and from at least one of a Base Station (BS), an external terminal, and a server through a mobile communication network built in conformance to a mobile communication standard or mobile communication scheme (e.g., Global System for Mobile communication (GSM), Code Division Multiple Access (CDMA), Code Division Multiple Access 2000 (CDMA2000), Enhanced Voice-Dlta Optimized or Enhanced Voice-Dlta Only (EV-DO), Wideband CDMA (WCDMA), High Speed Downlink Packet Access (HSPDA), High Speed Uplink Packet Access (HSUPA), Long Term Evolution (LTE), Long Term Evolution-Advanced (LTE-A), or the like).

The wireless signal may include a voice call signal, a video call signal, or various types of data related to transmission and/or reception of text/multimedia messages.

The wireless Internet module 313 is a module used for wireless Internet connectivity, which may be provided at the exterior or interior of the electronic device 300. The wireless Internet module 313 is configured to transmit and receive wireless signals through communication networks based on wireless Internet technologies.

The wireless Internet technologies include, for example, WLAN, Wi-Fi, Wi-Fi Direct, DLNA, WiBro, WiM1X, HSDPA, HSUPA, LTE, and LTE-A. The wireless Internet module 313 transmits and receives data in conformance to at least one wireless Internet technology in a range covering even Internet technologies which are not enumerated above.

The wireless Internet module 313 that provides wireless Internet connectivity through the mobile communication network may be understood as a kind of the mobile communication module 312, in that a wireless Internet connection based on WiBro, HSDPA, HSUPA, GSM CDMA WCDMA, LTE, LTE-A, or the like is established through a mobile communication network.

The short-range communication module 314 is used for short-range communication. The short-range communication module 314 may support short-range communication using at least one of Bluetooth™, RFID, IrD1, UWB, ZigBee, NFC, Wi-Fi, Wi-Fi Direct, and Wireless USB.

The short-range communication module 314 may support wireless communication between the electronic device 300 and the external electronic devices 10a, 10b, and 10c or between the electronic device 300 and the vehicle 100 through a wireless area network. The short-range wireless communication network may be a wireless personal area network.

Herein, the electronic device 300 may be a wearable device (e.g., a smart watch, smart glasses, or a Head-Mounted Display (HMD)) capable of exchanging data with the external electronic devices 10a, 10b, and 10c according to the present disclosure. The short-range communication module 314 may recognize the external electronic devices 10a, 10b, and 10c capable of communicating with the electronic device 300 around the electronic device 300.

Further, if the recognized external electronic devices 10a, 10b, and 10c have already been authorized to communicate with the electronic device 300 according to the present disclosure, the processor 380 may transmit at least a part of data processed by the electronic device 300 to the external electronic devices 10a, 10b, and 10c through the short-range communication module 314. For example, upon receipt of a message at the electronic device 300, the user may check the received message through the external electronic devices 10a, 10b, and 10c.

The location information module 315 is a module configured to determine a location (or current location) of the electronic device. A major example of the location information module 315 is a GPS module or a WiFi module. For example, if the GPS module is used, the electronic device may determine its location using signals received from GPS satellites. In another example, if the Wi-Fi module is used, the electronic device may determine its location based on information about a wireless Access Point (AP) that transmits or receives a wireless signal to or from the Wi-Fi module. Alternatively or additionally, the location information module 315 may execute a function of the other modules of the wireless communication unit 310 to acquire data of the location of the electronic device, when needed. The location information module 315 is a module configured to determine a location (or current location) of the electronic device, not limited to a module that directly calculates or determines a location of an electronic device.

The input unit 120 may be used to receive image information (or signal), audio information (or signal), data, or information from a user. To receive image information, the electronic device 300 may be provided with one or more cameras 321. The cameras 321 process video frames of still images or videos acquired from image sensors in a video call mode or a capture mode. The processed video frames may be displayed on the display 351 or stored in the memory 370. Meanwhile, the plurality of cameras 321 in the electronic device 300 may be arranged in a matrix, and a plurality of pieces of image information having various angles or focuses may be input through the cameras 321 in the electronic device 300. Further, the plurality of cameras 321 may be arranged in a stereo structure to acquire left and right images and thus render a 3D image.

The microphone 322 processes an external audio signal to electrical voice data. The processed voice data may be used in various manners according to a function (or application program) being executed in the electronic device 300. Meanwhile, various noise cancellation algorithms for cancelling noise produced during input of an external audio signal may be performed in the microphone 322.

The user input unit 323 is configured to receive information from the user. Upon input of information through the user input unit 323, the processor 380 may control an operation of the electronic device 300 in correspondence with the input information. The user input unit 323 may include a mechanical input means (or mechanical keys such as a button disposed on the front, rear, or side surface of the electronic device 300, a dome switch, a jog wheel, a jog switch, etc.), and a touch input means. For example, the touch input means may include a virtual key, a soft key, or a visual key displayed on a touch screen for processing in software, or a touch key disposed in a part other than the touch screen. Meanwhile, the virtual key or the visual key may be displayed in various forms on the touch screen. For example, the virtual key or the visual key may be graphics, text, an icon, a video, or a combination thereof.

The sensing unit 340 senses at least one of information in the electronic device, information about the surroundings of the electronic device, and user information, and generates a sensing signal corresponding to the information. The processor 380 may control driving or operation of the electronic device 300, or perform data processing, a function, or an operation related to an application program installed in the electronic device 300, based on the sensing signal. Major ones of various sensors that may be included in the sensing unit 340 will be described in greater detail.

First, the proximity sensor 341 is a sensor that detects an object approaching a predetermined detection surface or the presence or absence of a nearby object by means of electromagnetic force or IR light without mechanical contact. The proximity sensor 341 may be disposed in an internal area of the electronic device surrounded by the aforedescribed touch screen, or in the vicinity of the touch screen.

For example, the proximity sensor 341 may be a transmissive optoelectronic sensor, a direct reflective optoelectronic sensor, a mirror reflective optoelectronic sensor, a high-frequency oscillation proximity sensor, a capacitive proximity sensor, a magnetic proximity sensor, an IR proximity sensor, or the like. If the touch screen is a capacitive type, the proximity sensor 341 may be configured to detect the proximity of a conductive object based on a variation in an electrical field, caused by the proximity of the object. In this case, the touch screen (or touch sensor) itself may be classified as a proximity sensor.

For the convenience of description, an action of placing an object over the touch screen without touching the touch screen to thereby enable sensing of the presence of the object over the touch screen is referred to as a "proximity touch", whereas an action of actually contacting an object on the touch screen is referred to as a "contact touch".

A position of a proximity touch of an object over the touch screen refers to a vertical position of the object corresponding to the touch screen. The proximity sensor 341 may sense a proximity touch, a proximity touch pattern (e.g., a proximity touch distance, a proximity touch direction, a proximity touch speed, a proximity touch time, a proximity touch position, a proximity touch shift state, etc.). Meanwhile, the processor 380 may process the proximity touch sensed by the proximity sensor 341, and data (or information) corresponding to the proximity touch pattern. Further, the processor 380 may control the electronic device 300 to process different operations or data (or information) depending on whether a touch on the same point of the display 351 including the touch screen is a proximity touch or a contact touch.

A touch sensor senses a touch (or touch input) applied to the touch screen (or the display 351), using at least one of a variety of touch schemes such as a resistive type, a capacitive type, an IR type, an ultrasonic type, a magnetic field type, and so on.

For example, the touch sensor may be configured to convert a variation of pressure applied to or capacitance generated at a specific part of the touch screen to an electrical input signal. The touch sensor may also be configured to sense the position, area, pressure, capacitance, and so on of a touch applied onto the touch screen by a touch object. The touch object is an object used to apply a touch input to the touch sensor. The touch object may be, for example, a finger, a touch pen, a stylus pen, a pointer, or the like.

When a touch input is sensed by the touch sensor, a signal(s) corresponding to the touch input is transmitted to a touch controller. The touch controller may process the received signal(s), and then transmit corresponding data to the processor 380. Accordingly, the processor 380 may sense which area of the display 351 has been touched. Herein, the touch controller may be a component configured separately from the processor 380, or the processor 380 itself.

Meanwhile, the processor 380 may execute the same or different control according to the type of a touch object that touches the touch screen (or a touch key provided outside the touch screen). Whether to execute the same or different control according to the touch object may be decided based on a current operating state of the electronic device 300 or a currently executed application program.

Meanwhile, the touch sensor and the proximity sensor may be implemented independently or in combination, to sense various types of touches such as a short (or tap) touch, a long touch, a multi-touch, a drag touch, a flick touch, a pinch-in touch, a pinch-out touch, a swipe touch, and a hovering touch.

The ultrasonic sensor may sense position information about a touch object, using ultrasonic waves. The processor 380 may calculate the position of a wave generation source based on information sensed by the optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated based on this property. More specifically, the position of the wave generation source may be calculated using the time difference from the time that the ultrasonic wave reaches the sensor based on the light as a reference signal.

Meanwhile, the camera 321 as a component of the input unit 320 includes at least one of a camera sensor (CCD, CMOS, or the like), a photo sensor (or image sensor), and a laser sensor.

Implementation of the camera 321 with the laser sensor may allow detection of a touch of a touch object (e.g., a user's finger) on a 3D stereoscopic image.

The display 351 displays (outputs) information processed in the electronic device 300. For example, the display 351 may display execution screen information of an application program executed in the electronic device 300 or User Interface (UI) and Graphic User Interface (GUI) information based on the execution screen information.

The audio output unit 352 may output audio data received from the wireless communication unit 310 or stored in the memory 370 in a call signal reception mode, a call mode, a recording mode, a voice recognition mode, a broadcasting reception mode, or the like. The audio output unit 352 outputs an audio signal (e.g., a call signal reception sound, a message reception sound, or the like) related to a function executed by the electronic device 300. The audio output unit 352 may include a receiver, a speaker, a buzzer, and so on.

The haptic module 353 generates various tactile effects that a user feels. A typical example of a tactile effect generated by the haptic module 353 may be vibration. The strength, pattern, and the like of the vibration generated by the haptic module 353 may be controlled by user selection or a setting of the controller. For example, the haptic module 353 may output different vibrations in combination or sequentially.

Besides vibration, the haptic module 353 may generate various other tactile effects, including an effect by stimulation such as a pin array that moves vertically with respect to the contact surface of skin, a spray force or suction force of air through a spray or suction opening, a touch onto the skin, a contact of an electrode, electrostatic force, an effect by reproducing the sense of cold and warmth using an element that can absorb or generate heat, and so on.

The haptic module 353 may also be configured to allow the user to feel a tactile effect through a muscle sensation such as the user's fingers or arm, as well as transferring the tactile effect through direct contact. Two or more haptic modules 353 may be provided according to the configuration specification of the electronic device 300.

The optical output unit 354 outputs a signal indicating an event occurrence by light from a light source. Examples of events generated in the electronic device 300 may include message reception, call signal reception, a missed call, an alarm, a schedule notice, email reception, information reception through an application, and so on.

A signal output from the optical output unit 354 may be configured by emitting monochromatic light or light with a plurality of colors in the electronic device. The signal output may be terminated as the electronic device senses that the user has checked the generated event.

The interface unit 360 serves as a path to all external devices connected to the electronic device 300. The interface unit 360 receives data or power from an external device and provides the data or power to each component of the electronic device 300, or transmit internal data of the electronic device 300 to the external device. For example, the interface unit 360 may include a wired/wireless headset port, an external charger port, a wired/wireless data port, a memory card port, a port for connecting to a device having an identification module, an audio I/O port, a video I/O port, an earphone port, and so on.

The identification module may be a chip that stores various pieces of information for authenticating the authority of using the electronic device 300, and may include a User Identity Module (UIM), a Subscriber Identity Module (SIM), a Universal Subscriber Identity Module (USIM), and so on. In addition, the device having the identification module (hereinafter, referred to as an 'identification device') may take the form of a smart card. Accordingly, the identification device may be connected to the terminal 300 via the interface unit 360.

Further, when the electronic device 300 is connected to an external cradle, the interface unit 360 may serve as a path in which power is transferred from the cradle to the electronic device 300, or a path in which various user-input command signals are transmitted from the cradle to the electronic device 300. The various command signals or power input from the cradle may serve as signals by which the electronic device 300 recognizes that the electronic device 300 has been properly mounted on the cradle.

The memory 370 may store programs for operations of the processor 380 and temporarily store input/output data (e.g., a phonebook, messages, still images, videos, and so on). The memory 370 may store data related to various patterns of vibrations and sounds which are output in response to touch inputs to the touch screen.

The memory 370 may include at least one of storage medium types including flash memory, hard disk, Solid State Disk (SSD), Silicon Disk Drive (SDD), a multimedia card micro type, a card-type memory (e.g., Secure Digital (SD), eXtreme Digital (XD), or the like), Random Access Memory (RAM), Static Random Access Memory (SRAM), Read-Only Memory (ROM), Electrically Erasable Programmable Read-Only Memory (EEPROM), Programmable Read-Only memory (PROM), magnetic memory, magnetic disk, and optical disk. The electronic device 300 may also operate in relation to a Web storage that performs the storage function of the memory 170 over the Internet.

As described before, the processor 380 is a hardware component, which provides overall control to the electronic device 300. For example, if a state of the electronic device 300 satisfies a predetermined condition, the processor 300 may execute or release a locking function of restricting the user from inputting control commands to applications.

Further, the processor 380 may control and process a voice call, data transmission, a video call, and so on, or may perform a pattern recognition operation for recognizing a handwriting input or a drawing input on the display 351 including the touch screen. Further, to implement various embodiments as set for below in the electronic device 300 according to the present disclosure, the processor 280 may control one or more of the above-described components in combination.

The power supply 390 receives external power or internal power and supplies power required for operating each component under the control of the processor 380. The power supply 390 includes a battery. The battery may be a chargeable built-in type. For charging, the battery may be detachably engaged with the body of the terminal.

Figure 4:
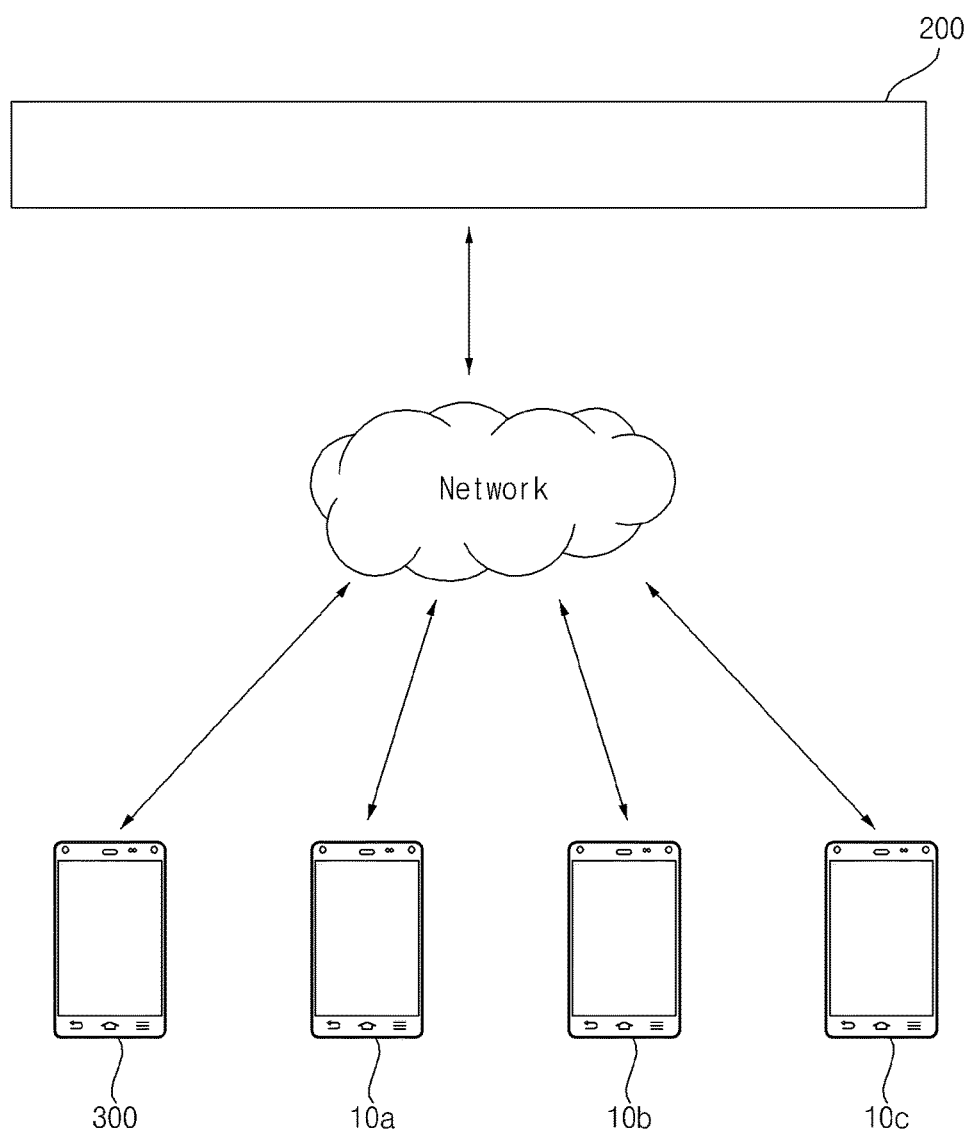
FIG. 4 is an exemplary schematic view illustrating the concept of an environment of an image sharing system according to an embodiment of the present disclosure.

FIG. 4 is an exemplary schematic view illustrating the concept of an environment of an image sharing system according to an embodiment of the present disclosure.

Referring to FIG. 4, the image sharing system includes the display device 200, the electronic device 300, and the at least one external electronic device 10a, 10b, and 10c. For the convenience of description, it is assumed herein that the three external electronic devices 10a, 10b, and 10c are located inside the vehicle 100. The external electronic devices 10a, 10b, and 10c are sequentially referred to as a first external electronic device 10a, a second external electronic device 10b, and a third external electronic device 10c. It is also assumed that the electronic device 300 and the plurality of external electronic devices 10a, 10b, and 10c are all portable terminals.

The display device 200, the electronic device 300, and the plurality of external electronic devices 10a, 10b, and 10c may conduct data communication with one another through a network. The network may include at least one of a mobile communication network, a short-range wireless communication network, a wired Internet, and a wireless Internet.

In an embodiment, the display device 200 may generate a mirrored image list, using images shared from the electronic device 300 and the plurality of external electronic devices 10a, 10b, and 10c, and display the generated mirrored image list on a screen of the display device 200. For example, the mirrored image list may include a mirrored image of the electronic device 300, a mirrored image of the first external electronic device 10a, a mirrored image of the second external electronic device 10b, and a mirrored image of the third external electronic device 10c.

The mirrored image of the electronic device 300 is an image that the display device 200 has received from the electronic device 300. The mirrored image of the electronic device 300 may be a current image being displayed on the electronic device 300 or an execution image of an application being executed in the background in the electronic device 300. In addition, a mirrored image of an external electronic device 10 is an image that the display device 200 has received from the external electronic device 10. The mirrored image of the external electronic device 10 may be a current image being displayed on the external electronic device 10 or an execution image of an application being executed in the background in the external electronic device 10.

Figure 5:
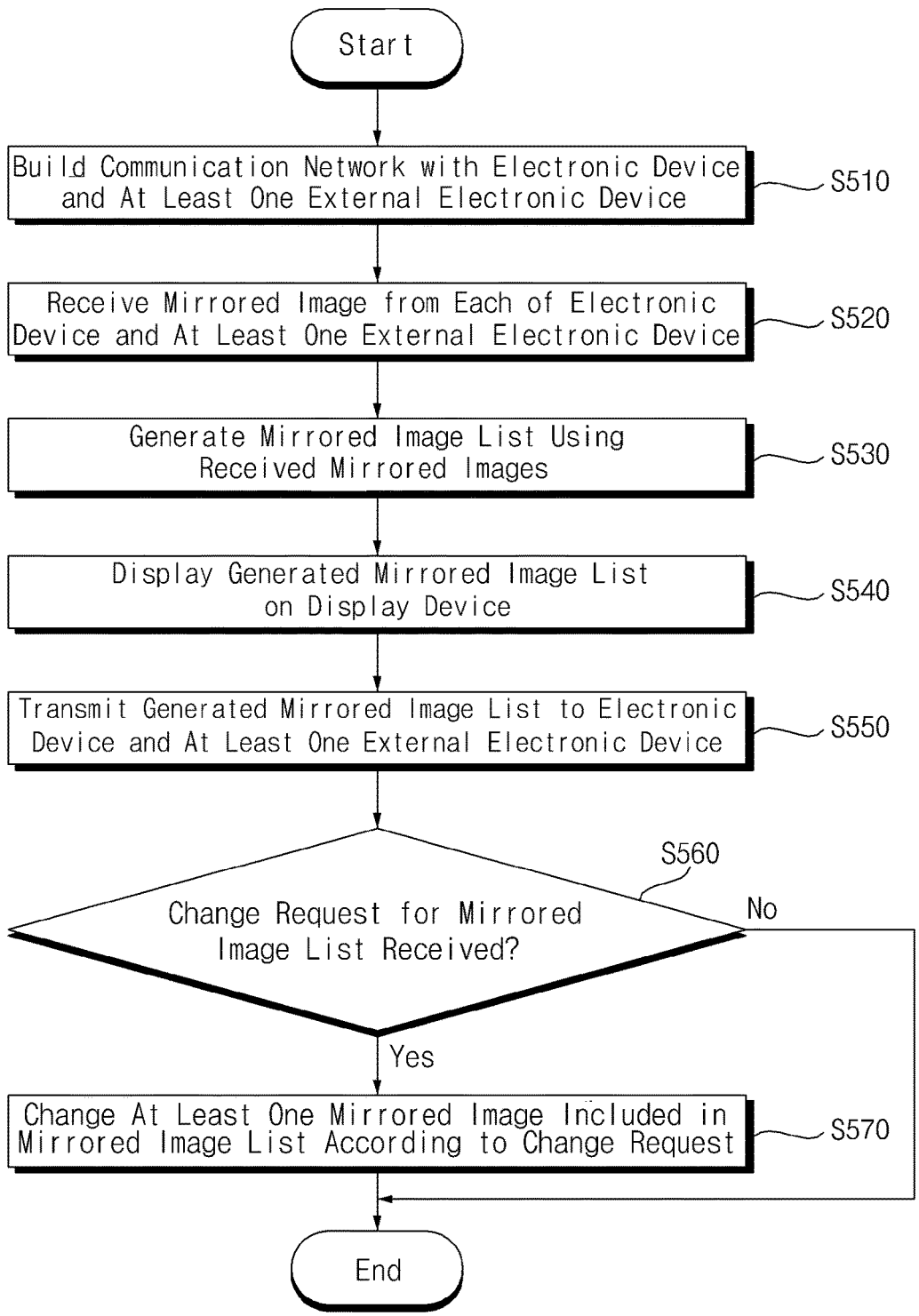
FIG. 5 is a flowchart illustrating an exemplary procedure for displaying a mirrored image list on a display device by a vehicle according to an embodiment of the present disclosure.

FIG. 5 is a flowchart illustrating an exemplary procedure S500 for displaying a mirrored image list on the display device 200 by the vehicle 100 according to an embodiment of the present disclosure.

In step S510, the vehicle 100 may build a communication network with the electronic device 300 and the at least one external electronic device 10a, 10b and 10c. Herein, the electronic device 300 may be a non-portable device such as an AVN or telematics terminal fixedly installed at a portion inside the vehicle 100, or a portable device such as a smartphone. Further, each of the external electronic devices may be a portable device such as a smartphone inside the vehicle 100.

The communication network may include at least one of a wired network and a wireless network. For example, wired communication connections between the vehicle 100 and the electronic device 300 and the at least one external electronic device 10a, 10b and 10c may be established by the interface unit 160 supporting High-Definition Multimedia Interface (HDMI). In another example, wireless communication connections between the vehicle 100 and the electronic device 300 and the at least one external electronic device 10a, 10b and 10c may be established by the communication unit 110 supporting a wireless communication protocol such as WiFi, WiFi Direct, IR communication, Zigbee, NFC, RFID, Bluetooth, or UWB.

Meanwhile, the vehicle 100 may determine the number of the at least one external electronic device 10a, 10b and 10c connected to the communication network. For example, as illustrated in FIG. 4, the vehicle 100 may determine the number of the external electronic devices connected to the communication network, using device information received from each of the three external electronic devices 10a, 10b and 10c.

In addition, the vehicle 100 may determine the position of the at least one external electronic device 10a, 10b and 10c connected to the communication network. For example, the vehicle 100 may measure the strengths of wireless signals received from the at least one external electronic device 10a, 10b and 10c, and determine areas in which the specific external electronic devices are located inside the vehicle 100, using the measured strengths. In another example, if the first external electronic device 10a is tagged to the second NFC module 113a-2 illustrated in FIG. 2b, the vehicle 100 may determine that the first external electronic device 10a is located in an area corresponding to the passenger seat.

In step S520, the vehicle 100 may receive a mirrored image from each of the electronic device 300 and the at least one external electronic device 10a, 10b and 10c through the communication network. Specifically, the vehicle 100 may receive a mirrored image of the electronic device 300, a mirrored image of the first external electronic device 10a, a mirrored image of the second external electronic device 10b, and a mirrored image of the third external electronic device 10c.

In an embodiment, the vehicle 100 may receive information about applications installed in at least one of the electronic device 300 and the at least one external electronic device 10a, 10b and 10c in step S520. For example, the vehicle 100 may receive at least one of a list of applications installed in the electronic device 300, a list of applications installed in the first external electronic device 10a, a list of applications installed in the second external electronic device 10b, and a list of applications installed in the third external electronic device 10c.

In step S530, the vehicle 100 may generate a mirrored image list, using the received mirrored images. For example, the vehicle 100 may generate a mirrored image list including at least one of the mirrored image of the electronic device 300, the mirrored image of the first external electronic device 10a, the mirrored image of the second external electronic device 10b, and the mirrored image of the third external electronic device 10c.

Meanwhile, upon receipt of a plurality of mirrored images in step S520, the vehicle 100 may arrange the plurality of mirrored images in a predetermined rule. For example, the vehicle 100 may arrange the mirrored image of the electronic device 200 at the leftmost side, and the mirrored image of each of the at least one external electronic device 10a, 10b and 10c at the right side relative to the mirrored image of the electronic device 300. In another example, the vehicle 100 may arrange a mirrored image received from an external electronic device nearer to the driver's seat at a further left side.

In step S540, the vehicle 100 may display the generated mirrored image list on the display device 200. In this case, the vehicle 100 may divide the entire screen of the display device 200 into a plurality of parts according to the number of mirrored images included in the mirrored image list. In this case, the divided plurality of screens may not overlap with each other.

For example, if the mirrored image list includes a mirrored image of the electronic device 300, a mirrored image of the first external electronic device 10a, a mirrored image of the second external electronic device 10b, and a mirrored image of the third external electronic device 10c, the vehicle 100 may divide the entire screen of the display device 200 into a total of four or more parts.

In addition, the vehicle 100 may display one of the mirrored images included in the mirrored image list on each of the plurality of divided screens. For example, the vehicle 100 may display traveling state information (e.g., a speed, fuel amount, Revolution Per Minute (RPM), and cooling water temperature) about the vehicle 100 in a predetermined area of the screen of the display device 200, and the mirrored image list in the remaining area other than the predetermined area.

In step S550, the vehicle 100 may transmit the generated mirrored image list to at least one of the electronic device 300 and the at least one external electronic device 10a, 10b, and 10c.

In an embodiment, the electronic device 300 may display the mirrored image list received from the vehicle 100 in at least a part of the display of the electronic device 300. Thus, the user of the electronic device 300 may readily view the screen of an external electronic device located inside the vehicle 100 by the mirrored image list displayed on the display 351 of the electronic device 300. Obviously, each of the external electronic devices 10a, 10b, and 10c may also display the mirrored image list received from the vehicle 100 on a part of the screen of the external electronic device.

While step S540 is shown in FIG. 5 as preceding step S550, the sequence is exemplary. Thus, steps S540 and S550 may be performed simultaneously, or step S550 may be performed before step S540.

In step S560, the vehicle 100 may determine whether a change request for the mirrored image list has been received from at least one of the electronic device 300 and the at least one external electronic device 10a, 10b, and 10c. The change request for the mirrored image list may be a request for switching at least one of the mirrored images included in the mirrored image list to another mirrored image, or a request for changing the size or arranged sequence of at least one mirrored image. Upon receipt of the change request, the vehicle 100 may perform step S570.

In step S570, the vehicle 100 may change at least one mirrored image included in the mirrored image list according to the change request received in step S560.

For example, upon receipt of a request for exchanging a mirrored image of the electronic device 300 with a mirrored image of the first external electronic device 10a in position from the electronic device 300, the vehicle 100 may exchange the mirrored image of the electronic device 300 in position with the mirrored image of the first external electronic device 10a on the display device 200.

In another example, upon receipt of a request for zooming out a mirrored image of the first external electronic device 10a from the second external electronic device 10b, the vehicle 100 may enlarge the mirrored image of the first external electronic device 10a at a predetermined ratio on the display device 200. In this case, as the mirrored image of the first external electronic device 10a is scaled up in size, the sizes of the other mirrored images may be relatively decreased.

Figure 6:
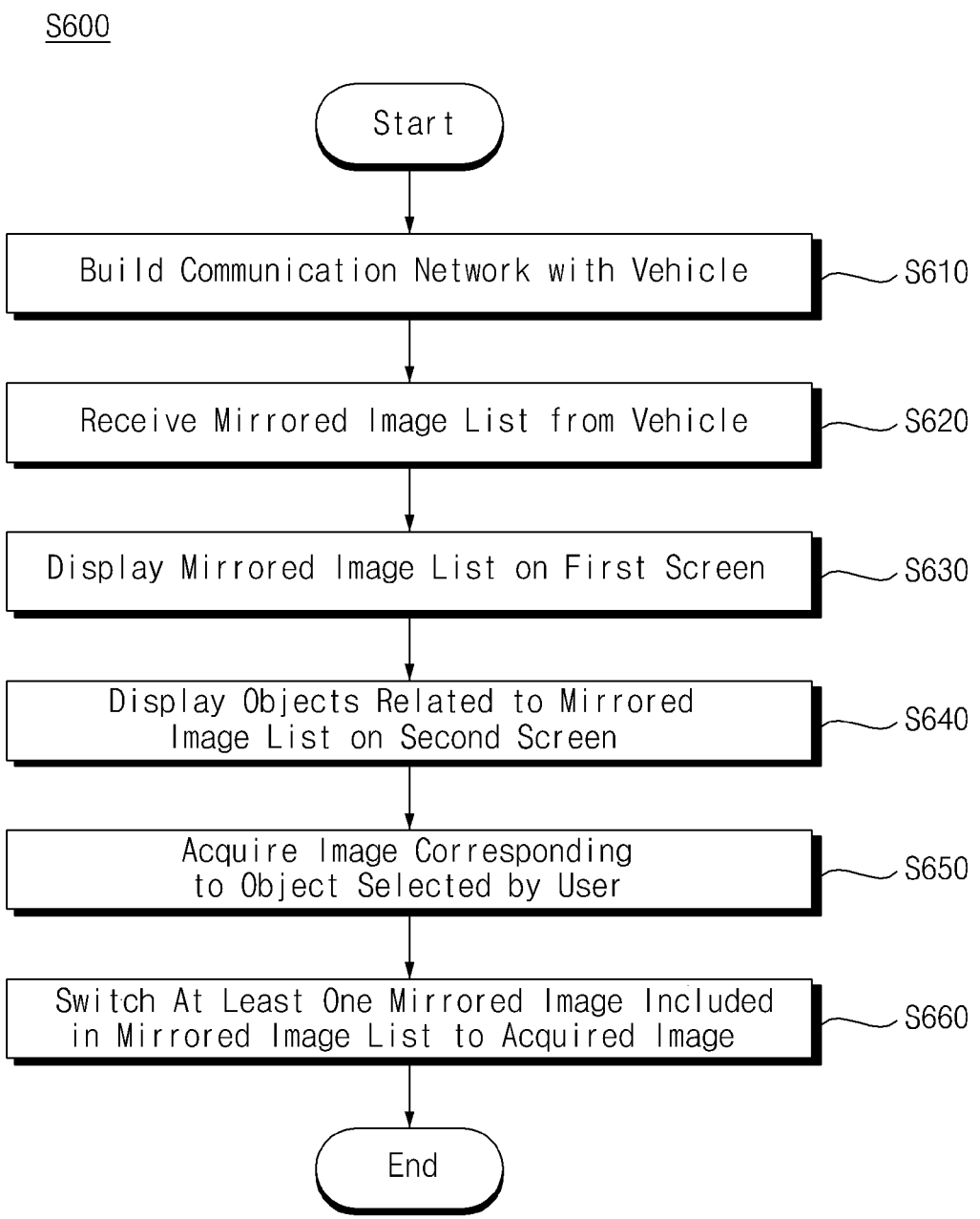
FIG. 6 is a flowchart illustrating an exemplary procedure for sharing an image with a display device and at least one external electronic device by an electronic device according to an embodiment of the present disclosure.

FIG. 6 is a flowchart illustrating an exemplary procedure S600 for sharing an image with the display device 200 and the at least one external electronic device 10a, 10b, and 10c by the electronic device 300 according to an embodiment of the present disclosure.

In step S610, the vehicle 100 may build a communication network with the electronic device 300. The at least one external electronic device 10a, 10b, and 10c located inside the vehicle 100 may be connected to the communication network. In this case, the electronic device 300 may establish a communication network with the at least one external electronic device 10a, 10b, and 10c as well as the vehicle 100. Herein, the electronic device 300 may be a non-portable device such as an AVN or telematics terminal fixedly installed at a portion inside the vehicle 100, or a portable device such as a smartphone. Further, each of the external electronic devices may be a portable device such as a smartphone.

Meanwhile, the electronic device 300 may determine the number of the at least one external electronic device 10a, 10b and 10c connected to the communication network. For example, as illustrated in FIG. 4, the vehicle 100 may determine the number of the external electronic devices connected to the communication network, using device information received from each of the three external electronic devices 10a, 10b and 10c.

In addition, the electronic device 300 may determine the position of the at least one external electronic device 10a, 10b and 10c connected to the communication network. For example, the electronic device 300 may measure the strengths of wireless signals transmitted by the at least one external electronic device 10a, 10b and 10c, and calculate the distances between the electronic device 300 and the at least one external electronic device 10a, 10b and 10c, using the measured strengths.

In step S620, the electronic device 300 may receive a mirrored image list from the vehicle 100 through the communication network. Herein, the mirrored image list received by the electronic device 300 may be identical to the mirrored image list described before with reference to FIG. 5. That is, the mirrored image list received by the electronic device 300 may include at least one of a mirrored image of the electronic device 300, a mirrored image of the first external electronic device 10a, a mirrored image of the second external electronic device 10b, and a mirrored image of the third external electronic device 10c.

Meanwhile, the electronic device 300 may receive a list of applications installed in at least one of the at least one external electronic device 10a, 10b and 10c, along with the mirrored image list in step S620. For example, the electronic device 300 may receive a list of applications installed in the first external electronic device 10a. In this case, the electronic device 300 may receive the list of applications installed in the first external electronic device 10a directly from the first external electronic device 10a. Or the electronic device 300 may receive the list of applications installed in the first external electronic device 10a from the vehicle 100.

In step S630, the electronic device 300 may display the received mirrored image list on a first screen of the display 351. In this case, the first screen may be a predefined area for displaying the mirrored image list in the total area of the display 351.

In an embodiment, the first screen may include a main area and at least one sub-area. The electronic device 300 may display a mirrored image of the electronic device 300 included in the mirrored image list in the main area. Further, the electronic device 300 may display a mirrored image of the at least one external electronic device 10a, 10b, and 10c included in the mirrored image list in the at least one sub-area.

Herein, the mirrored image of the at least one external electronic device may one-to-one correspond to the at least one sub-area. For example, if the three external electronic devices 10a, 10b, and 10c are located inside the vehicle 100, the processor 380 may generate three sub-areas on the first screen, and sequentially display mirrored images of the three external electronic devices 10a, 10b, and 10c in the tree sub-areas.

In an embodiment, the electronic device 300 may display identification information about the electronic device 300 in the main area, and identification information about the at least one external electronic device in the at least one sub-area. Herein, the identification information may include, for example, a name, facial image, age, job, phone number, email address, device model name, or the like of a user. For example, the electronic device 300 may display the name (e.g., 'USER1') of a user of the electronic device 300 in the main area of the first screen, the name (e.g., 'USER2') of a user of the first external electronic device 10a in a first sub-area of the first screen, the name (e.g., 'USER3') of a user of the second external electronic device 10b in a second sub-area of the first screen, and the name (e.g., 'USER4') of a user of the third external electronic device 10c in a third sub-area of the first screen.

In an embodiment, the electronic device 300 may display the outline of the main area of the first screen in a different color or thickness from that of the at least one sub-area. Therefore, the user of the electronic device 300 may easily identify an area displaying the mirrored image of the electronic device 300 in the mirrored image list. Obviously, the outline of an area displaying the mirrored image of an external electronic device may be displayed in the external electronic device, in a different color or thickness from that of an area displaying the mirrored image of the electronic device 300 or any other external electronic device.

In step S640, the electronic device 300 may display objects related to the mirrored image list on a second screen of the display 351. Herein, the second screen may be an area that does not overlap with the first screen. Herein, objects related to the mirrored image list displayed on the first screen may be interface elements selectable by the user of the electronic device 300. For example, the interface elements selectable by the user may include a virtual button related to a specific function, an icon for executing a specific application, a pop-up window for providing specific information, and so on.

In an embodiment, the objects related to the mirrored image list displayed on the first screen may include icons representing applications installed in the electronic device 300.

In an embodiment, the objects related to the mirrored image list displayed on the first screen may include icons representing applications installed in at least one of the at least one external electronic device 10a, 10b, and 10c.

Obviously, the objects related to the mirrored image list displayed on the first screen may include all of the icons representing applications installed in the electronic device 300, and the icons representing applications installed in the at least one of the at least one external electronic device 10a, 10b, and 10c.

In step S650, the electronic device 300 may acquire an image corresponding to an object selected from among the objects displayed on the second screen by the user. In an embodiment, if the user touches one of the objects displayed on the second screen, the electronic device 300 may select the touched object and acquire an image corresponding to the selected object.

For example, if the selected object is an icon representing a specific application installed in the electronic device 300, the electronic device 300 may execute the specific application and acquire an execution image of the specific application. In another example, if the selected object is an icon representing a specific application installed in the third external electronic device 10c, the electronic device 300 may request the third external electronic device 10c to execute the specific application, and acquire an execution image of the specific application from the third external electronic device 10c.

In step S660, the electronic device 300 may switch at least one mirrored image of the mirrored image list displayed on the first screen of the display to the image acquired in step S650.

In an embodiment, if a specific object displayed on the second screen is dragged and dropped onto a specific mirrored image displayed on the first screen, the specific mirrored image may be switched to an image corresponding o the specific object.

For example, if an icon displayed on the second screen is dragged and dropped onto a mirrored image (e.g., a played movie image) of the electronic device 300 displayed in the main area of the first screen, the mirrored image (e.g., the played movie image) of the electronic device 300 displayed on the first screen may be switched to an image (e.g., a game image) corresponding to the dragged icon.

In another example, if an icon displayed on the second screen is dragged and dropped onto a mirrored image (e.g., a DMB image) of the first external electronic device 10a displayed in the first sub-area of the first screen, the mirrored image (e.g., the DMB image) of the first external electronic device 10a displayed on the first screen may be switched to an image (e.g., a game image) corresponding to the dragged icon.

Figure 7A:
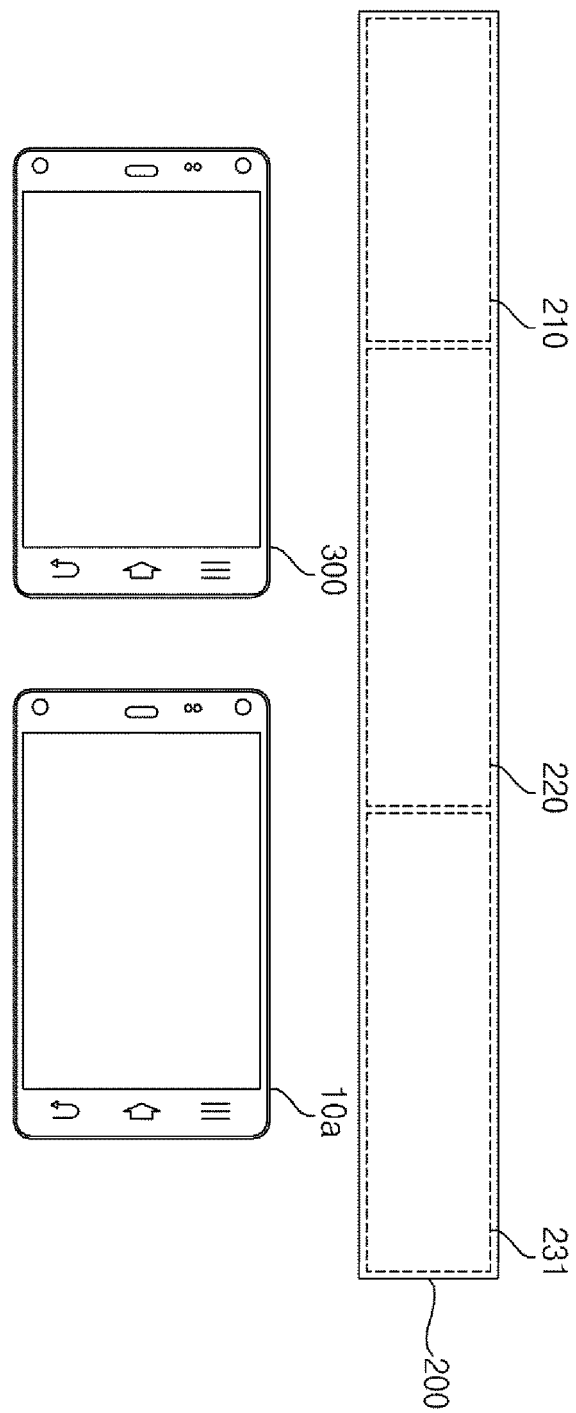
FIGS. 7a and 7b are views referred to for describing an exemplary image sharing method using an electronic device according to an embodiment of the present disclosure.
Figure 7B:
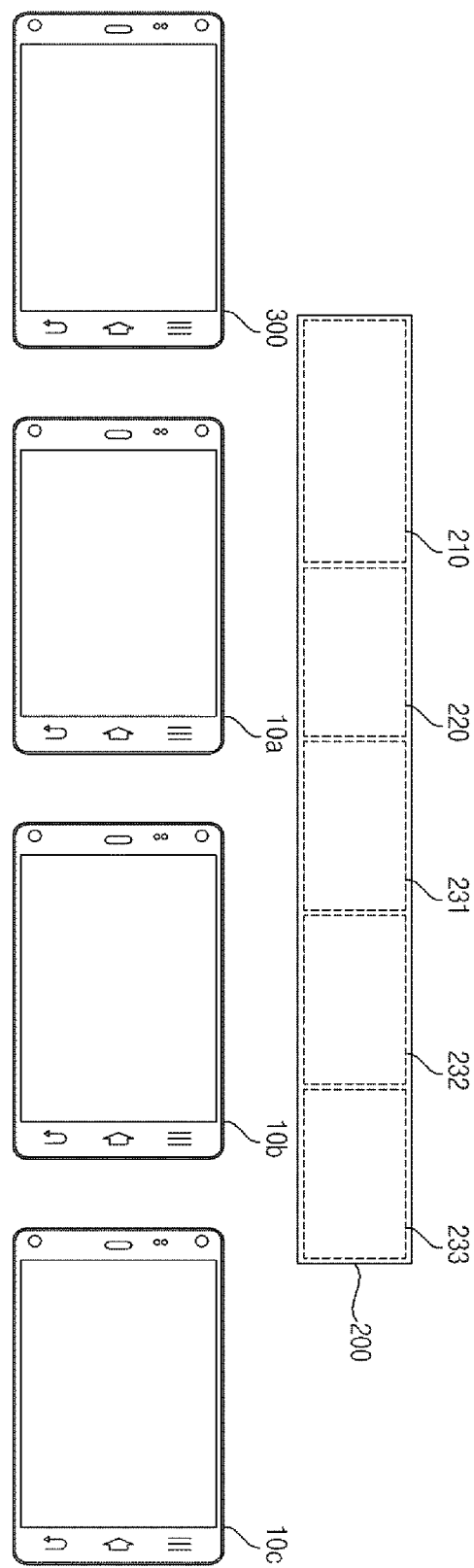

FIGS. 7a and 7b are views referred to for describing an exemplary image sharing method using the electronic device 300 according to an embodiment of the present disclosure.

The vehicle 100 related to the present disclosure may divide the screen of the display device 200 into a plurality of screens. The vehicle 100 may determine the number of display areas into which the screen of the display device 200 is to be divided according to the number of external electronic devices 10 located inside the vehicle 100. Or, the vehicle 100 may determine the number of display areas into which the screen of the display device 200 is to be divided according to the number of external electronic devices 10 which are located inside the vehicle 100 and communicatively connected to the vehicle 100.

FIG. 7a is an exemplary view illustrating connection of the electronic device 300 and the first external electronic device 10a located inside the vehicle 100 to the vehicle 100 through a communication network. In this case, the vehicle 100 may divide the entire screen of the display device 200 into a total of three display areas 210, 220, and 231, and display different images in the respective display areas.

For example, the vehicle 100 may display traveling state information (e.g., a speed, fuel amount, gas mileage, cooling water temperature, and so on) about the vehicle 100 in one display area 201, an image shared from the electronic device 300 (i.e., a mirrored image of the electronic device 300) in another display area 220, and an image shared from the first external electronic device 10*a* (i.e., a mirrored image of the first external electronic device 10*a*) in the other display area 231.

The display area 201 in which the traveling state information about the vehicle 100 is displayed may be displayed in a predetermined size at a predetermined position on the screen of the display device 200 irrespective of whether the vehicle 100 is connected to other electronic devices 300 and 10*a*.

Meanwhile, the two display areas 220 and 231 in which the two mirrored images are displayed may be of the same size. Herein, image data including the mirrored images displayed on the display device 200 may be referred to as an afore-described mirrored image list.

FIG. 7*b* is an exemplary view illustrating connection of the electronic device 300 and the first, second, and third external electronic devices 10*a*, 10*b*, and 10*c* located inside the vehicle 100 to the vehicle 100 through a communication network. In this case, the vehicle 100 may divide the entire screen of the display device 200 into a total of five display areas 210, 220, 231, 232, and 233, and display different images in the respective display areas. That is, referring to FIG. 7*b*, compared to FIG. 7*a*, the second and third external electronic devices 10*b* and 10*c* are additionally connected to the vehicle 100 through the communication network, and the vehicle 100 may divide the entire screen of the display device 200 into the five display areas 210, 220, 231, 232, and 233.

For example, the vehicle 100 may display an image shared from the second external electronic device 10*b* (i.e., a mirrored image of the second external electronic device 10*b*) in the display area 232, and an image shared from the third external electronic device 10*c* (i.e., a mirrored image of the third external electronic device 10*c*) in the display area 233.

Meanwhile, the four display areas 220, 231, 232, and 233 except for the display area 201 may be of the same size. Herein, a set of mirrored images displayed in the display areas 220, 231, 232, and 233 of the display device 200 may be referred to as an afore-descried mirrored image list. Obviously, the mirrored image list may further include an image corresponding to traveling state information displayed in the display area 210.

According to FIGS. 7*a* and 7*b*, the vehicle 100 may divide the screen of the display device 200 into a plurality of display areas according to the total number of electronic devices 300 and 10 connected to the vehicle 100 through the communication network, and display different images in the respective display areas, thereby enabling a passenger of the vehicle 100 to easily view an image related to each of the electronic devices 300 and 10 at a glance.

Meanwhile, while the display area 220 in which a mirrored image of the electronic device 300 is displayed is shown in FIGS. 7*a* and 7*b* as located at a near left side of the display area 201, it is to be understood that the arrangement order of a plurality of display areas divided from the screen of the display device 200 may be changed according to a predetermined rule or a user input.

Figure 8A:
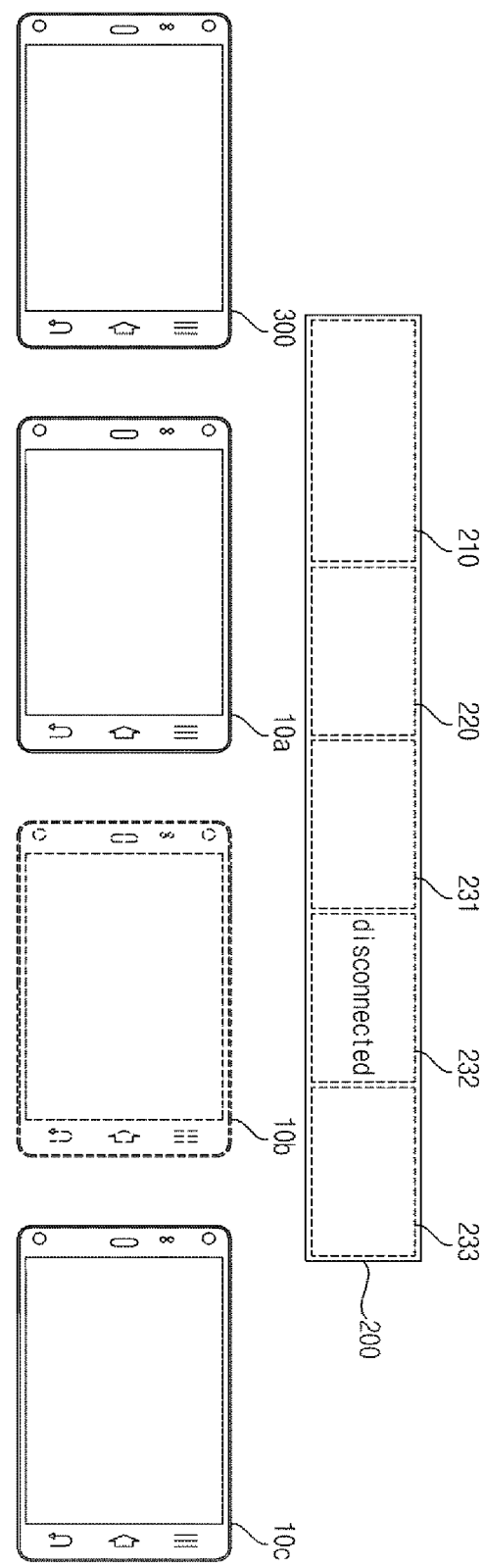
FIGS. 8a and 8b are views referred to for describing an exemplary image sharing method using an electronic device according to an embodiment of the present disclosure.
Figure 8B:
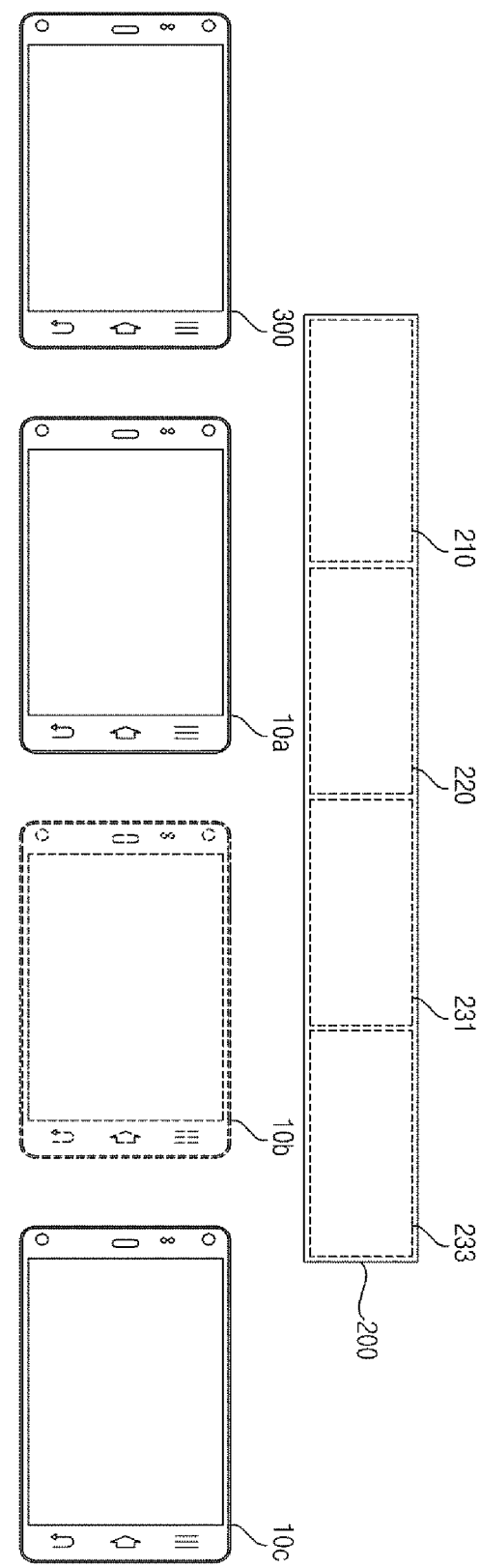

FIGS. 8*a* and 8*b* are views referred to for describing an exemplary image sharing method using the electronic device 300 according to an embodiment of the present disclosure.

Compared to FIG. 7*b*, FIG. 8*a* is an exemplary view illustrating disconnection of the second external electronic device 10*b* from the communication network. For example, a communication connection between the second external electronic device 10*b* and the communication network may be released due to various causes such as a user command or a communication error.

In this case, the vehicle 100 may turn off the display area 232 displaying the mirrored image of the second external electronic device 10*b*, as illustrated in FIG. 8*a*. Or, the vehicle 100 may display a message indicating that a communication connection between the vehicle 100 and the second external electronic device 10*b* has been released (e.g., a message indicating 'disconnected') in the display area 232 for a predetermined time.

FIG. 8*b* is an exemplary view illustrating a change in the display device 200, when the vehicle 100 is disconnected from the second external electronic device 10*b*. Referring to FIG. 8*b*, the vehicle 100 may delete the display area 232 in which the mirrored image of the second external electronic device 10*b* has been displayed from the screen of the display device 200, and increase the sizes of the remaining three display areas 220, 231, and 233 by the size of the deleted display area 232. Therefore, the size of the mirrored image displayed in each of the three display areas 220, 231, and 233 may also be increased.

Figure 9:
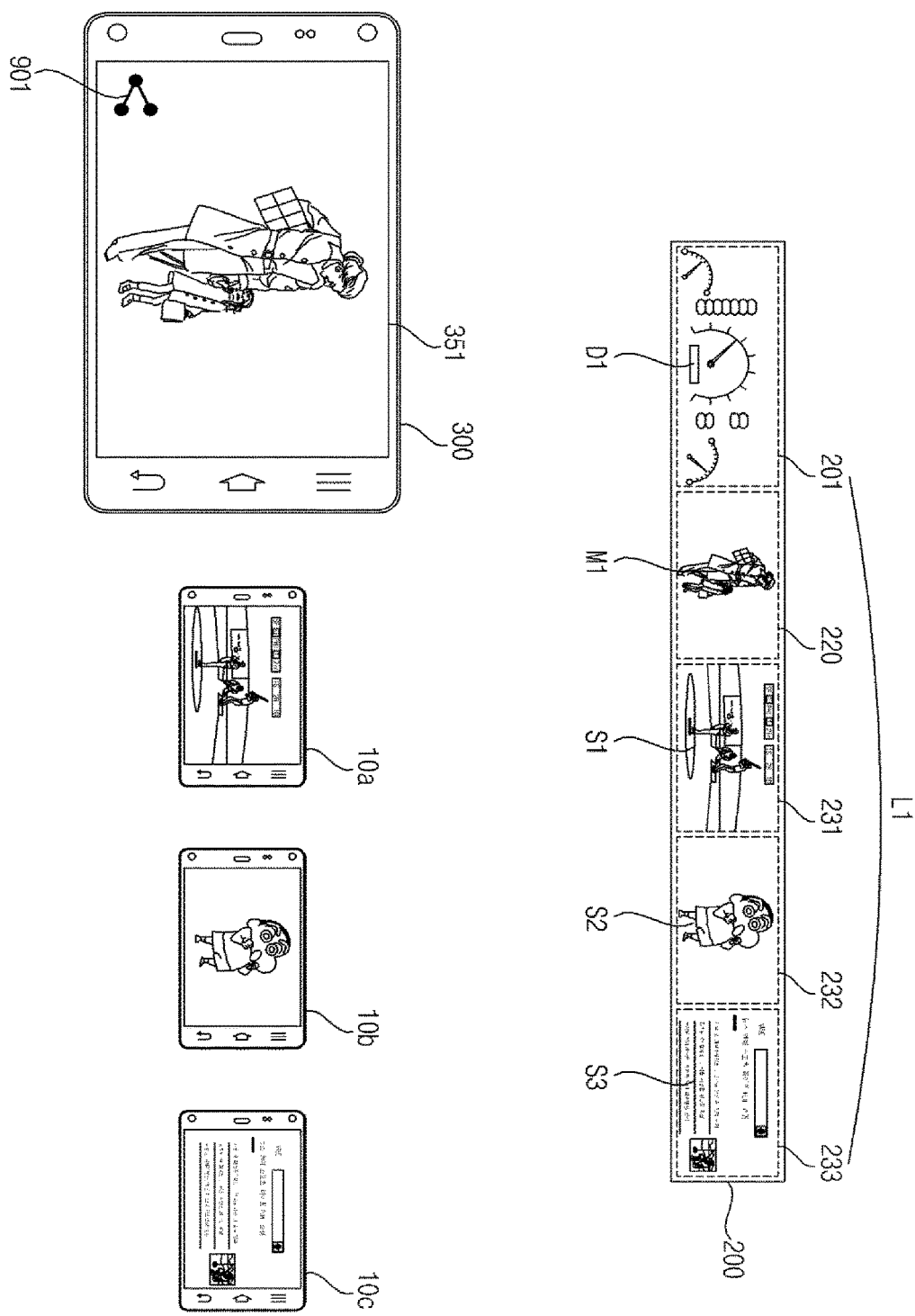
FIG. 9 is a view referred to for describing an exemplary image sharing method using an electronic device according to an embodiment of the present disclosure.

FIG. 9 is a view referred to for describing an exemplary image sharing method using the electronic device 300 according to an embodiment of the present disclosure.

Referring to FIG. 9, like FIG. 7*b*, different images are displayed in the five respective display areas 210, 220, 231, 232, and 233 included in the screen of the display device 200, by way of example.

Specifically, the vehicle 100 may display an image D1 (e.g., a virtual dashboard) corresponding to traveling state information about the vehicle 100 in the predetermined display area 201, and mirrored images M1, S1, S2, and S3 of the electronic device 300 and the external electronic devices 10*a*, 10*b*, and 10*c* in the remaining display areas 220, 231, 232, and 233 except for the display area 201 on the screen of the display device 200.

For example, the mirrored image M1 corresponding to a picture displayed on the display 251 of the electronic device 300 may be displayed in the display area 220. Further, the mirrored image S1 corresponding to a broadcast image displayed on the first external electronic device 10*a* may be displayed in the display area 231. Further, the mirrored image S2 corresponding to a game image displayed on the second external electronic device 10*b* may be displayed in the display area 232. Further, the mirrored image S3 corresponding to a specific Web page displayed on the third external electronic device 10*c* may be displayed in the display area 233.

Meanwhile, the processor 380 of the electronic device 300 may display an indicator 901 indicating that the mirrored image M1 of the electronic device 300 is being displayed on the display device 200, at a portion of the display 351.

In the present disclosure, a mirrored image list L1 includes the mirrored images M1, S1, S2, and S3 displayed on the screen of the display device 200. According to some embodiment, the mirrored image list L1 may further include the image D1 corresponding to the traveling state information, displayed in the display area 201.

Meanwhile, the vehicle 100 may transmit the mirrored image list L1 to at least one of the electronic device 300 and the external electronic devices 10*a*, 10*b*, and 10*c*, automatically or upon user request.

Figure 10:
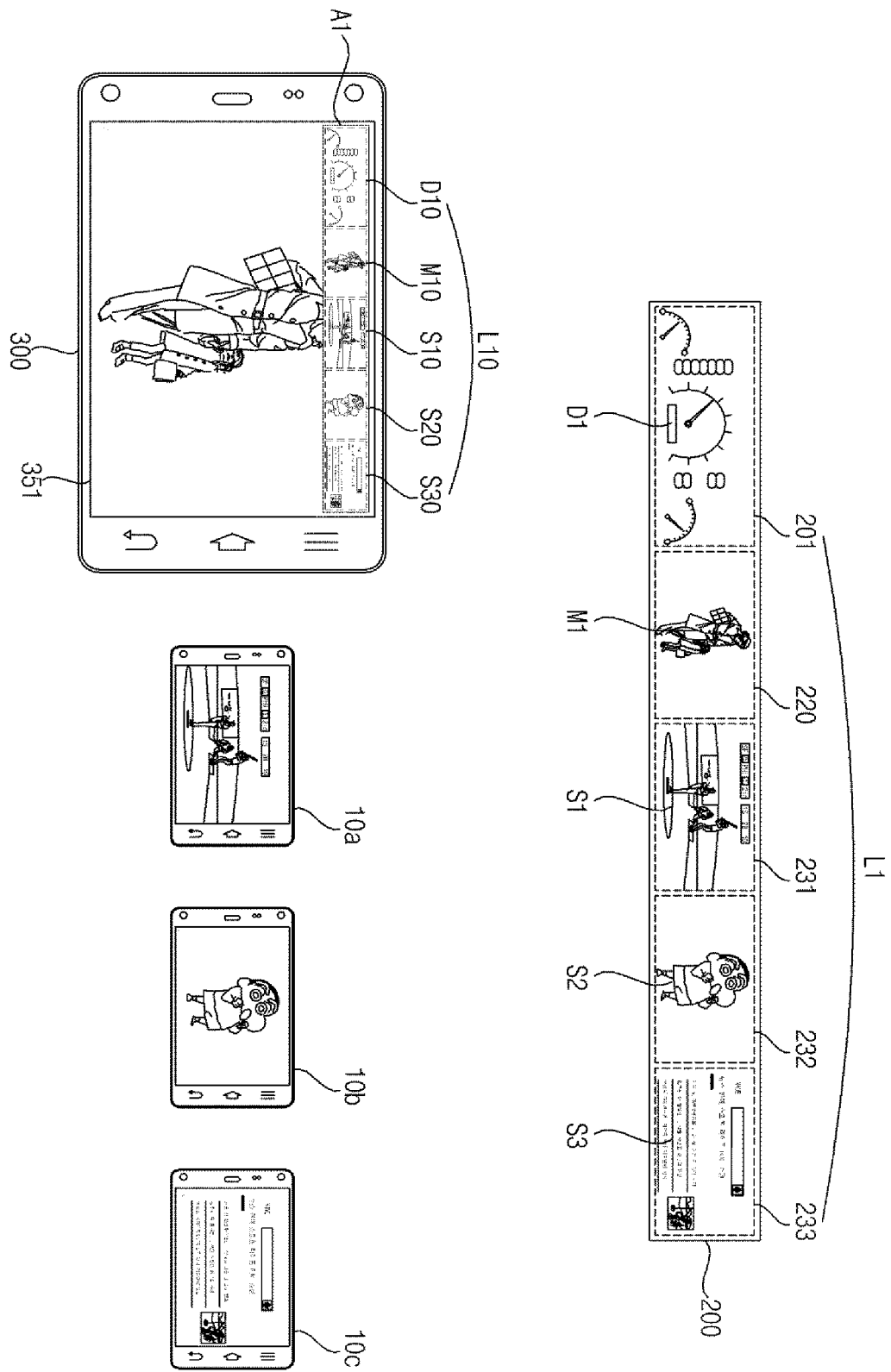
FIG. 10 is a view referred to for describing an exemplary operation for displaying a mirrored image list by an electronic device according to an embodiment of the present disclosure.

FIG. 10 is a view referred to for describing an exemplary operation for displaying a mirrored image list by the electronic device 300 according to an embodiment of the present disclosure.

FIG. 10 is an exemplary view illustrating display of a mirrored image list L10 on the display 351 of the electronic device 300. Upon receipt of a predetermined input, the processor 380 may display the mirrored image list L10 on the display 351. For example, if the user touches the indicator 901 illustrated in FIG. 9, the processor 380 may display the mirrored image list L10 on the display 351.

Herein, the mirrored image list L10 may correspond to the mirrored image list L1 displayed on the display device 200. For example, the mirrored image list L10 and the mirrored image list L1 may differ only in size but may include mirrored images in the same arrangement order.

That is, when receiving the mirrored image list L1 displayed on the display device 200, the processor 380 may scale down the received mirrored image list L1 according to the size of the display 351 of the electronic device 300. Further, the processor 380 may display the mirrored image list L10 being the scaled-down version of the mirrored image list L1 on a predetermined first screen A1 of the display 351.

The processor 380 may divide the first screen A1 into a plurality of areas according to the number of images included in the mirrored image list L10.

For example, as illustrated in FIG. 10, if the mirrored image list L10 includes five different images, the processor 380 may divide the first screen A1 into five areas D10, M10, S10, S20, and S30, and sequentially display the images D1, M1, S1, S2, and S3 included in the mirrored image list L10 in the divided areas. For the convenience of description, the five areas D10, M10, S10, S20, and S30 will sequentially be referred to as a traveling information area D10, a main area M10, a first sub-area S10, a second sub-area S20, and a third sub-area S30.

The number of the sub-areas S10, S20, and S30 included in the first screen A1 may be equal to that of the external electronic devices 10a, 10b, and 10c that provide mirrored images to the display device 200, inside the vehicle 100.

The processor 380 may display the image D1 corresponding to traveling state information in the traveling information area D10, the mirrored image M1 of the electronic device 300 in the main area M10, the mirrored image S1 of the first external electronic device 10a in the first sub-area S10, the mirrored image S2 of the second external electronic device 10b in the second sub-area S20, and the mirrored image 31 of the third external electronic device 10c in the third sub-area S30. That is, the mirrored images S1, S2, and S3 of the first, second, and third external electronic devices 10a, 10b, and 10c may one-to-one correspond to the three sub-areas S10, S20, and S30.

Figure 11:
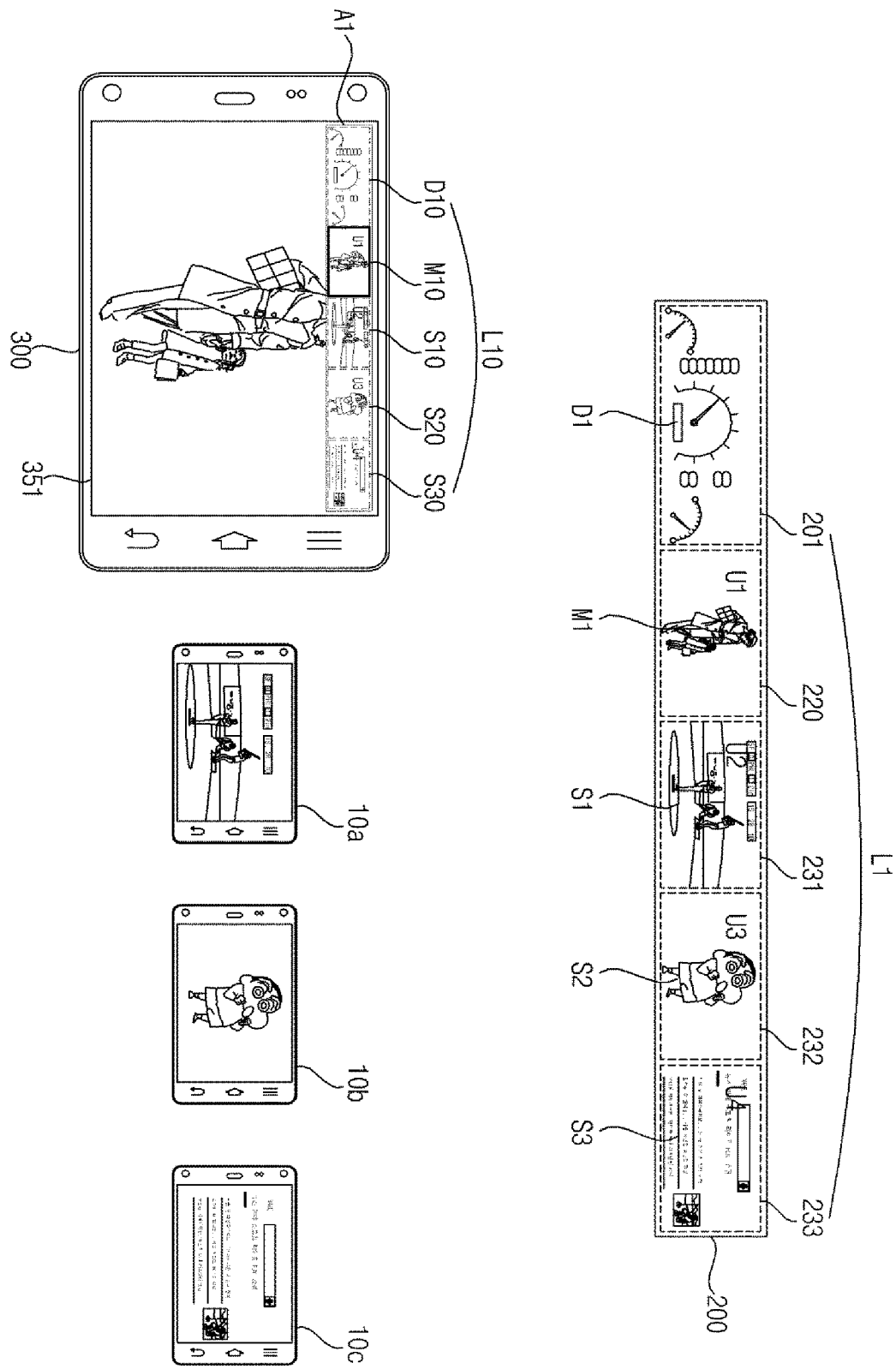
FIG. 11 is a view referred to for describing an exemplary operation for displaying a mirrored image list in a predetermined area of a display by an electronic device according to an embodiment of the present disclosure.

FIG. 11 is a view referred to for describing an exemplary operation for displaying a mirrored image list in a predetermined area of the display 351 by the electronic device 300 according to an embodiment of the present disclosure.

The processor 380 of the electronic device 300 may additionally display predetermined information on or give a predetermined visual effect to at least one area or image included in the mirrored image list L10 displayed on the display 351.

Referring to FIG. 11, when displaying the mirrored image list L10 on the display, the processor 380 may display identification information about the electronic device 300 in the main area M10 displaying the mirrored image M1 of the electronic device 300. Further, the processor 380 may display identification information about the first, second, and third external electronic devices 10a, 10b, and 10c respectively in the first, second, and third sub-areas S10, S20, and S30. For this purpose, the electronic device 300 may receive the identification information about the first, second, and third external electronic devices 10a, 10b, and 10c, directly from the first, second, and third external electronic devices 10a, 10b, and 10c or through the vehicle 100.

For example, as illustrated in FIG. 11, user information 'U1' about the electronic device 300 may be displayed in the main area M10, user information 'U2' about the first external electronic device 10a may be displayed in the first sub-area S10, user information 'U3' about the second external electronic device 10b may be displayed in the second sub-area S20, and user information 'U4' about the third external electronic device 10c may be displayed in the third sub-area S30.

Further, referring to FIG. 11, the processor 380 may display the outline of the main area M10 displaying the mirrored image M1 of the electronic device 300 in a different color or thickness from those of the outlines of the remaining areas D10, S10, S20, and S30.

Therefore, the user of the electronic device 300 may easily identify areas displaying the mirrored image M1 of the electronic device 300 in the mirrored image list L1 and the mirrored image list L10. Further, since the identification information about the first, second, and third external electronic devices 10a, 10b, and 10c is displayed in respective areas in the mirrored image list L1 and the mirrored image list L10, an image that a specific user aboard the vehicle 100 is receiving may be determined easily.

Figure 12:
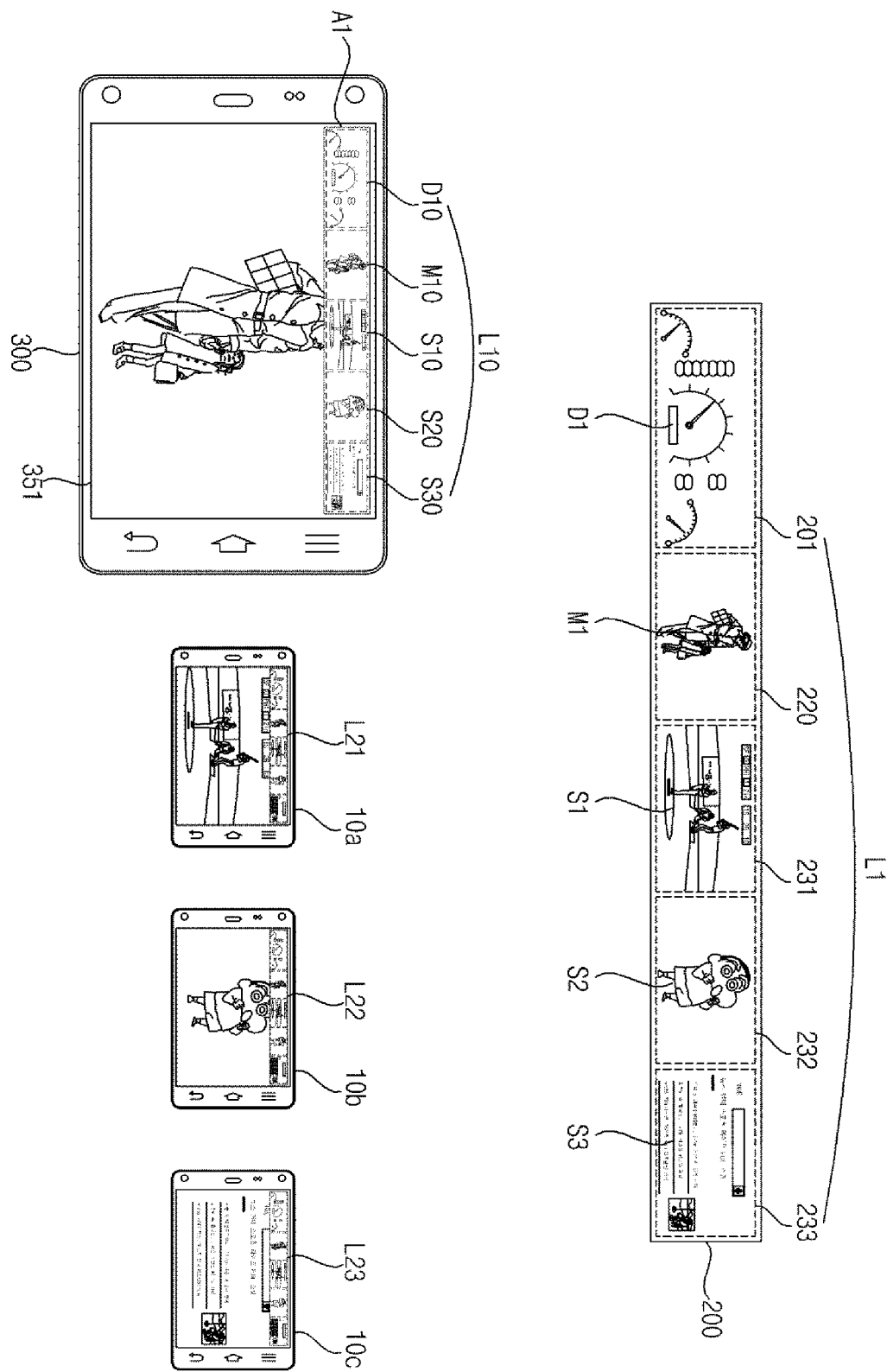
FIG. 12 is a view illustrating display of a mirrored image list on an external electronic device in relation to FIG. 11.

FIG. 12 is a view illustrating display of mirrored image lists on the external electronic devices 10a, 10b, and 10c in relation to FIG. 11.

Referring to FIG. 12, the display device 200 may transmit the mirrored image list L1 to the first, second, and third external electronic devices 10a, 10b, and 10c as well as the electronic device 300.

Specifically, upon receipt of a predetermined input, the first external electronic device 10a may display a mirrored image list L21 on the display of the first external electronic device 10a. The mirrored image list L21 may be different only in size from the received mirrored image list L1, and identical to the received mirrored image list L1 in terms of the arrangement order of included images.

Further, upon receipt of a predetermined input, the second external electronic device 10b may display a mirrored image list L22 on the display of the second external electronic device 10b. The mirrored image list L22 may be different only in size from the received mirrored image list L1, and identical to the received mirrored image list L1 in terms of the arrangement order of included images.

Further, upon receipt of a predetermined input, the third external electronic device 10c may display a mirrored image list L23 on the display of the third external electronic device 10c. The mirrored image list L23 may be different only in size from the received mirrored image list L1, and identical to the received mirrored image list L1 in terms of the arrangement order of included images.

Figure 13:
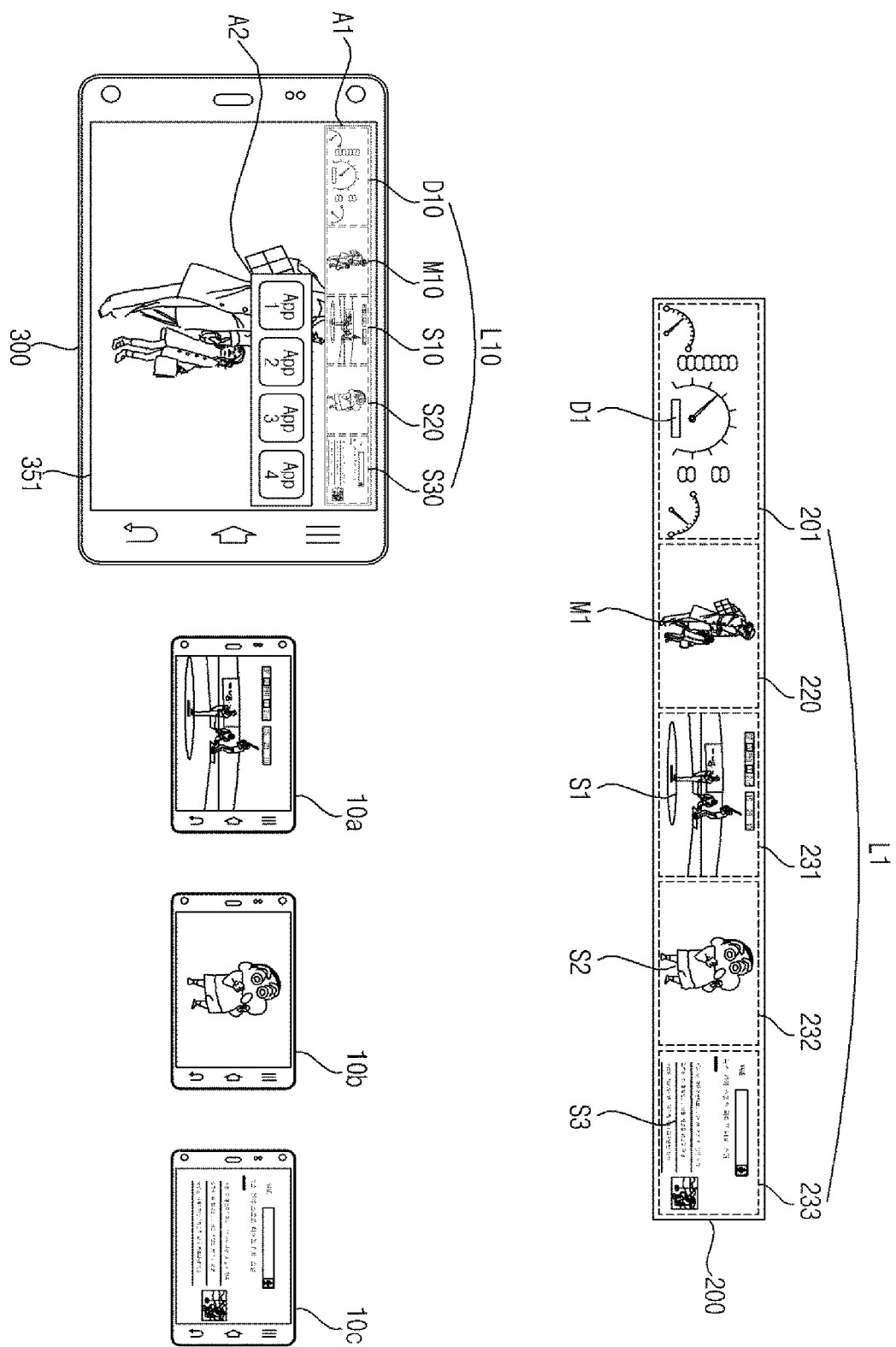
FIG. 13 is a view referred to for describing an exemplary operation for displaying objects related to a mirrored image list on a display by an electronic device according to an embodiment of the present disclosure.

FIG. 13 is a view referred to for describing an exemplary operation for displaying objects related to a mirrored image list on the display 351 by the electronic device 300 according to an embodiment of the present disclosure.

The electronic device 300 may display selectable objects related to the mirrored image list L10 displayed on the first screen A1 of the display 351, on a second screen A2 of the display 351. Herein, the first screen A1 and the second screen A2 may not overlap with each other.

Meanwhile, upon receipt of a predetermined input, the processor 380 may display selectable objects related to the mirrored image list L10 on the second screen A2 of the display 351. For example, the predetermined input may be an input of manipulating a hard key provided on the body of the electronic device 300 in a predetermined manner. For example, the predetermined input may be a touch input of a predetermined pattern to the display 351.

Referring to FIG. 13, objects displayed on the second screen A2 may include icons representing applications installed in the electronic device 300.

For example, if first to fourth applications have already been installed in the memory 370, the processor 380 may display first to four icons App1, App2, App3, and App4 corresponding to the first to fourth applications on the second screen A2.

Upon receipt of an input indicating execution of at least one of the first to four icons App1, App2, App3, and App4 from the user, the processor 380 may select one of the first to four icons App1, App2, App3, and App4 and execute a specific application corresponding to the selected icon. Subsequently, the processor 380 may display an execution image of the executed specific application in the mirrored image list L10.

For example, the user may drag and drop one App1 of the icons App1, App2, App3, and App4 corresponding to the applications installed in the electronic device 300 from the second screen A2 into the main area M1. Herein, a drag and drop is a kind of gesture made by a user in a GUI environment. The drag and drop may be a gesture of moving a touch on a specific object displayed at a position of a screen to another position of the screen. For example, if the application corresponding to the specific icon App1 dragged by the user is a map application, the mirrored image M1 displayed in the main area M1 may be switched to a map image being an execution image of the map application.

Figure 14:
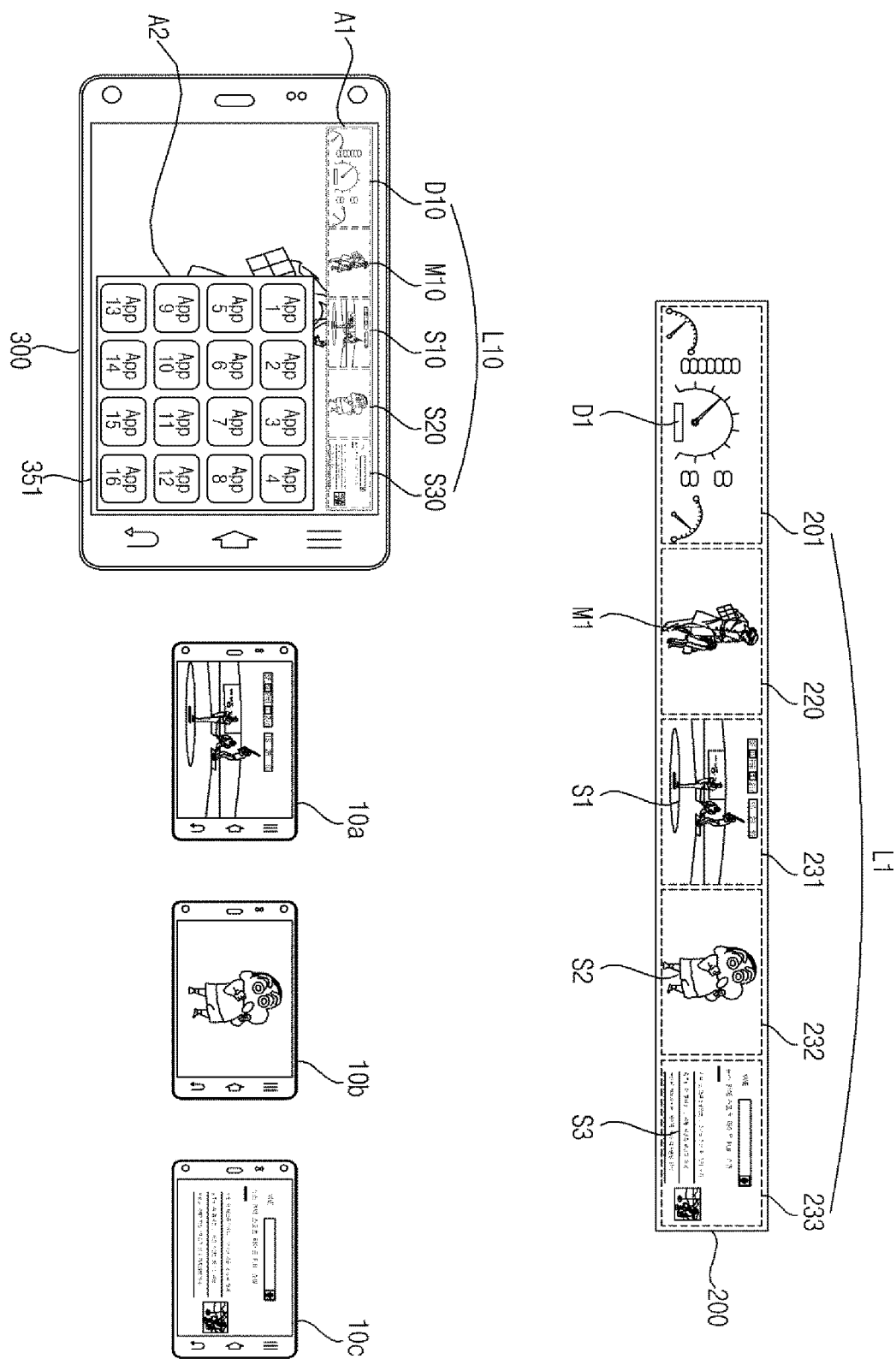
FIG. 14 is a view referred to for describing an exemplary operation for displaying objects related to a mirrored image list on a display by an electronic device according to an embodiment of the present disclosure.

FIG. 14 is a view referred to for describing an exemplary operation for displaying objects related to a mirrored image list on the display 351 by the electronic device 300 according to an embodiment of the present disclosure.

Referring to FIG. 14, the processor 380 may display the icons App1 to App4 corresponding to the applications installed in the electronic device 300, and icons App5 to App16 corresponding to applications installed in the first, second, and third external electronic devices 10a, 10b, and 10c, on the second screen A2 of the display 351. For this purpose, the electronic device 300 may have already received information about the applications installed in the first, second, and third external electronic devices 10a, 10b, and 10c from the first, second, and third external electronic devices 10a, 10b, and 10c.

For example, $5^{th}$ to $8^{th}$ icons App5 to App8 represent applications installed in the first external electronic device 10a, $9^{th}$ to $12^{th}$ icons App9 to App12 represent applications installed in the second external electronic device 10b, and $13^{th}$ to $16^{th}$ icons App13 to App16 represent applications installed in the third external electronic device 10c. Thus, compared to FIG. 13, the $5^{th}$ to $16^{th}$ icons App5 to App16 are added, and the size of the second screen A2 may be larger than that of the second screen A2 illustrated in FIG. 13.

Figure 15A:
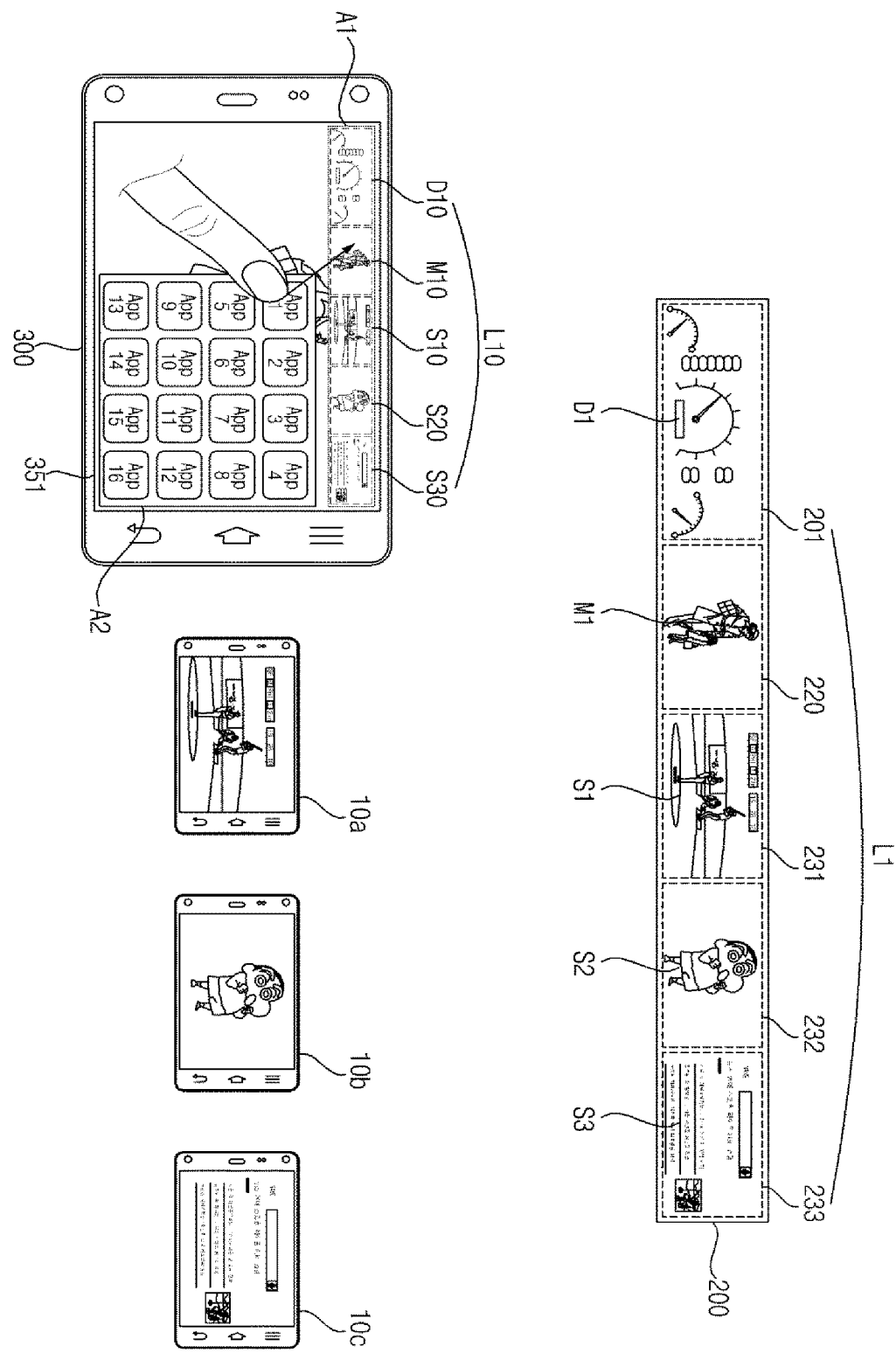
FIGS. 15a, 15b, and 15c are views referred to for describing an exemplary operation for controlling a mirrored image list according to a user input by an electronic device according to an embodiment of the present disclosure.
Figure 15B:
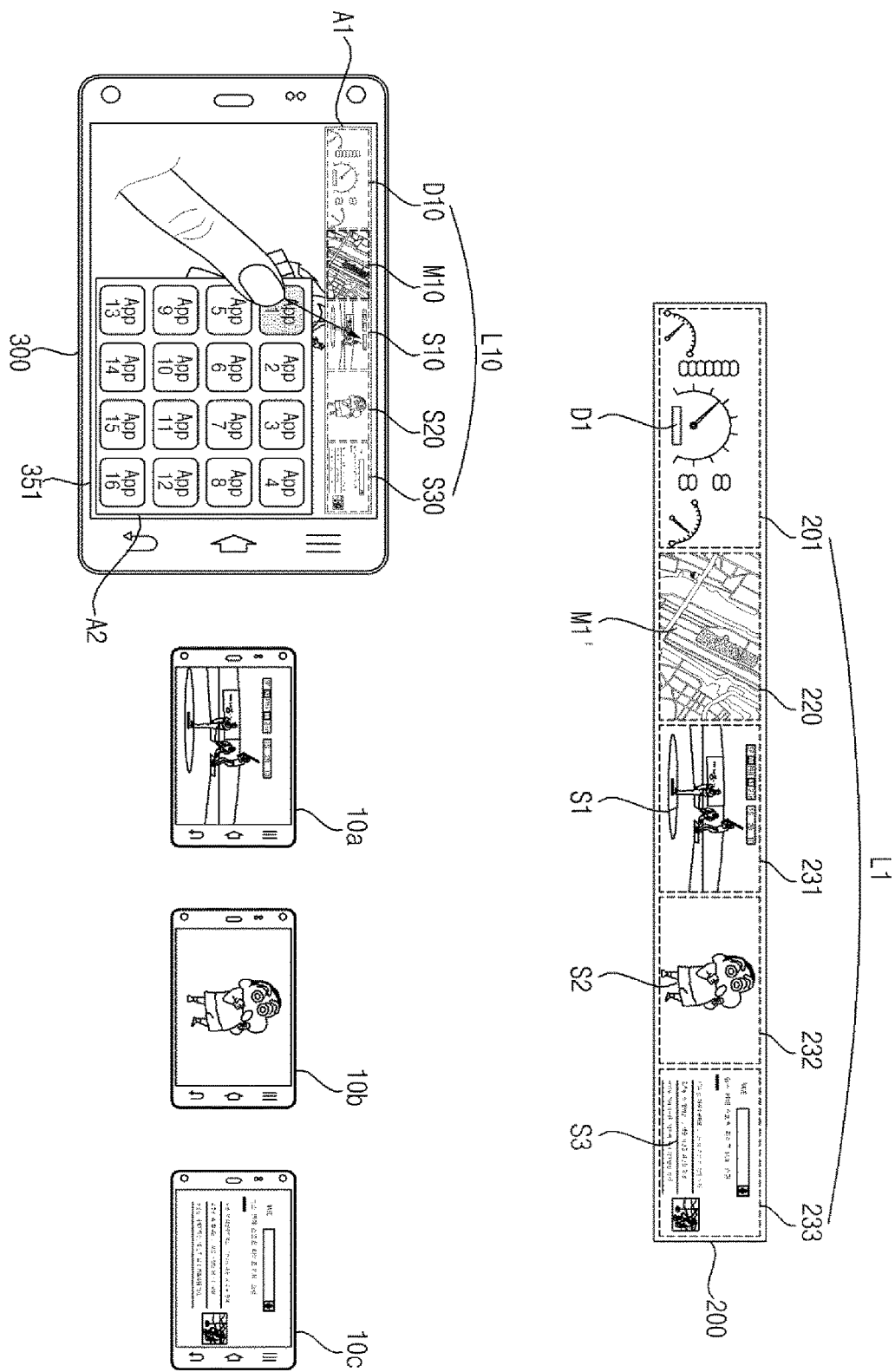
Figure 15C:
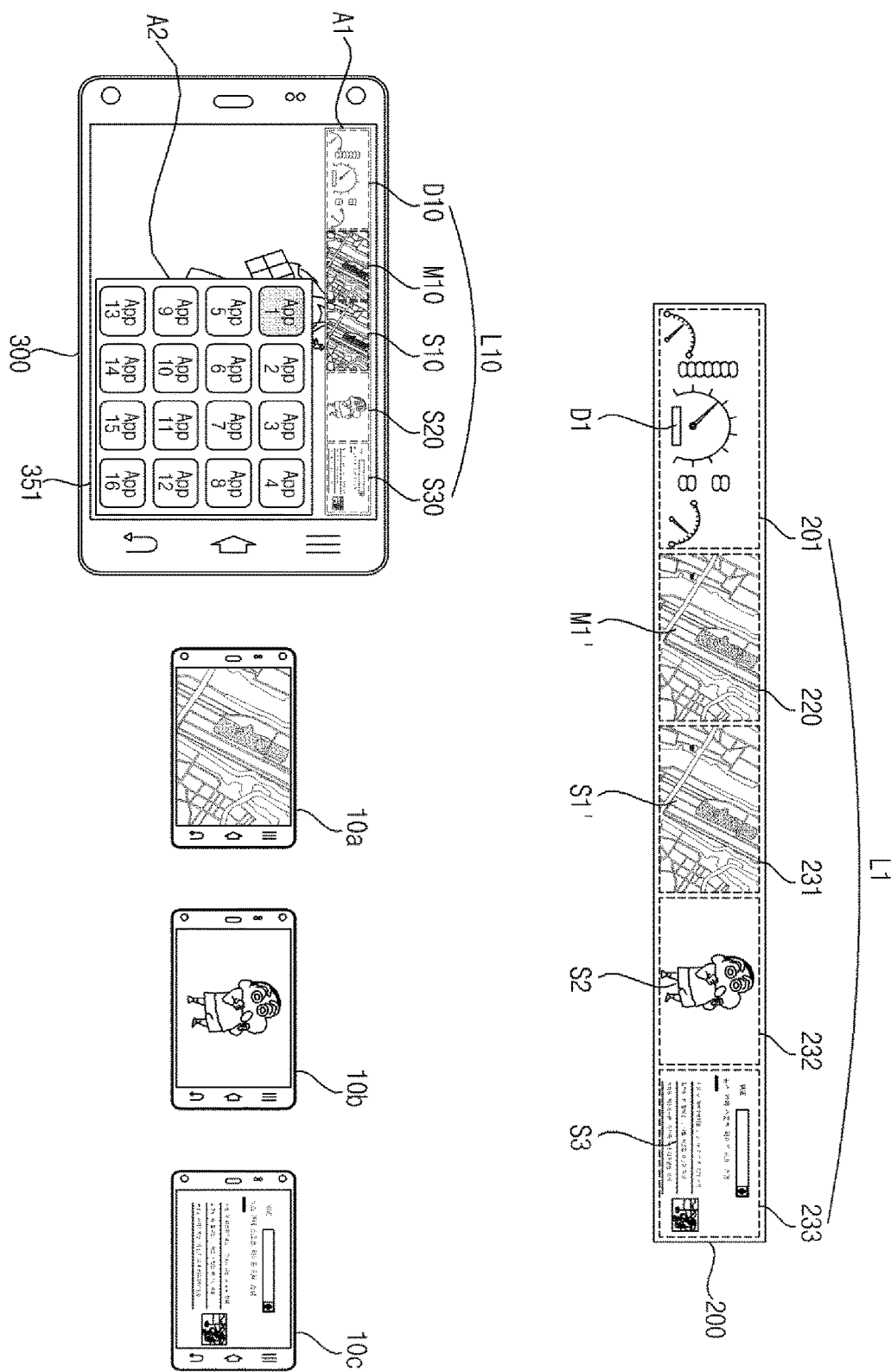

FIGS. 15a, 15b, and 15c are views referred to for describing an exemplary operation for controlling a mirrored image list according to a user input by the electronic device 300 according to an embodiment of the present disclosure.

FIG. 15a is an exemplary view illustrating drag and drop of the specific icon App1 displayed on the second screen A2 into the main area M10 of the first screen A1.

The user may touch the icon App1 representing a specific application that the user intends to execute, on the second screen A2.

The processor 380 may select the user-touched icon App1. In addition, the processor 380 may acquire an execution image of the first application by executing the first application corresponding to the selected icon App1 among the first to fourth applications installed in the electronic device 300. For example, if the first application is a map application as described before, the processor 380 may acquire a map image.

FIG. 15b is an exemplary view illustrating display of a new image in the main area M10. Specifically, if the dragged icon App1 is dropped in the main area M10, the processor 380 may switch the mirrored image M1 displayed in the main area M10 from the picture (see FIG. 9) to a map image M1', as illustrated in FIG. 15b. In this case, the color of the icon App1 displayed on the second screen A2 may be different from those of the other icons App2 to App16.

Meanwhile, as illustrated in FIG. 15b, the user may drag and drop the same icon App1 displayed on the second screen A2 again into another area S10 of the first screen A1.

FIG. 15c is an exemplary view illustrating switching of the old image S1 to a new image S1' in the first sub-area S10 in which the icon App1 has been dropped. The new image S1' may be identical to the map image M1' displayed in the main area M10. That is, as the user of the electronic device 300 drags and drops the icon App1 displayed on the second screen A2 into two or more areas M10 and S10 of the first screen A1, the user may control display of the same image in the two or more areas M10 and S10. Accordingly, the first external electronic device 10a may also switch the existing broadcast image displayed on its display to the map image S1'.

According to FIGS. 15a, 15b, and 15c, the user of the electronic device 300 may switch a specific image included in both the mirrored image list L10 displayed on the display 351 of the electronic device 300 and the mirrored image list L1 displayed on the display device 200 to a new image by a drag and drop gesture.

Accordingly, the users of the first, second, and third external electronic devices 10a, 10b, and 10c may view an execution image of a current application being executed by the user of the electronic device 300 through the mirrored image list L1 displayed on the display device 200. It is obvious to those skilled in the art that mirrored image lists (L21, L22, and L23 in FIG. 12) each including the new image M1' may be displayed respectively on the displays of the first, second, and third external electronic devices 10a, 10b, and 10c.

Figure 16A:
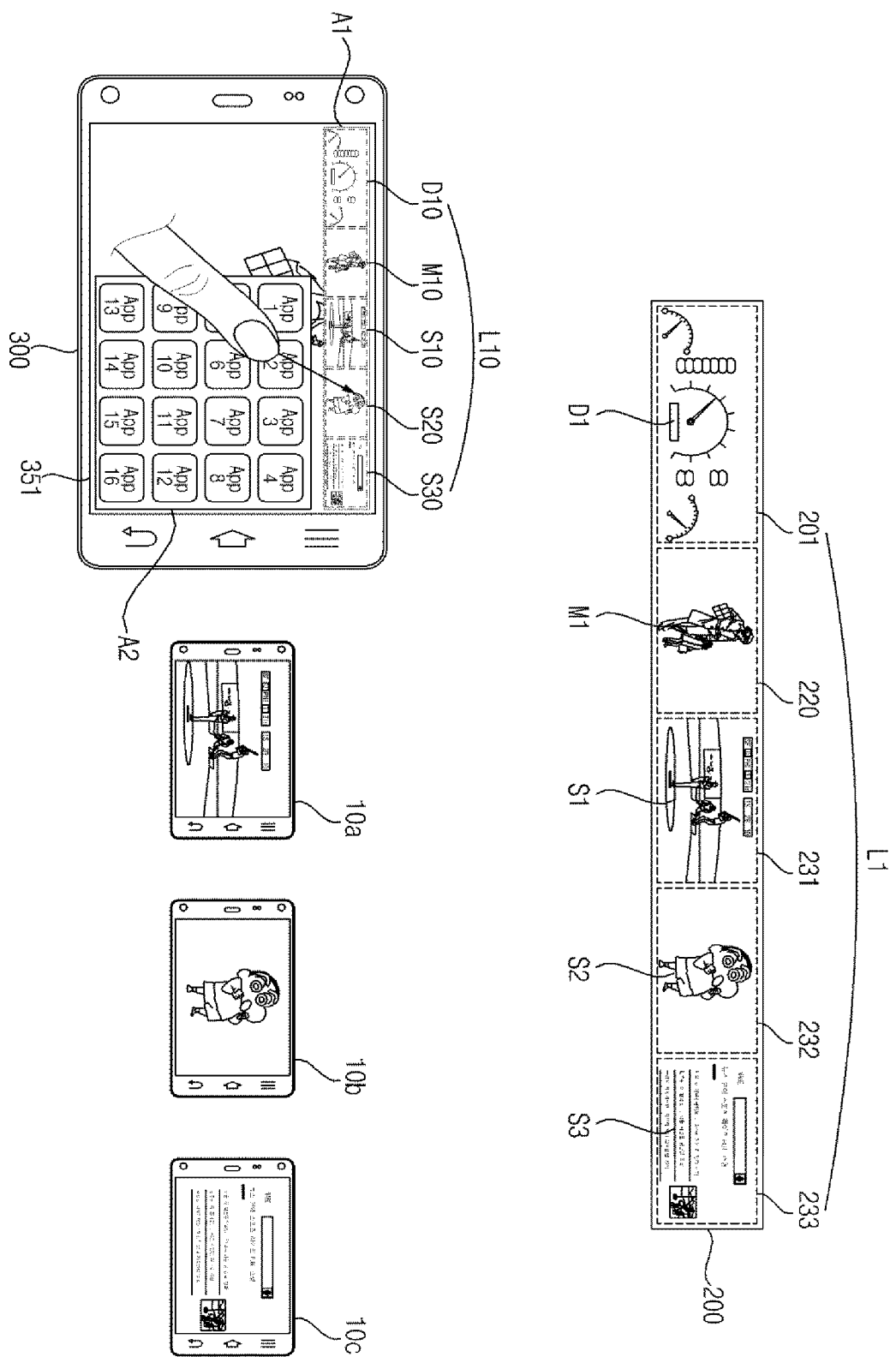
FIGS. 16a and 16b are views referred to for describing an exemplary operation for controlling a mirrored image list according to a user input by an electronic device according to an embodiment of the present disclosure.
Figure 16B:
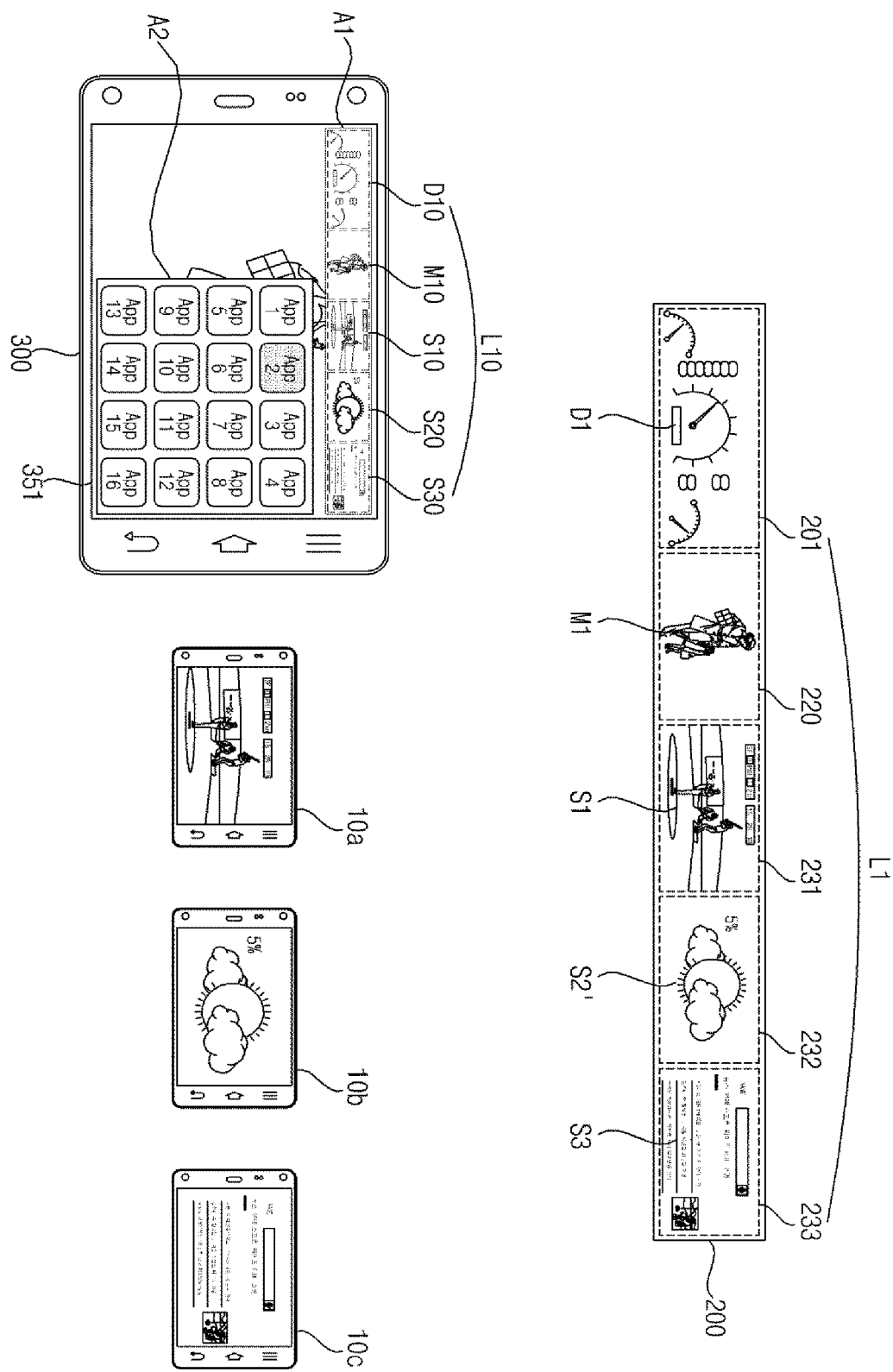

FIGS. 16a and 16b are views referred to for describing an exemplary operation for controlling a mirrored image list according to a user input by the electronic device 300 according to an embodiment of the present disclosure.

FIG. 16a is an exemplary view of drag and drop of a specific icon App2 displayed on the second screen A2 into a specific sub-area S10 of the first screen A1.

The user may touch the icon App2 representing a specific application that the user intends to execute.

The processor 380 may select the user-touched icon App2. In addition, the processor 380 may acquire an execution image of the second application by executing the second application corresponding to the selected icon App2 among the first to fourth applications installed in the electronic device 300. For example, if the second application is a weather application as described before, the processor 380 may acquire a weather forecast image.

FIG. 16*b* is an exemplary view illustrating display of a new image in the second sub-area S20. Specifically, if the dragged icon App2 is dropped in the second sub-area S20, the processor 380 may switch the mirrored image S2 of the second external electronic device 10*b*, displayed in the second sub-area S20 from the game image (see FIG. 9) to a weather forecast image S2', as illustrated in FIG. 16*b*. Accordingly, an image displayed on the display of the second external electronic device 10*b* may be switched to the weather forecast image S2'. In this case, the color of the icon App2 displayed on the second screen A2 may be different from those of the other icons App1, and App3 to App16.

According to FIGS. 16*a* and 16*b*, the user of the electronic device 300 may switch a specific image included in both the mirrored image list L10 displayed on the display 351 of the electronic device 300 and the mirrored image list L1 displayed on the display device 200 to a new image by a drag and drop gesture.

Particularly, the processor 380 may display an execution image of an application installed in the electronic device 300 on the specific external electronic device 10*b* selected by the user. For example, the weather forecast image S2' may be transmitted from the electronic device 300 to the second external electronic device 10*b*, directly or through the vehicle 100.

Figure 17A:
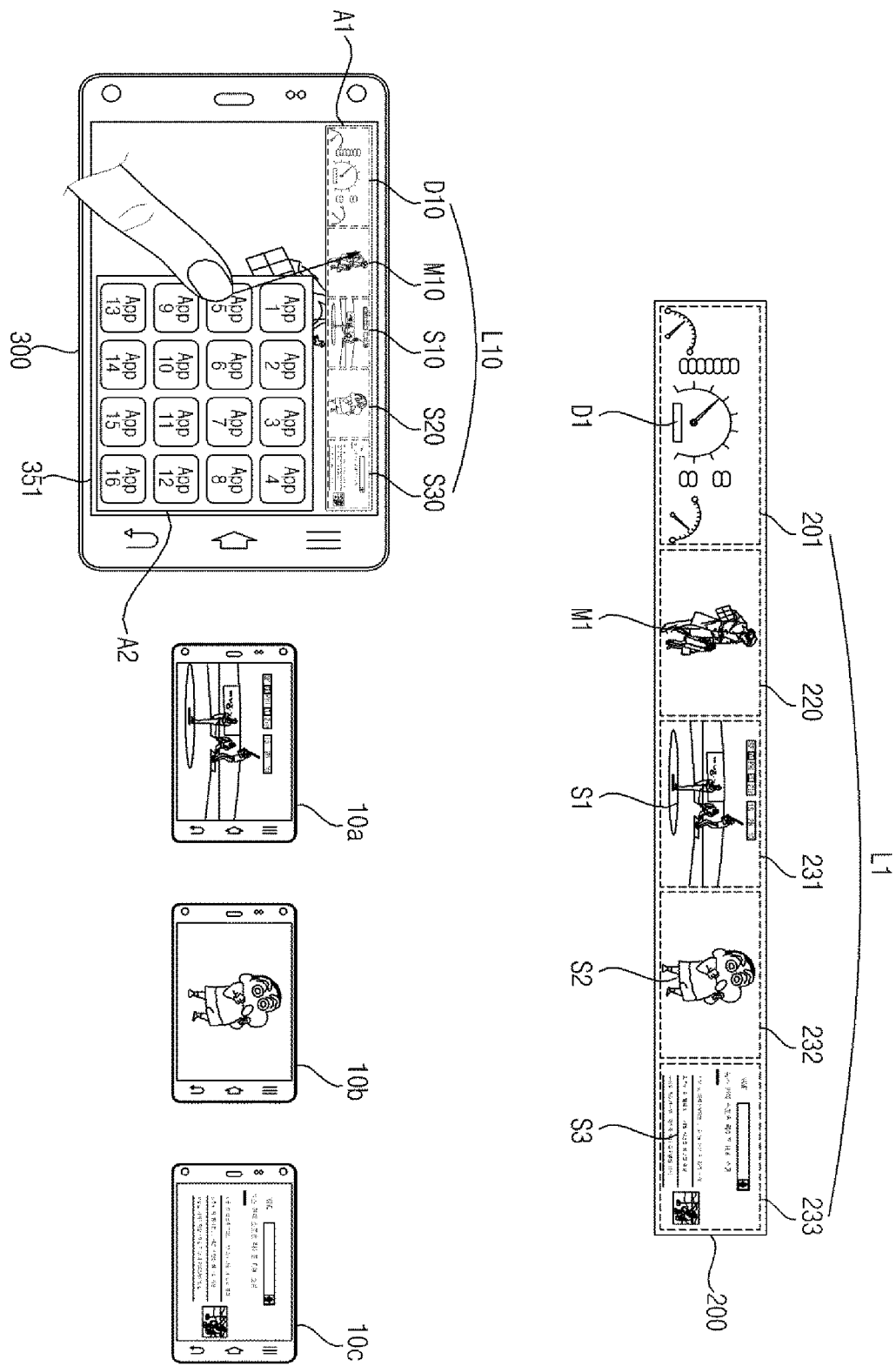
FIGS. 17a and 17b are views referred to for describing an exemplary operation for controlling a mirrored image list according to a user input by an electronic device according to an embodiment of the present disclosure.
Figure 17B:
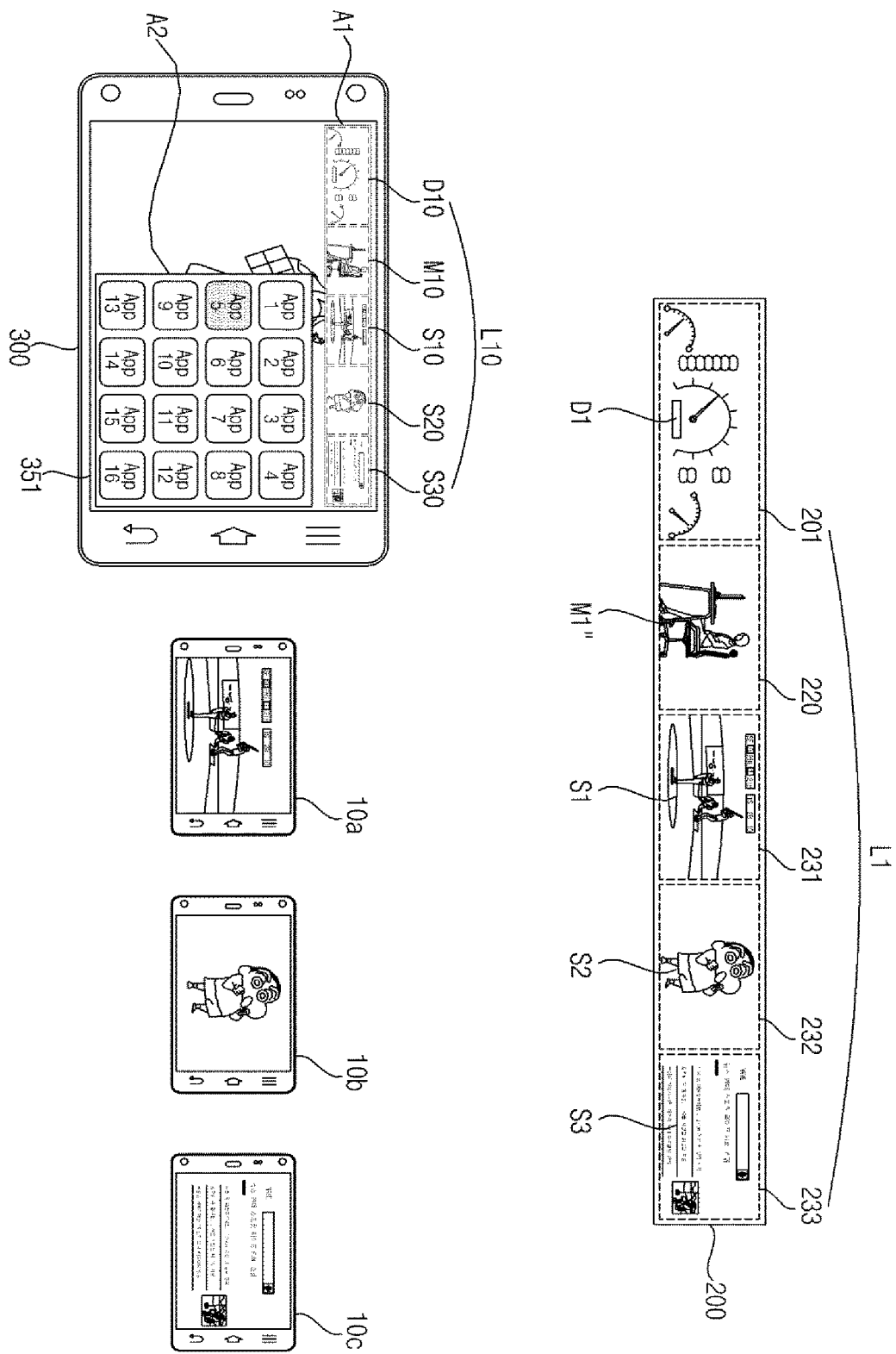

FIGS. 17*a* and 17*b* are views referred to for describing an exemplary operation for controlling a mirrored image list according to a user input by the electronic device 300 according to an embodiment of the present disclosure.

FIG. 17*a* is an exemplary view of drag and drop of a specific icon App5 displayed on the second screen A2 into the main area M10 of the first screen A1.

The user may touch the icon App5 representing a specific application that the user intends to execute.

The processor 380 may select the user-touched icon App5. In addition, the processor 380 may determine whether the fifth application corresponding to the fifth icon App1 is an application installed in the electronic device 300.

If the fifth application is an application installed in the first external electronic device 10*a* as described before, the processor 380 may request transmission of an execution image of the fifth application to the first external electronic device 10*a*. In addition, the processor 380 may receive the execution image of the fifth application from the first external electronic device 10*a*. For example, the execution image of the fifth application may be a movie image.

FIG. 17*b* is an exemplary view illustrating display of a new image M1" in the main area M10.

Specifically, if the dragged icon App5 is dropped in the main area M10, the processor 380 may switch the mirrored image M1 of the electronic device 300, displayed in the main area M10 from the picture (see FIG. 9) to the movie image M", as illustrated in FIG. 17*b*. In this case, the color of the icon App5 displayed on the second screen A2 may be different from those of the other icons App1 to App4, and App6 to App16.

According to FIGS. 17*a* and 17*b*, the user of the electronic device 300 may control the specific external electronic device 10*a* to execute a specific application by a drag and drop gesture, and reconfigure the mirrored image list L1 with the execution image of the executed specific application. Obviously, the mirrored image list 10 is different from the mirrored image list L1 only in size, and when one L10 of the mirrored image lists is reconfigured, the other mirrored image list, L1 may also be reconfigured in the same manner.

Figure 18A:
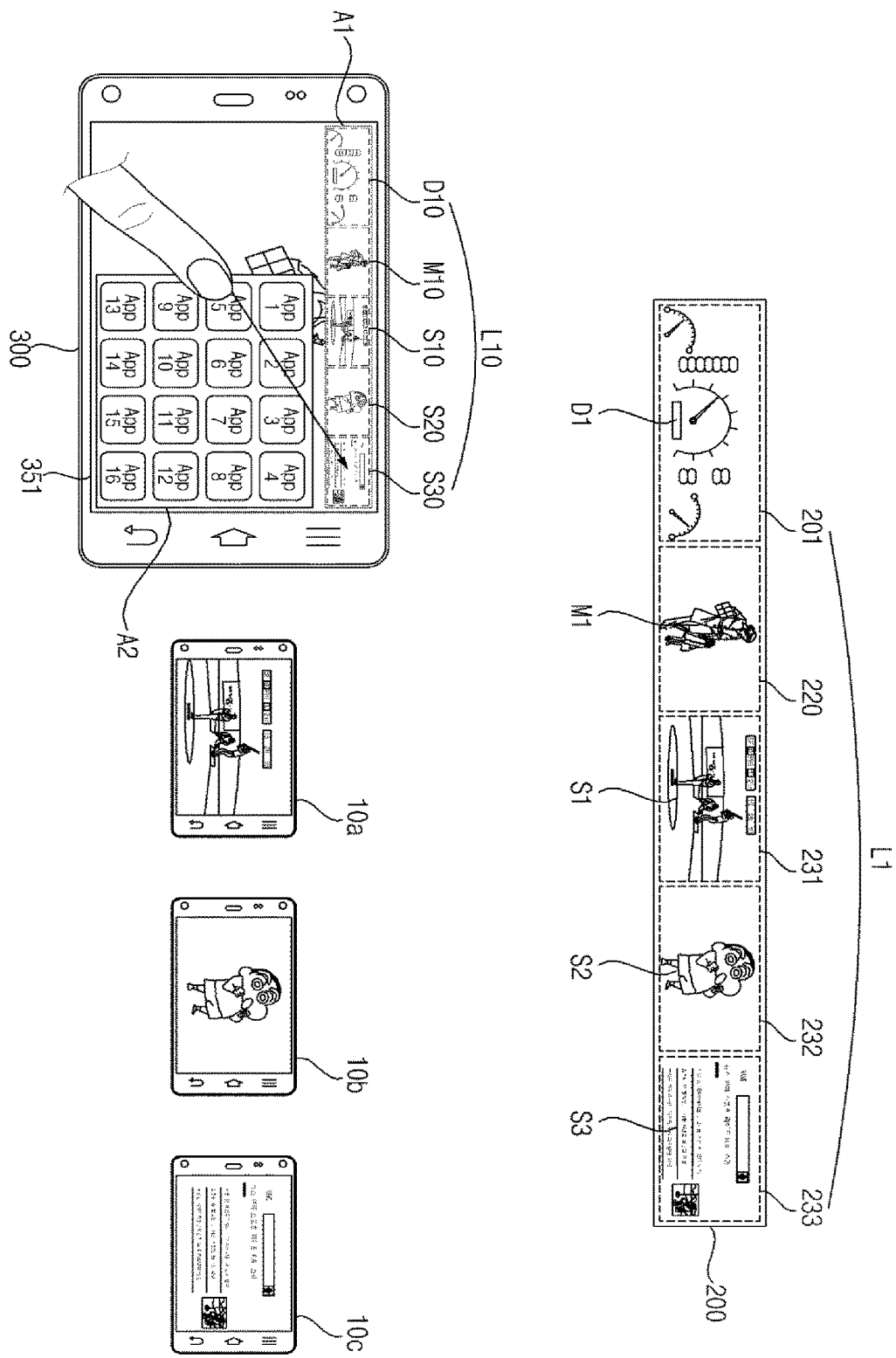
FIGS. 18a and 18b are views referred to for describing an exemplary operation for controlling a mirrored image list according to a user input by an electronic device according to an embodiment of the present disclosure.
Figure 18B:
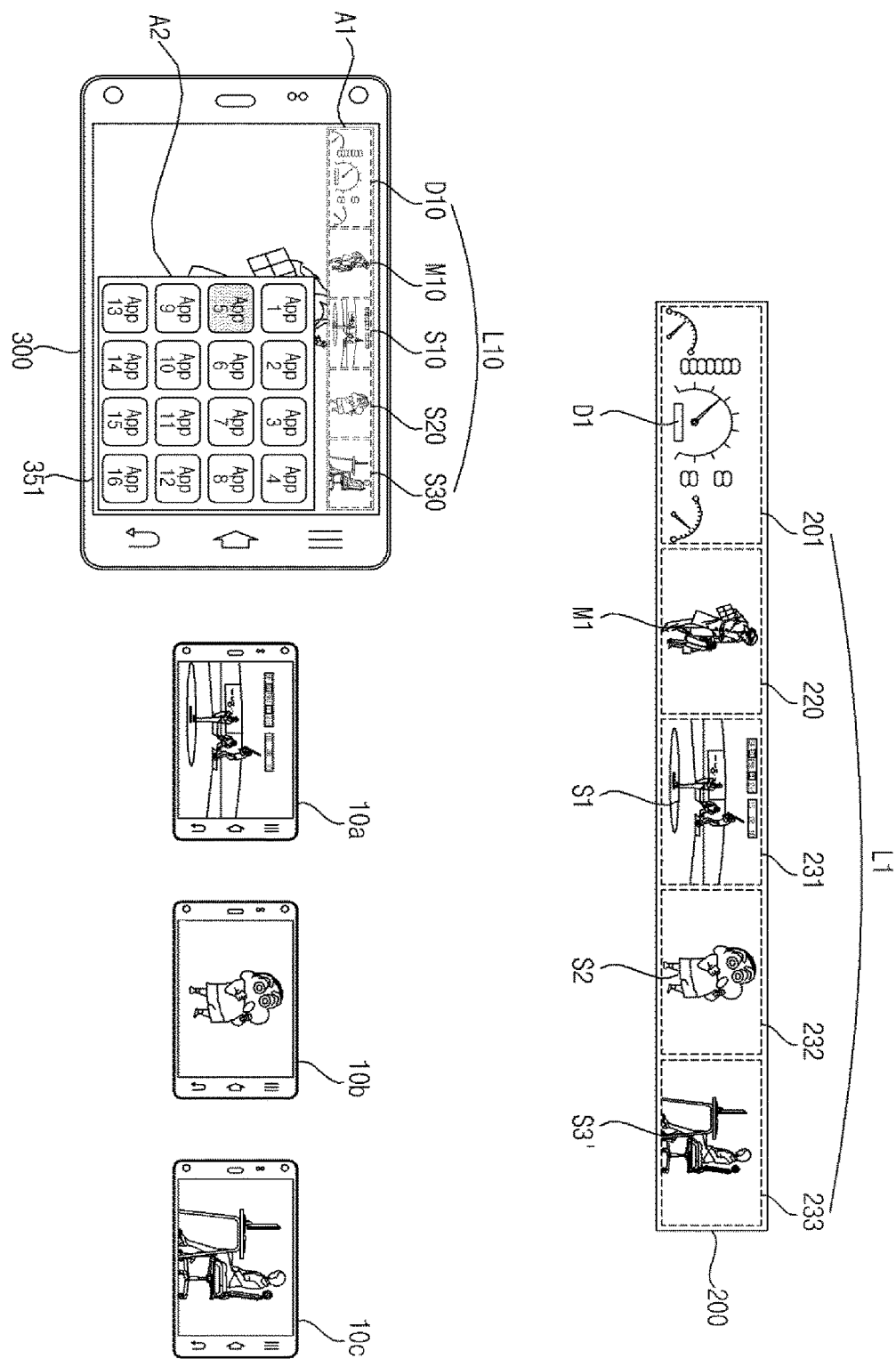

FIGS. 18*a* and 18*b* are views referred to for describing an exemplary operation for controlling a mirrored image list according to a user input by the electronic device 300 according to an embodiment of the present disclosure.

FIG. 18*a* is an exemplary view of drag and drop of the specific icon App5 displayed on the second screen A2 into the third sub-area S30 of the first screen A1.

The user may touch the icon App5 representing the specific application that the user intends to execute.

The processor 380 may select the user-touched icon App5. In addition, the processor 380 may determine whether the fifth application corresponding to the fifth icon App1 is an application installed in the electronic device 300.

Similarly to FIG. 17*a*, if the fifth application is an application installed in the first external electronic device 10*a* as described before, the processor 380 may request transmission of an execution image of the fifth application to the first external electronic device 10*a*. In addition, the processor 380 may receive the execution image of the fifth application from the first external electronic device 10*a*. For example, the execution image of the fifth application may be a movie image.

FIG. 18*b* is an exemplary view illustrating display of a new image S3' in the third sub-area S30.

Unlike FIG. 17*b*, if the dragged icon App5 is dropped in not the main area M10 but the third sub-area S30, the processor 380 may switch the mirrored image S3 of the third external electronic device 10*c*, displayed in the third sub-area S30 from the Web page (see FIG. 9) to the movie image S3'. In this case, the color of the icon App5 displayed on the second screen A2 may be different from those of the other icons App1 to App4, and App6 to App16.

According to FIGS. 18*a* and 18*b*, the user of the electronic device 300 may control one specific external electronic device 10*a* to execute a specific application by a drag and drop gesture, and control switching of the mirrored image S3 of another external electronic device 10*c* to the new image S3', using the execution image of the executed specific application.

Further, an image displayed on the display of the external electronic device 10*c* may also be switched from the Web page to the movie image S3' in response to the change of the mirrored image list L10. For example, the electronic device 300 may transmit the movie image S3' received from the first external electronic device 10*a* to the third external electronic device 10*c*. In another example, the first external electronic device 10*a* may transmit the movie image S3' to the third external electronic device 10*c* under the control of the electronic device 300.

Figure 19A:
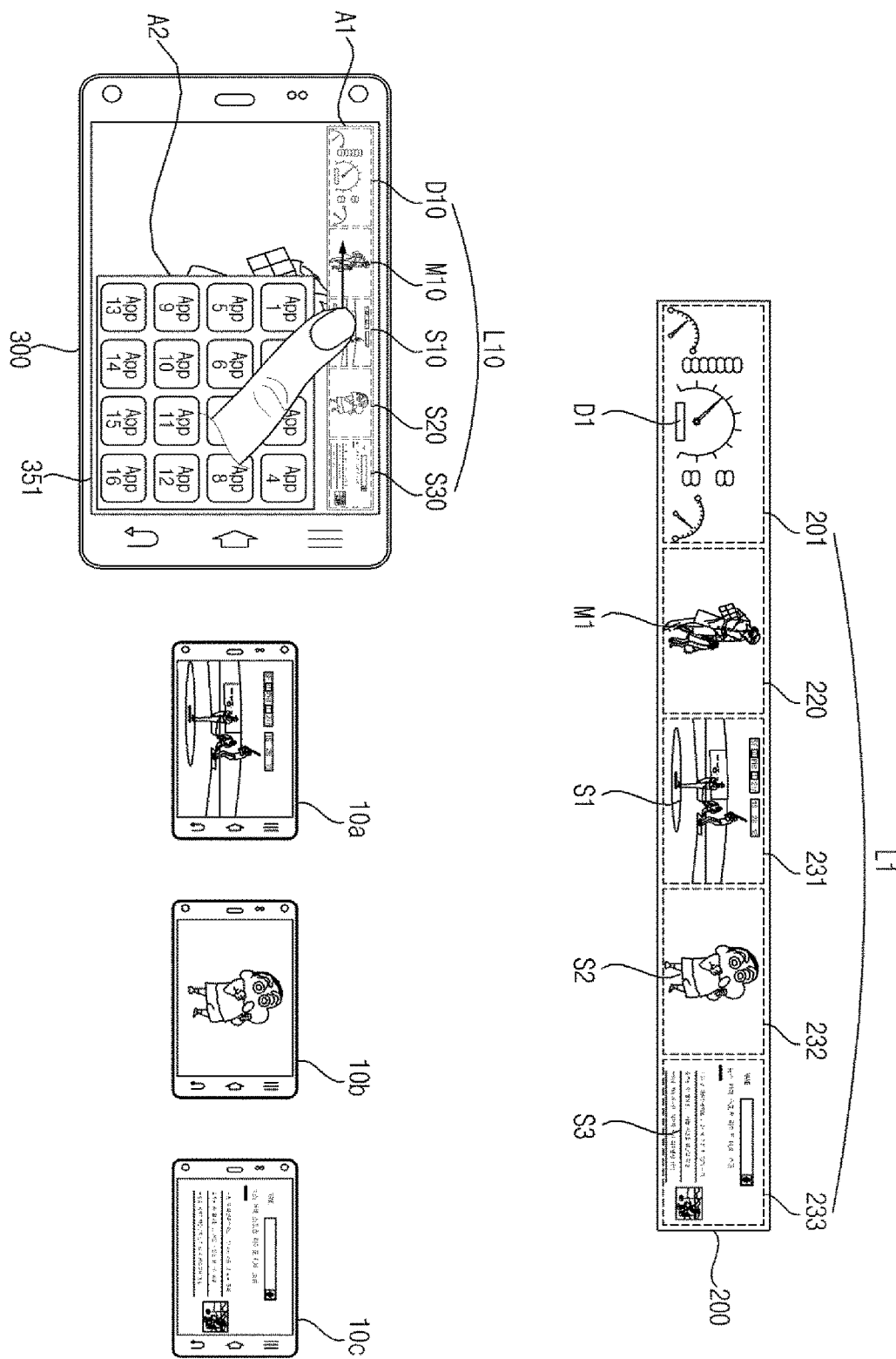
FIGS. 19a and 19b are views referred to for describing an exemplary operation for controlling a mirrored image list according to a user input by an electronic device according to an embodiment of the present disclosure.
Figure 19B:
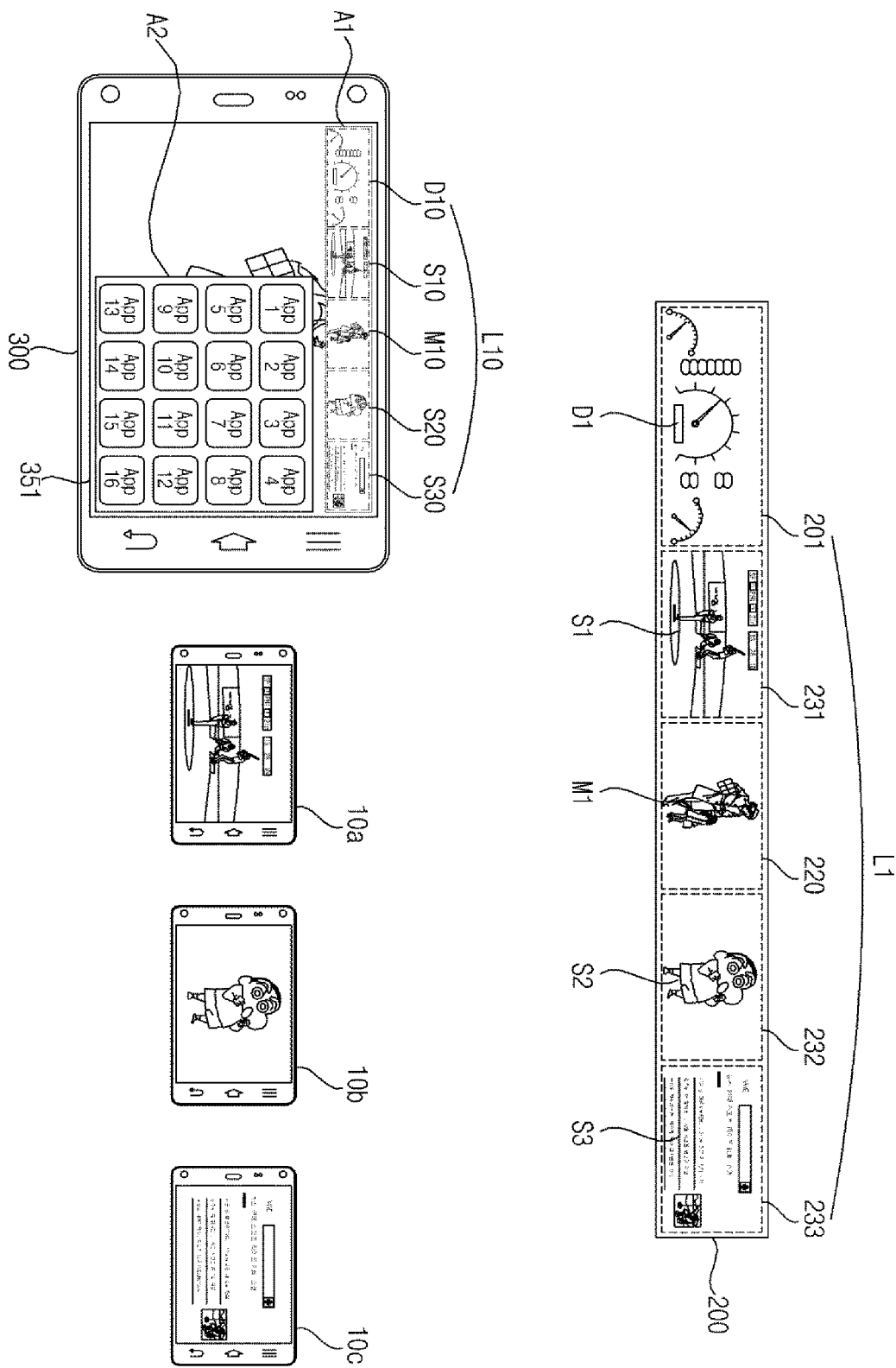

FIGS. 19*a* and 19*b* are views referred to for describing an exemplary operation for controlling a mirrored image list according to a user input by the electronic device 300 according to an embodiment of the present disclosure.

Referring to FIG. 19*a*, the processor 380 of the electronic device 300 may change the arrangement order of at least two of the plurality of images D10, M10, S10, S20, and S30 included in the mirrored image list L10 in response to a predetermined input to the first screen A1.

For example, the predetermined input may be a drag and drop or flicking gesture which starts in an area and ends in another area on the first screen A1. As illustrated in FIG. 19*a*, the user may flick the first sub-area S10 to the main area M10.

FIG. 19b is an exemplary view of reconfiguration of the mirrored image list L10 in response to a predetermined input as illustrated in FIG. 19a by the electronic device 300.

Specifically, the processor 380 may exchange the first sub-area S10 with the main area M10 in arrangement order according to a touch input which starts in the first sub-area S10 and ends in the main area M10.

That is, it may be noted that while the first sub-area S10 is adjacent to the right side of the main area M10 in FIG. 19a, the first sub-area S10 moves to the left side of the main area M10 in FIG. 19b.

Meanwhile, the mirrored image list L10 is different from the mirrored image list L1 only in size. If the arrangement order of images included in the mirrored image list L10 is changed as illustrated in FIG. 19b, the arrangement order of images included in the mirrored image list L1 displayed on the display device 200 may also be changed in the same manner.

According to FIGS. 19a and 19b, the user of the electronic device 300 may easily control a position relationship between at least two mirrored images displayed on the display device 200 by applying a predetermined input to the first screen A1.

Figure 20A:
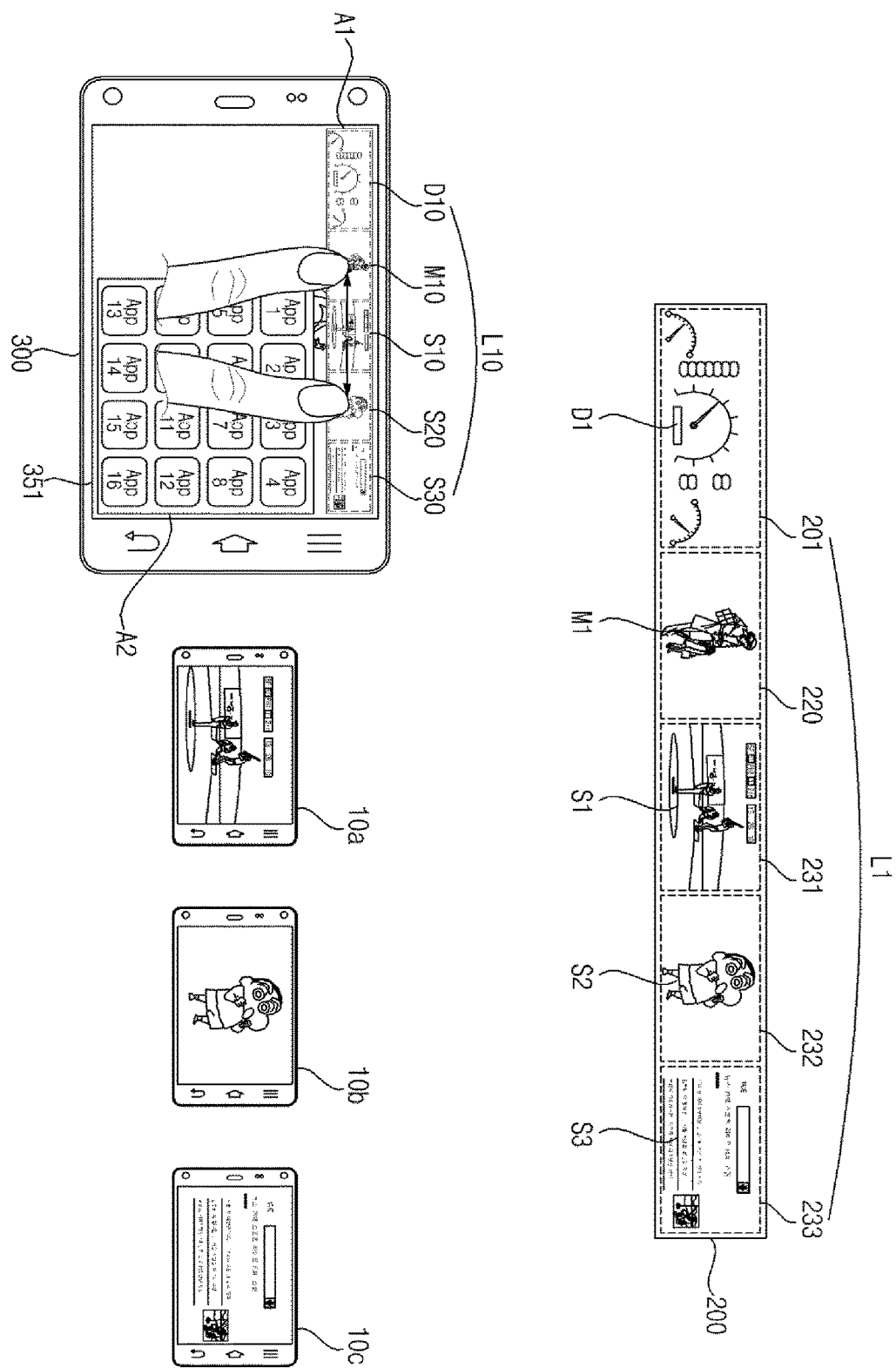
FIGS. 20a and 20b are views referred to for describing an exemplary operation for controlling a mirrored image list according to a user input by an electronic device according to an embodiment of the present disclosure.
Figure 20B:
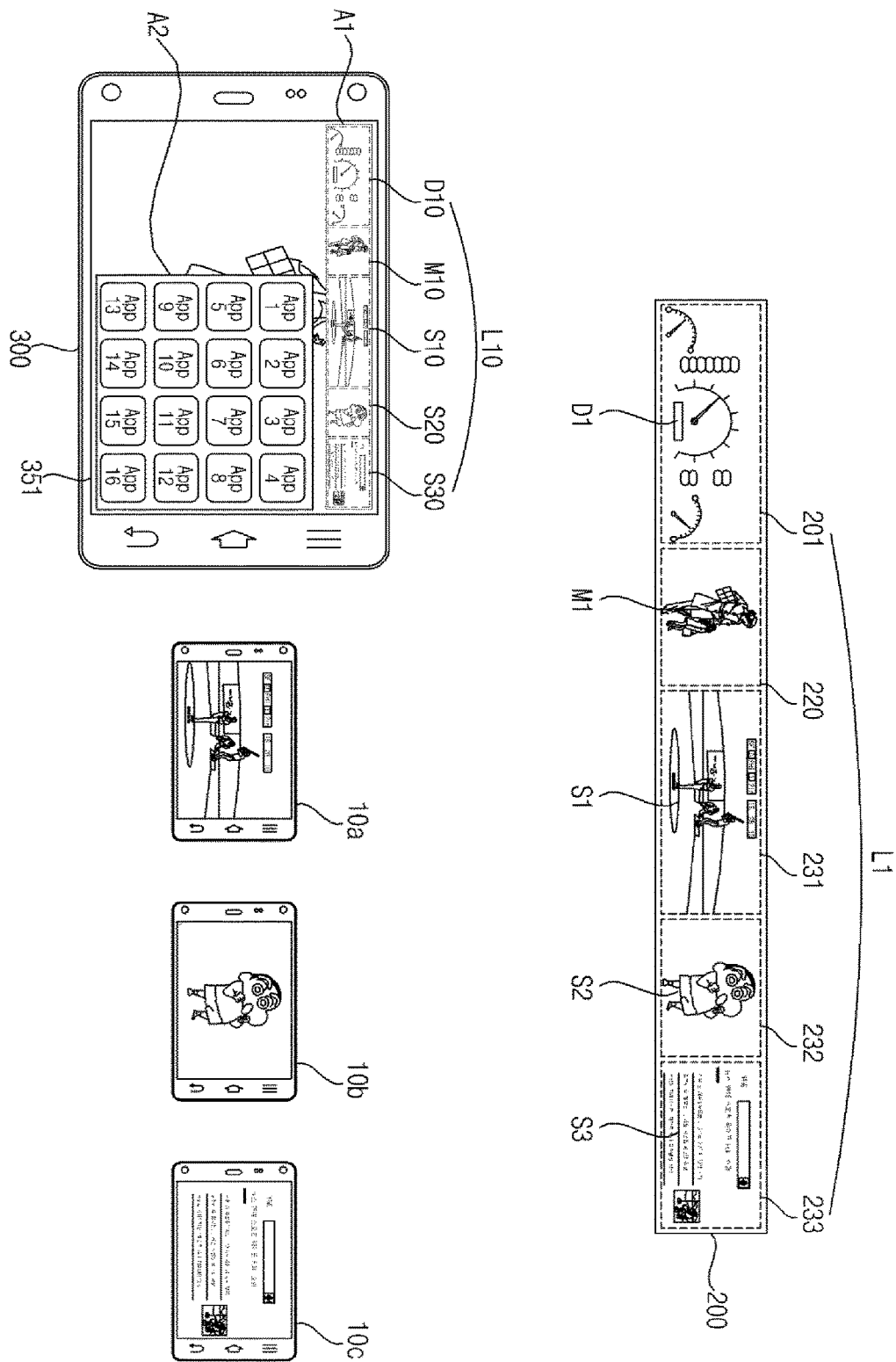

FIGS. 20a and 20b are views referred to for describing an exemplary operation for controlling a mirrored image list according to a user input by the electronic device 300 according to an embodiment of the present disclosure.

Referring to FIG. 20a, the processor 380 of the electronic device 300 may scale up or scale down at least one of the plurality of images D10, M10, S10, S20, and S30 included in the mirrored image list L10 in response to a predetermined input to the first screen A1.

For example, the predetermined input may be a zoom-in or zoom-out gesture for one area of the first screen A1.

The zoom-in gesture may be a gesture of narrowing the distance between two simultaneously touched points on the first screen A1. The processor 380 may scale down a specific image in the mirrored image list L10 in response to the zoom-in gesture on the first screen A1. Further, the zoom-out gesture may be a gesture of widening the distance between two simultaneously touched points on the first screen A1. The processor 380 may scale up a specific image in the mirrored image list L10 in response to the zoom-out gesture on the first screen A1.

FIG. 20b is an exemplary view of reconfiguration of the mirrored image list L10 in response to a zoom-out gesture for the first sub-area S10 as illustrated in FIG. 20a by the electronic device 300.

Specifically, the processor 380 may scale up the first sub-area S10 in response to a zoom-out gesture. For example, if the zoom-out gesture is horizontal, the processor 380 may increase only the width of the first sub-area S10, with the length of the first sub-area S10 fixed. In this case, as the first sub-area S10 is scaled up, the size of the mirrored image S10 displayed in the first sub-area S10 may also be increased.

On the other hand, as the first sub-area S10 is scaled up, the main area M10, the second sub-area S20, and the third sub-area S30 may be scaled down relatively.

Figure 21A:
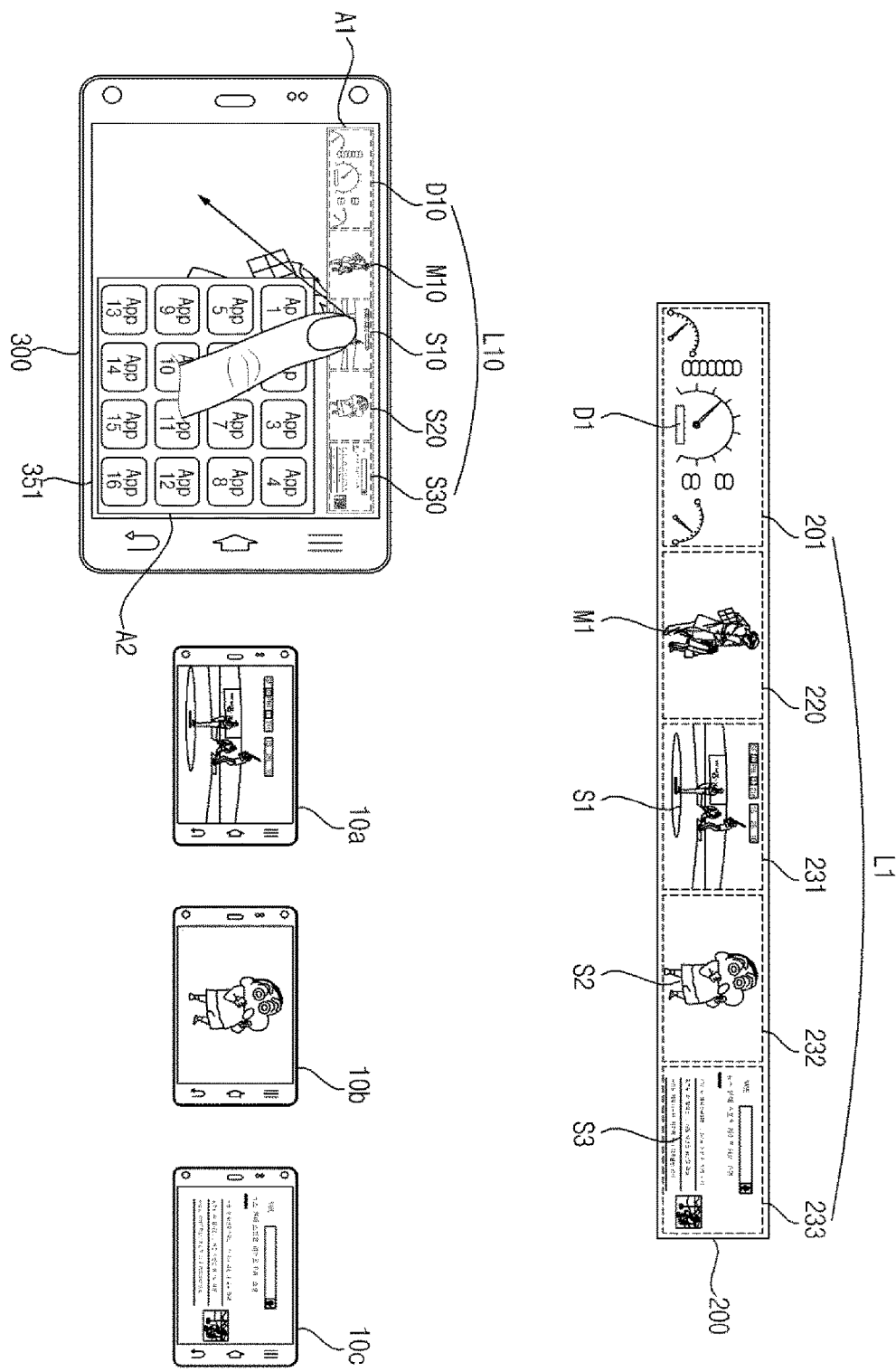
FIGS. 21a, 21b, and 21c are views referred to for describing an exemplary operation for controlling a mirrored image list according to a user input by an electronic device according to an embodiment of the present disclosure.
Figure 21B:
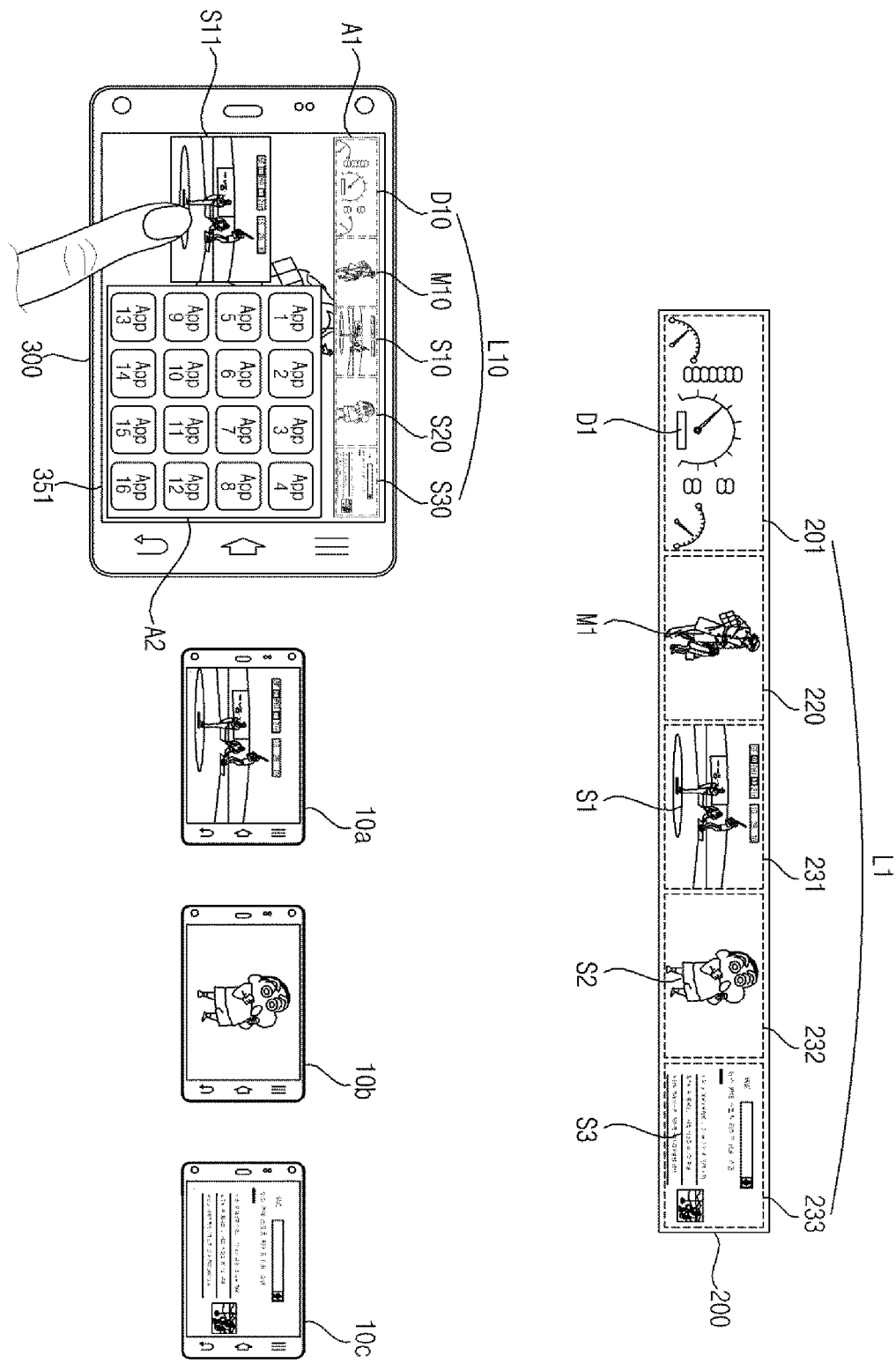
Figure 21C:
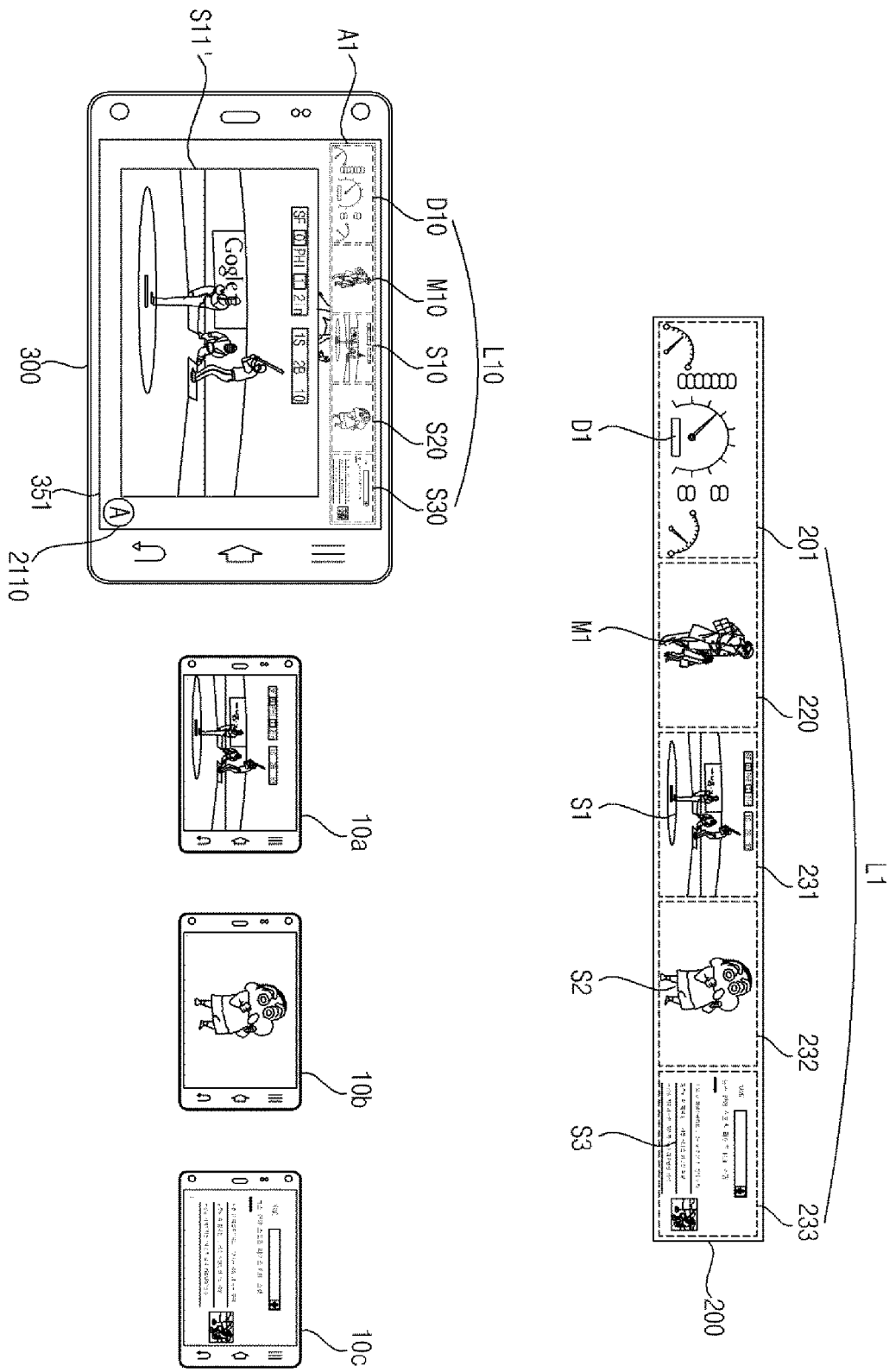

FIGS. 21a, 21b, and 21c are views referred to for describing an exemplary operation for controlling a mirrored image list according to a user input by the electronic device 300 according to an embodiment of the present disclosure.

Referring to FIG. 21a, the electronic device 300 may display at least one of the images included in the mirrored image list L10 on a third screen of the display 351 in response to a predetermined input. Herein, the third screen may refer to at least a part of the remaining area except for the first screen A1 and the second screen A1 in the entire area of the display 351.

For example, the user of the electronic device 300 may want the mirrored image S1 of the first external electronic device 10a, displayed in the first sub-area S10, to be displayed enlarged on the display 351. In this case, the user of the electronic device 300 may drag and drop the first sub-area S10 to a position of the third screen, as illustrated in FIG. 21a.

FIG. 21b is an exemplary view of display of a scaled-up image S11 corresponding to the mirrored image S1 of the first external electronic device 10a on the third screen. Herein, the mirrored image S1 included in the mirrored image list L1, the mirrored image displayed in the first sub-area S10, and the scaled-up image S11 may differ only in size.

FIG. 21c is an exemplary view illustrating an image S11' further scaled up from the scaled-up image S11 illustrated in FIG. 21b. For example, if the user touches the scaled-up image S11 in a predetermined pattern, the processor 380 may display the image S11' scaled-up at a predetermined ratio from the scaled-up image S11. In this case, the processor 380 may change the second screen A2 to an icon 2110 of a predetermined size.

If the user touches the icon 2110, the processor 380 may display the second screen A2 again on the display 351.

Figure 22A:
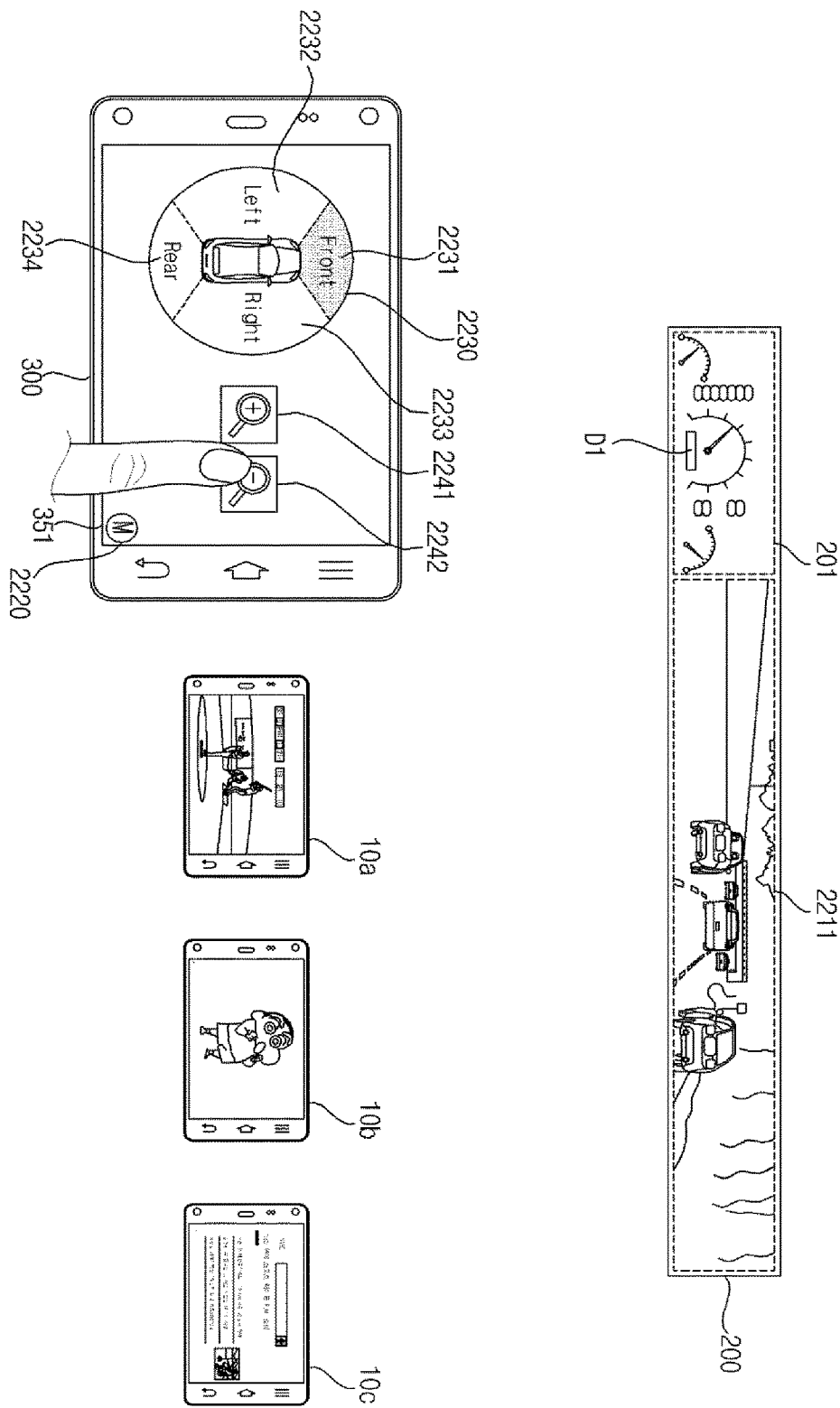
FIGS. 22a and 22b are views referred to for describing an exemplary operation for controlling a display device by an electronic device according to an embodiment of the present disclosure.
Figure 22B:
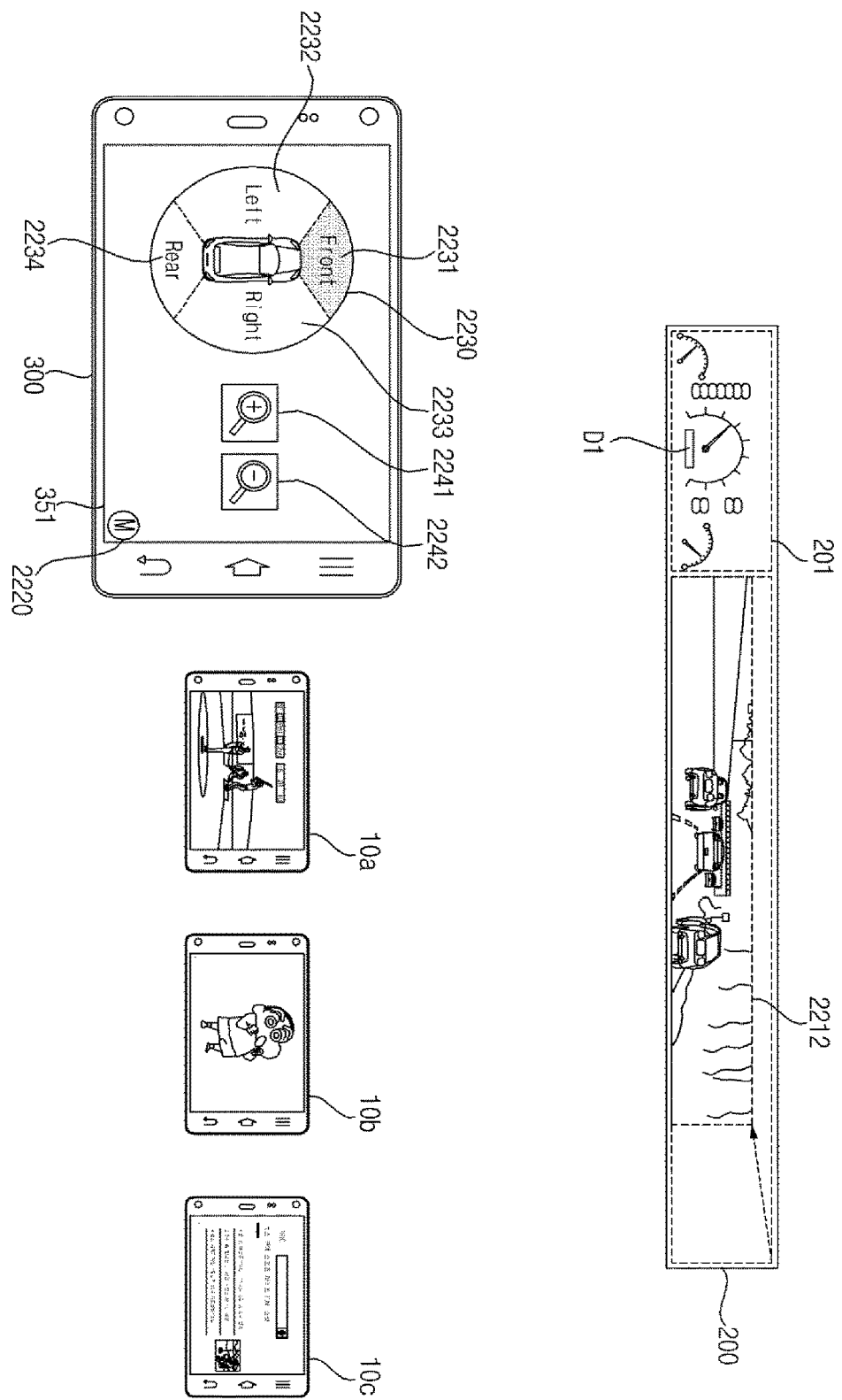

FIGS. 22a and 22b are views referred to for describing an exemplary operation for controlling the display device 200 by the electronic device 300 according to an embodiment of the present disclosure.

Upon receipt of a predetermined input, the electronic device 300 may control the display device 200 to display an image corresponding to the predetermined input. In an embodiment, the predetermined input may be a user's voice. For example, the processor 380 may receive the user's voice through the microphone 322 of the electronic device 300, and provide an electrical signal corresponding to the received voice to the controller 170 of the vehicle 100. Thus, the controller 170 of the vehicle 100 may display an image corresponding to the electrical signal on the screen of the display device 200 based on the electrical signal received from the electronic device 300. For example, if the electronic device 300 receives the user's voice commanding display of an external image, the vehicle 100 may display the external image on the display device 200.

FIG. 22a is an exemplary view of control of an external image 2211 displayed on the display device 200 by the electronic device 300.

Upon receipt of an input commanding display of the external image 2211 from one of passengers of the vehicle 100, the vehicle 100 may display the external image 2211 on the display device 200. For example, the external image 2211 displayed on the display device 200 may be one of i) a front image provided by the front camera 161a, ii) a left-side image provided by the left-side camera 161b, iii) a right-side image provided by the right-side camera 161c, iv) a rear-side image provided by the rear-side camera 161d, and v) an AVM image into which a plurality of images are synthesized. If the external image 2211 is displayed on the display device 200, the mirrored image M1 of the electronic device 300 and the mirrored images S1, S2, and S3 of the first, second, and third external electronic devices 10a, 10b, and 10c may not be displayed on the display device 200.

Meanwhile, with the external image 2211 displayed on the display device 200, the electronic device 300 may not display the first screen A1 and the second screen A2 on the display 351. That is, the processor 380 may temporarily discontinue display of the mirrored image list L10. Further, the processor 380 may display an indicator 2220 indicating temporary disappearance of the mirrored image list L10 at a portion of the display 351. If the user touches the indicator 2220, the processor 380 may display the first screen A1 and the second screen A2 again on the display 351.

If the external image 2211 is displayed on the display device 200, the electronic device 300 may display a virtual controller 2230 on the display 351 in order to control the external image 2211.

The virtual controller 2230 may include a first view button 2231, a second view button 2232, a third view button 2233, and a fourth view button 2234. The first to fourth view buttons 2231 to 2234 may correspond to front-side, left-side, right-side, and rear-side images, respectively.

For example, if the external image 2211 is a front-side image, the first view button 2231 may be displayed in a different color from the other view buttons 2232, 2233, and 2234. Accordingly, the user may easily recognize that the external image 2211 currently displayed on the display device 200 is a front-side image.

The user of the electronic device 300 may switch the external image 2211 displayed on the display device 200 to another external image. For example, if the user touches the second view button 2232, the processor 380 may switch the front-side image 2211 to a left-side image. In another example, if the user touches all of the first to fourth view buttons 2231 to 2234 within a predetermined time period, the processor 380 may switch the front-side image 2211 to an AVM image. Herein, the AVM image may correspond to the synthetic image 400 described before with reference to FIG. 1c.

That is, the electronic device 300 may control the display device 200 to display an external image of a specific viewpoint corresponding to a user command.

In an embodiment, the electronic device 300 may display a zoom-in button 2241 and a zoom-out button 2242 together with or independently of the virtual controller 2230 on the display 351.

FIG. 22b is an exemplary view of an external image 2212 displayed on the display device 200, when the user of the electronic device 300 touches the zoom-out button 2242 as illustrated in FIG. 22a.

Specifically, if the user of the electronic device 300 touches the zoom-out button 2242, the processor 380 may transmit a control signal commanding scale-down of the external image 2211 to the vehicle 100. The vehicle 100 may display the external image 2212 scaled down at a predetermined ratio from the external image 2211 in response to the control signal received from the electronic device 300, on the display device 200.

The foregoing embodiments of the present disclosure may be implemented as a program for executing functions corresponding to the configurations of the embodiments of the present disclosure, or a recording medium recording the program code. This implementation may be realized readily from the disclosure of the foregoing embodiments by those skilled in the art. Examples of the computer-readable recording medium include a Hard Disk Drive (HDD), a Solid State Disk (SSD), a Silicon Disk Drive (SDD), a ROM, a RAM, a CD-ROM, a magnetic tape, a floppy disc, an optical data storage, and a carrier wave (e.g., data transmission over the Internet).

Further, since those skilled in the art may make various replacements, changes, and modifications to the above-described present disclosure within the scope and spirit of the present disclosure, all or part of each embodiment may be selectively combined so as to make various modifications, not limited by the foregoing embodiments and the attached drawings.

The invention claimed is:

1. An electronic device for sharing an image with a display device of a vehicle and at least one external electronic device located inside the vehicle, the electronic device comprising:
    a display unit;
    a communication unit configured to communicate with the display device and the at least one external electronic device; and
    a processor connected to the display unit and the communication unit,
    wherein the processor is configured to receive a mirrored image list displayed on the display device from the display device of the vehicle and to display the mirrored image list on a first screen of the display unit,
    wherein the mirrored image list includes a mirrored image of the electronic device and a mirrored image of each of the at least one external electronic device, the mirrored images being shared with the display device,
    wherein the first screen includes a main area and at least one sub-area, and the processor is configured to display the mirrored image of the electronic device in the main area and the mirrored image of the at least one external electronic device in the at least one sub-area,
    wherein the processor is configured to display selectable objects related to the mirrored image list on a second screen of the display unit,
    wherein the selectable objects related to the mirrored image list include icons representing applications installed in the electronic device, and
    wherein the selectable objects related to the mirrored image list further include icons representing applications installed in the at least one external electronic device.

2. The electronic device according to claim 1, wherein the number of the at least one sub-area is equal to the number of the at least one external electronic device, and the mirrored image of the at least one external electronic device one-to-one corresponds to the at least one sub-area.

3. The electronic device according to claim 1, wherein the processor is configured to display identification information about the electronic device in the main area, and identification information about the at least one external electronic device in the at least one sub-area.

4. The electronic device according to claim 1, wherein the processor is configured to display an outline of the main area in a different color or thickness from an outline of the at least one sub-area.

5. The electronic device according to claim 1, wherein when one of the icons representing the applications installed in the electronic device is dragged and dropped from the second screen into the main area, the processor is configured to switch the mirrored image of the electronic device to an execution image of an application corresponding to the dragged icon.

6. The electronic device according to claim 1, wherein when one of the icons representing the applications installed in the electronic device is dragged and dropped from the second screen into a specific sub-area among the at least one sub-area, the processor is configured to switch the mirrored image of the external electronic device corresponding to the specific sub-area to an execution image of an application corresponding to the dragged icon.

7. The electronic device according to claim 1, wherein when one of the icons representing the applications installed in the at least one external electronic device is dragged and dropped from the second screen into the main area, the processor is configured to switch the mirrored image of the electronic device to an execution image of an application corresponding to the dragged icon.

8. The electronic device according to claim 1, wherein the at least one external electronic device includes a first external electronic device and a second external electronic device, and the at least one sub-area includes a first sub-area displaying a mirrored image of the first external electronic device and a second sub-area displaying a mirrored image of the second external electronic device.

9. The electronic device according to claim 1, wherein when one of the icons representing applications installed in the first external electronic device is dragged and dropped from the second screen into the second sub-area, the processor is configured to switch the mirrored image of the second external electronic device to an execution image of an application corresponding to the dragged icon.

10. The electronic device according to claim 1, wherein when one of the icons representing applications installed in the first external electronic device is dragged and dropped from the second screen into the first sub-area, the processor is configured to switch the mirrored image of the first external electronic device to an execution image of an application corresponding to the dragged icon.

11. The electronic device according to claim 1, wherein the processor is configured to change an arrangement order of at least two mirrored images included in the mirrored image list based on a user input to the first screen.

12. The electronic device according to claim 1, wherein the processor is configured to change a size of at least one mirrored image included in the mirrored image list based on a user input to the first screen.

13. The electronic device according to claim 1, wherein the processor is configured to scale up a mirrored image included in the mirrored image list and display the scaled-up image on a third screen, based on a user input to the first screen.

14. A method for sharing an image using an electronic device, the method comprising:
    receiving a mirrored image list displayed on a display device of a vehicle from the display device, the mirrored image list including a mirrored image of the electronic device and a mirrored image of each of at least one external electronic device located inside the vehicle;
    displaying the mirrored image list on a first screen of the electronic device;
    displaying selectable objects related to the mirrored image list on a second screen of the electronic device; and
    switching at least one mirrored image included in the mirrored image list to an image corresponding to a dragged object, in response to a drag and drop of the object displayed on the second screen onto the first screen,
    wherein the selectable objects displayed on the second screen include at least one of icons representing applications installed in the electronic device and icons representing applications installed in the at least one external electronic device.

15. The method according to claim 14, wherein the displaying of the mirrored image list on the first screen of the electronic device comprises:
    displaying a mirrored image of the electronic device in a main area included in the first screen; and
    displaying a mirrored image of the at least one external electronic device in at least one sub-area included in the first screen.

* * * * *